US 6,925,809 B2
(12) United States Patent
Mowill

(10) Patent No.: US 6,925,809 B2
(45) Date of Patent: Aug. 9, 2005

(54) GAS TURBINE ENGINE FUEL/AIR PREMIXERS WITH VARIABLE GEOMETRY EXIT AND METHOD FOR CONTROLLING EXIT VELOCITIES

(76) Inventor: R. Jan Mowill, OPRA BV, Opaalstratt 60, P.O. Box 838, 7550 AV Hengelo (NL)

( * ) Notice: Subject to any disclaimer, the term of this patent is extended or adjusted under 35 U.S.C. 154(b) by 0 days.

(21) Appl. No.: 10/014,415

(22) Filed: Dec. 14, 2001

(65) Prior Publication Data

US 2002/0069645 A1 Jun. 13, 2002

Related U.S. Application Data

(63) Continuation-in-part of application No. 09/500,960, filed on Feb. 15, 2000, now abandoned, and a continuation-in-part of application No. 09/258,812, filed on Feb. 26, 1999, now abandoned.
(60) Provisional application No. 60/168,681, filed on Dec. 3, 1999.

(51) Int. Cl.[7] .............................. F02C 7/00; F02C 9/00; F02C 9/50
(52) U.S. Cl. ..................... 60/737; 60/39.23; 60/39.281; 431/186
(58) Field of Search ............................... 60/737, 39.23, 60/39.281; 239/408, 410, 411, 453, 456, 457, 458; 431/186, 187

(56) References Cited

U.S. PATENT DOCUMENTS

| | | | |
|---|---|---|---|
| 1,355,320 A | 12/1920 | Quinn | |
| 1,705,383 A | 3/1929 | Weiss | |
| 2,108,822 A | 2/1938 | Lippincott | |

(Continued)

FOREIGN PATENT DOCUMENTS

| | | |
|---|---|---|
| CH | 283198 | 5/1952 |
| DE | 33 06 892 | 8/1984 |
| EP | 0 074 196 | 3/1983 |

(Continued)

OTHER PUBLICATIONS

European Search Report.
Sheperd, D.G. "Principles of Turbomachinery", New York, The MAcmillan Co., 1956, pp. 282–289.
Csanady, G.T. "Turbomachines", New York; McGraw–Hill Book Co., 1964, pp. 14–23.
Cox, H.R., "Gas Turbine Principles and Practice", D. Van Nostrand, pp. 2–26, 2–39.
Treager, E.E., "Aircraft Gas Turbine Technology", 2$^{nd}$ Ed. p. 10.

(Continued)

Primary Examiner—Ted Kim
(74) Attorney, Agent, or Firm—Finnegan, Henderson, Farabow, Garrett & Dunner, LLP

(57) ABSTRACT

Apparatus for premixing fuel and air to provide a fuel/air mixture includes a mixing tube configured for receiving fuel and air, a mixing tube axis, and a mixing tube exit for discharging a fuel/air mixture. The apparatus further includes a mixture valve associated with the mixing tube exit and including inner and outer valve members that define an exit flow area. The defined exit flow area includes at least two segmented, substantially opposed area portions with respect to angular position about the mixing tube axis for directing the mixture flow, and at least one of the inner and outer valve members is movable relative to the other of said valve members to selectively vary the defined exit flow area with respect to time. In a gas turbine gas generator or engine application, a separate controllable combustion air valve can be used with a fuel valve to provide controlled fuel/air ratios for the mixture.

25 Claims, 35 Drawing Sheets

U.S. PATENT DOCUMENTS

| | | |
|---|---|---|
| 2,183,836 A | 12/1939 | Gordon, Jr. |
| 2,261,477 A | 12/1941 | Powter et al. |
| 2,268,270 A | 12/1941 | Traupel |
| 2,446,059 A | 7/1948 | Peterson |
| 2,469,238 A | 5/1949 | Newton |
| 2,487,514 A | 11/1949 | Boestade et al. |
| 2,488,969 A | 11/1949 | Dietler |
| 2,489,939 A | 11/1949 | Traupel |
| 2,513,601 A | 7/1950 | Traupel |
| 2,608,822 A | 9/1952 | Pavlecka et al. |
| 2,620,626 A | 12/1952 | Lysholm |
| 2,621,475 A | 12/1952 | Loy |
| 2,625,012 A | 1/1953 | Larrecq |
| 2,663,141 A | 12/1953 | Hage |
| 2,669,300 A * | 2/1954 | Blaha ......................... 431/348 |
| 2,675,673 A | 4/1954 | Mallinson et al. |
| 2,837,894 A | 6/1958 | Kind |
| 2,904,108 A * | 9/1959 | Blaha ......................... 431/348 |
| 2,988,884 A | 6/1961 | Pouit |
| 2,999,359 A | 9/1961 | Murray |
| 3,088,279 A | 5/1963 | Diedrich |
| 3,091,080 A | 5/1963 | Crim et al. |
| 3,091,081 A | 5/1963 | Alper |
| 3,099,134 A | 7/1963 | Calder et al. |
| 3,204,406 A | 9/1965 | Howes et al. |
| 3,315,467 A | 4/1967 | De Witt |
| 3,407,596 A | 10/1968 | Dasbach et al. |
| 3,430,443 A | 3/1969 | Richardson et al. |
| 3,511,587 A * | 5/1970 | Jansen et al. ............... 431/160 |
| 3,626,444 A | 12/1971 | Caruel et al. |
| 3,691,762 A | 9/1972 | Ryberg et al. |
| 3,739,576 A | 6/1973 | Chambelain |
| 3,765,170 A | 10/1973 | Nakamura |
| 3,765,824 A | 10/1973 | Trozzi |
| 3,768,962 A | 10/1973 | Baranowski, Jr. |
| 3,851,466 A | 12/1974 | Verdouw |
| 3,869,865 A | 3/1975 | Lacroix et al. |
| 3,899,884 A | 8/1975 | Ekstedt |
| 3,905,192 A | 9/1975 | Pierce et al. |
| 3,906,718 A | 9/1975 | Wood |
| 3,938,324 A | 2/1976 | Hammond, Jr. et al. |
| 3,958,413 A | 5/1976 | Cornelius et al. |
| 4,012,904 A | 3/1977 | Nogle |
| 4,030,288 A | 6/1977 | Davis et al. |
| 4,073,137 A | 2/1978 | Roberts |
| 4,078,377 A | 3/1978 | Owens et al. |
| 4,150,539 A | 4/1979 | Rubins et al. |
| 4,192,139 A | 3/1980 | Buchheim |
| 4,193,260 A | 3/1980 | Carlisle et al. |
| 4,215,535 A | 8/1980 | Lewis |
| 4,242,863 A | 1/1981 | Bailey |
| 4,255,927 A | 3/1981 | Johnson et al. |
| 4,260,367 A | 4/1981 | Markowski et al. |
| 4,286,430 A | 9/1981 | Smith |
| 4,297,842 A | 11/1981 | Gerhold et al. |
| 4,301,657 A | 11/1981 | Penny |
| 4,305,255 A | 12/1981 | Davies et al. |
| 4,350,009 A | 9/1982 | Holzapfel |
| 4,356,698 A | 11/1982 | Chamberlain |
| 4,389,848 A | 6/1983 | Marowski et al. |
| 4,412,414 A | 11/1983 | Novick et al. |
| 4,457,704 A | 7/1984 | Sommers et al. |
| 4,610,135 A | 9/1986 | Alexander |
| 4,641,495 A | 2/1987 | Mowill |
| 4,700,542 A | 10/1987 | Wang |
| 4,702,070 A | 10/1987 | Cureton et al. |
| 4,713,938 A | 12/1987 | Willis |
| 4,747,262 A | 5/1988 | Maynard |
| 4,766,721 A | 8/1988 | Iizuka et al. |
| 4,807,433 A | 2/1989 | Maclin et al. |
| 4,829,764 A | 5/1989 | Iizuka et al. |
| 4,838,029 A | 6/1989 | Gleason et al. |
| 4,845,944 A | 7/1989 | Rodgers |
| 4,845,952 A | 7/1989 | Beebe |
| 4,893,466 A | 1/1990 | Egnell et al. |
| 4,898,001 A | 2/1990 | Kuroda et al. |
| 4,928,481 A | 5/1990 | Joshi et al. |
| 4,944,149 A | 7/1990 | Kuwata |
| 4,966,001 A | 10/1990 | Beebe |
| 4,974,415 A | 12/1990 | Shekleton et al. |
| 5,016,443 A | 5/1991 | Shimizu et al. |
| 5,018,354 A | 5/1991 | Melchoir et al. |
| 5,069,029 A | 12/1991 | Kuroda et al. |
| 5,070,700 A | 12/1991 | Mowill |
| 5,081,832 A | 1/1992 | Mowill |
| 5,121,608 A | 6/1992 | Willis et al. |
| 5,156,002 A | 10/1992 | Mowill |
| 5,214,911 A | 6/1993 | Shekleton |
| 5,218,824 A | 6/1993 | Cederwall et al. |
| 5,257,499 A | 11/1993 | Leonard |
| 5,292,244 A | 3/1994 | Xiong |
| 5,319,923 A | 6/1994 | Leonard et al. |
| 5,343,693 A | 9/1994 | Komatsu et al. |
| 5,377,483 A | 1/1995 | Mowill |
| 5,477,671 A | 12/1995 | Mowill |
| 5,481,866 A | 1/1996 | Mowill |
| 5,533,329 A | 7/1996 | Ohyama et al. |
| 5,540,583 A | 7/1996 | Keller et al. |
| 5,572,862 A | 11/1996 | Mowill |
| 5,611,196 A | 3/1997 | Wilson |
| 5,613,357 A | 3/1997 | Mowill |
| 5,628,182 A | 5/1997 | Mowill |
| 5,638,674 A | 6/1997 | Mowill |
| 5,765,363 A | 6/1998 | Mowill |
| 5,816,049 A | 10/1998 | Joshi |
| 5,975,887 A | 11/1999 | Kamal et al. |

FOREIGN PATENT DOCUMENTS

| | | |
|---|---|---|
| EP | A1 0 100 135 | 2/1984 |
| EP | A1 0 161 561 | 11/1985 |
| EP | 0 247 984 | 12/1987 |
| EP | 0 307 968 B1 | 9/1988 |
| EP | 0 452 642 | 4/1995 |
| EP | 0 731 316 A1 | 9/1996 |
| EP | 0 691 512 | 10/1996 |
| EP | 0 831 275 | 3/1998 |
| EP | 0 635 681 | 5/1998 |
| EP | 0 911 029 | 6/1998 |
| EP | 1 036 988 | 9/2000 |
| GB | 610641 | 10/1948 |
| GB | 668834 | 3/1952 |
| GB | 695342 | 8/1953 |
| GB | 720436 | 12/1954 |
| GB | 816678 | 7/1959 |
| GB | 2 288 011 A | 10/1995 |
| JP | 55-45739 | 11/1980 |
| JP | 57-41524 | 3/1982 |
| JP | 06241455 | 8/1994 |
| WO | WO 94/00717 | 1/1994 |
| WO | WO 01/40713 | 6/2001 |

OTHER PUBLICATIONS

Leonard, G. and Stegmaier, J., "Development of an Aero-derivative Gas Turbine DLE Combustion System," Diesel & Gas Turbine Worldwide, May 1993.

Fuel Injector Cuts NOx; Professional Engineering, Sep. 1994.

Development of an Aeroderivative Gas Turbine DLE Combustion System, Diesel & Gas Worldwide, May 1993.

M. Boyce, "Gas Turbine Engineering Handbook", Gulf Pub., c. 1982, pp. 290–291.

Yamada et al., "On–Engine Evaluation of Emissions Characteristics of a Variable Geometry Lean Premixed Combustion," ASME 95–GT–48, presented at the International Gas and Aeroengine Congress & Exposition, Houston, Texas Jun. 5–8, 1995.

* cited by examiner

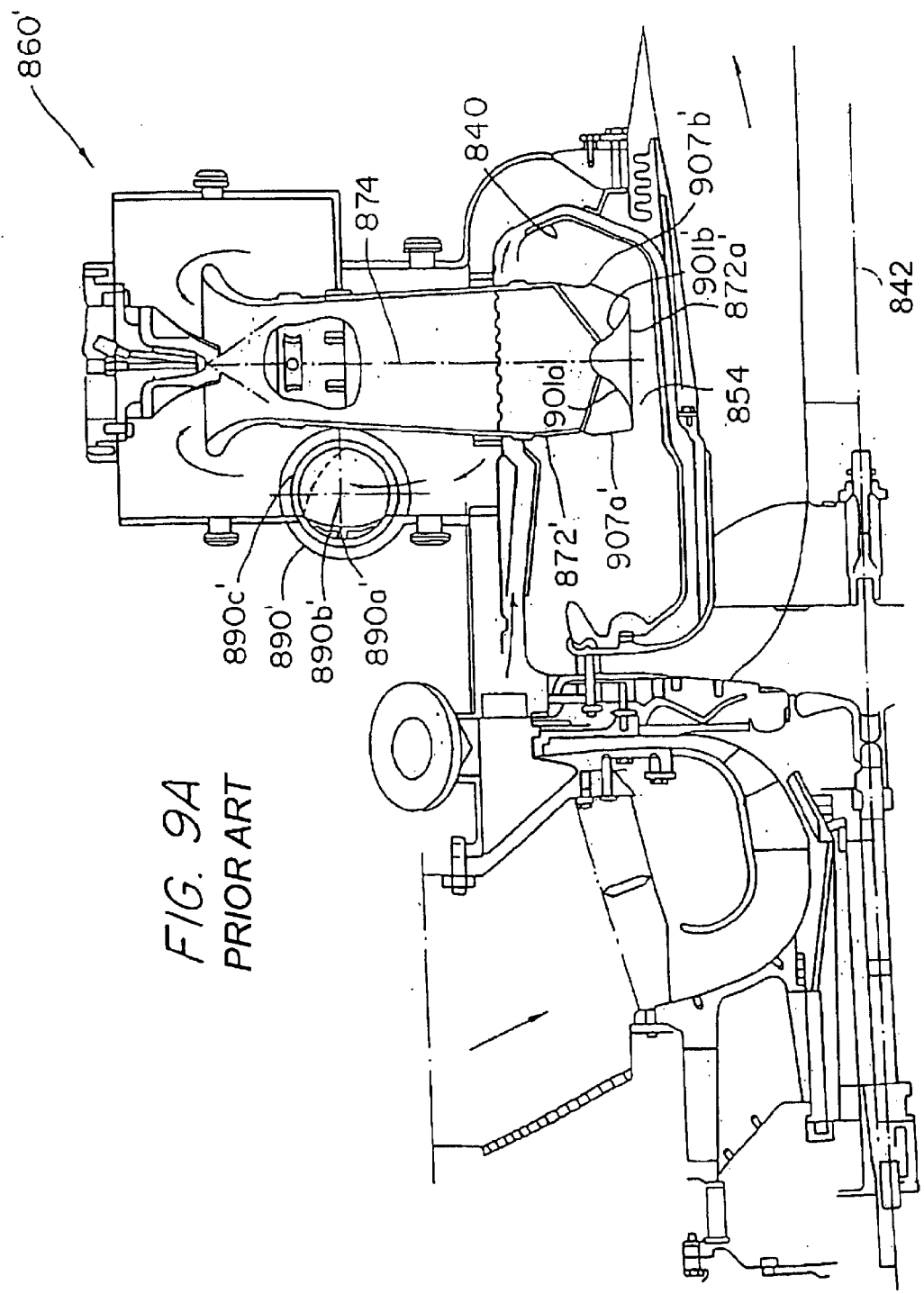

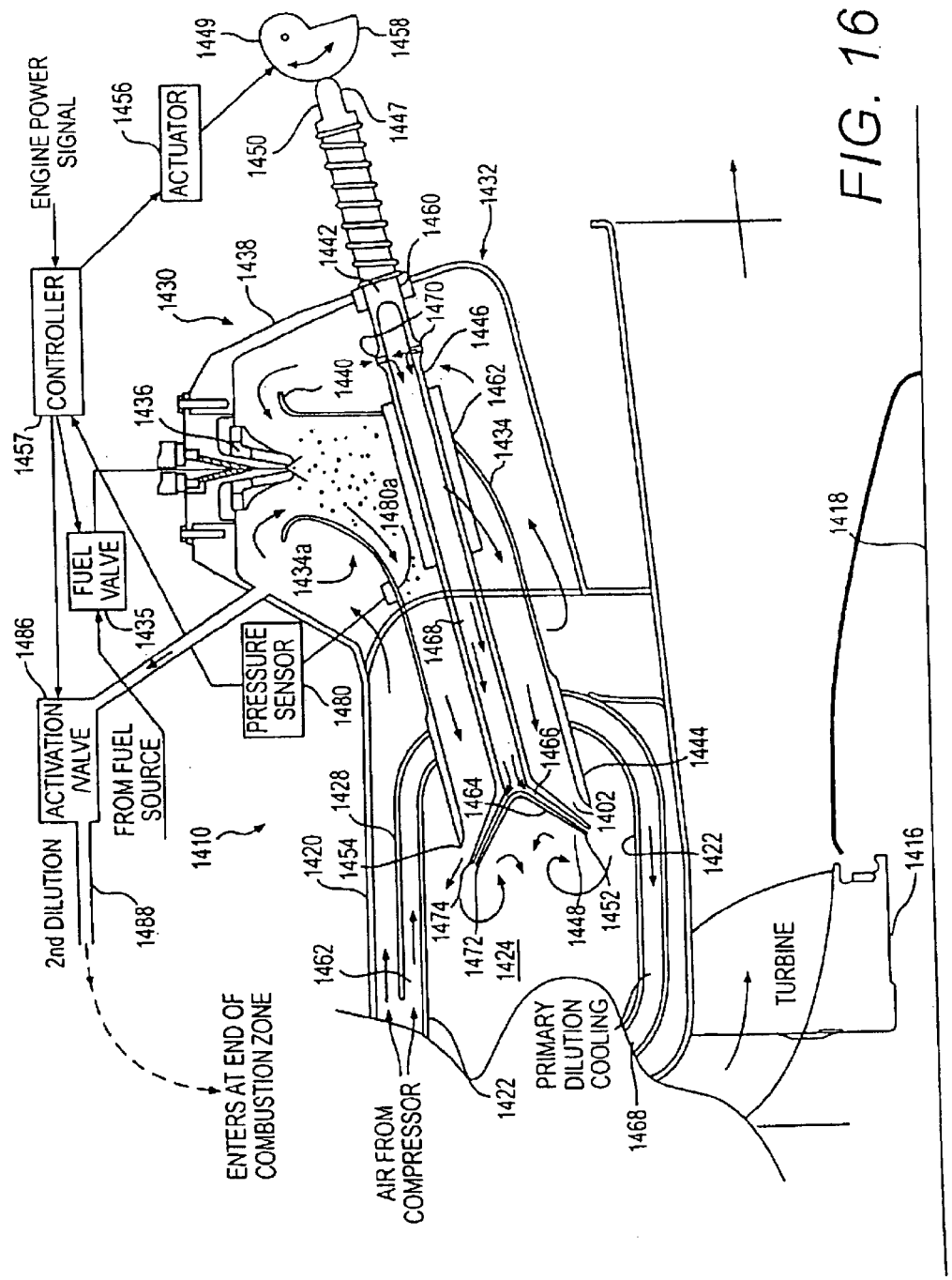

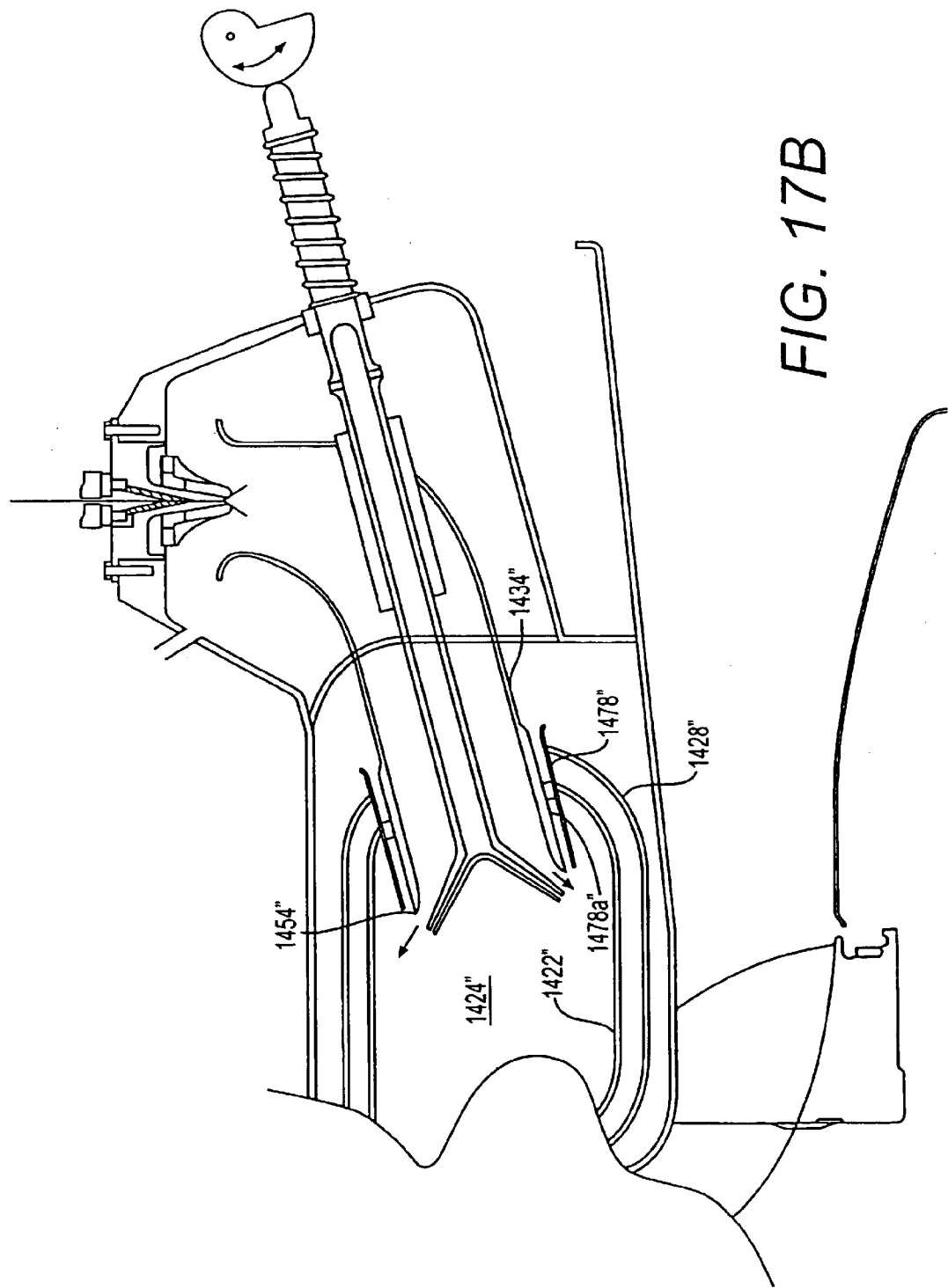

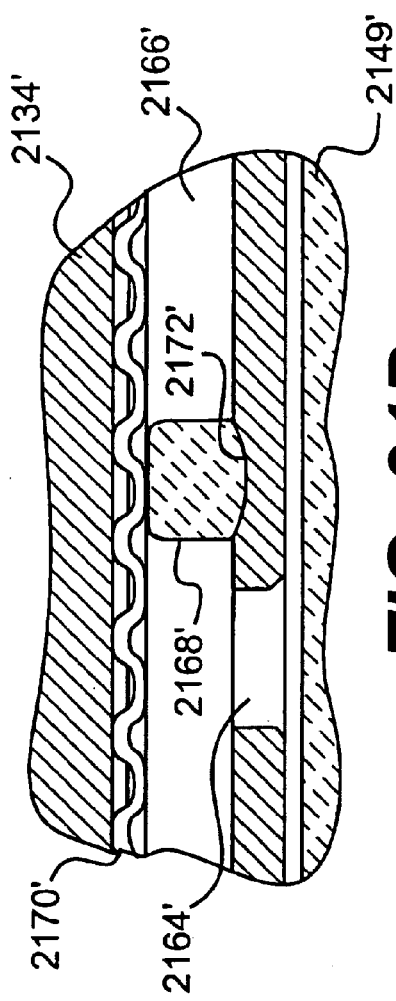
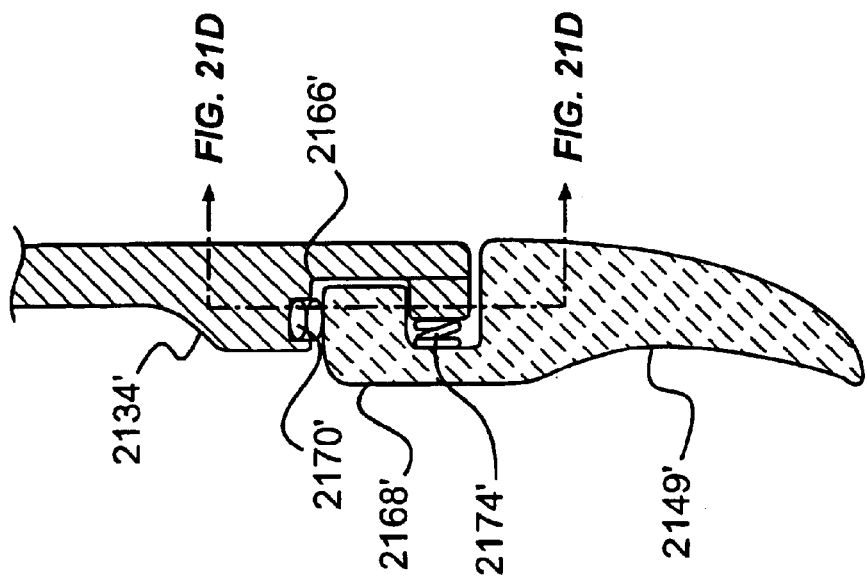

GAS TURBINE ENGINE FUEL/AIR PREMIXERS WITH VARIABLE GEOMETRY EXIT AND METHOD FOR CONTROLLING EXIT VELOCITIES

This application is a continuation-in-part of application Ser. No. 09/500,960 filed Feb. 15, 2000, now abandoned. This application claims priority from application Ser. No. 09/500,960, filed Feb. 15, 2000, now abandoned continuation-in-part of application Ser. No. 09/258,812, filed Feb. 26, 1999, now abandoned, and Provisional Application No. 60/168,681, filed Dec. 3, 1999.

BACKGROUND OF THE INVENTION

1. Field of the Invention

This invention relates generally to a combustion system for gas turbine gas generators, gas turbine engines, or other heat devices, which can produce significant advantages including low levels of pollutants, namely oxides of nitrogen, carbon monoxide, and unburned hydrocarbons. Specifically, the present invention relates to single stage, controllable fuel/air ratio combustors for gas turbine engines and gas generators using fuel/air premixer assemblies with controlled variable premixer exit geometry.

2. Description of the Art

Although gas turbine devices such as engines and gas generators do not produce the majority of the nitrogen oxide emissions released into the earth's atmosphere, reducing those emissions will reduce the total and, in that regard, many countries have enacted laws limiting the amounts that may be released. The reaction of nitrogen and oxygen in the air to form nitrogen oxides, like almost all chemical reactions, proceeds faster at higher temperatures. One way to limit the amount of NOx formed is to limit the temperature of the reaction. The NOx produced in gas turbine devices is produced in the combustion process where the highest temperature in the cycle normally exists. Therefore, one way to limit the amount of NOx produced is to limit the combustion temperature.

Various attempts have been made to limit the combustion temperature and thereby NOx production in both "single stage" combustors (i.e., those having only a single combustion zone where fuel and air are introduced) and "multi-stage" combustors, including pilot burners where several, serial connected combustion zones having separate fuel and air introduction means are used. U.S. Pat. No. 4,994,149, U.S. Pat. No. 4,297,842, and U.S. Pat. No. 4,255,927 disclose single stage gas turbine combustors where the flow of compressed air to the combustion zone and the dilution zone of an annular combustor are controlled to decrease the concentration of NOx in the turbine exhaust gases. In the above combustors, essentially unmixed fuel and air are separately admitted to the combustor, with mixing and combustion consequently occurring within the same chamber. See also Japanese Laid-Open No. 55-45739. U.S. Pat. No. 5,069,029, U.S. Pat. No. 4,898,001, U.S. Pat. No. 4,829,764, and U.S. Pat. No. 4,766,721 disclose two stage combustors. See also German Gebrauchsmuster, 99215856.0. Again, however, fuel and air are provided to each stage at least partially unmixed with complete mixing occurring within the respective combustion zones.

Attempts also have been made to utilize separate premixer chambers to provide a premixed fuel-air flow to a combustor. Japan Laid-Open Application No. 57-41524 discloses a combustor system which appears to premix only a portion of the total fuel flow to a multistage can-type combustor in a separate mixing chamber prior to introduction to the staged combustion chambers. In U.S. Pat. No. 5,016,443, a large number of separate fuel nozzles are used to inject fuel into an annular premixer chamber. However, the complexity of the above constructions employing multiple fuel nozzles and fuel splitting devices can lead to control difficulties, as well as a high initial cost.

Single stage combustor systems using external premixers are known based on the previous work of the present inventor, such as are disclosed, e.g., in U.S. Pat. No. 5,377,483; U.S. Pat. No. 5,477,671; U.S. Pat. No. 5,481,866; U.S. Pat. No. 5,572,862; U.S. Pat. No. 5,613,357; and U.S. Pat. No. 5,638,674. These systems provide close control of the fuel/air ratio by premixing all of the fuel for combustion with essentially all the combustion air using a venturi-type mixing tube, and introducing the mixture to the combustion zone of the combustor. Significant reductions in gaseous and particulate emissions have been achieved by gas turbine engines and modules over a broad range of operating conditions, employing the inventions disclosed in the above-listed patents.

It is, however, desired to provide an improved premixer system for a single stage combustor that can reduce "flash backs" from the combustor into the premixer, which can occur when the flame speed is greater than the velocity of the fuel/air mixture in the premixer. Flash backs can adversely affect the mechanical integrity and performance of the premixer system and related structure. Specifically, it is desired to provide a premixer system that can reduce flow separation in the premixer caused by the geometrical configuration of the premixer components. Flow separation can cause flash backs into the premixer.

It is further desired to provide a premixer system that can reduce pulsations in the delivery of fuel/air mixture from the premixer into the combustion chamber. These can occur from lack of flame stability in the combustor due to excessive velocities of, as well as variations in, the mixture velocity exiting the premixer. Pulsations can adversely affect the combustor liner and engine structure.

It is further desired to provide a premixer system that can deliver fuel/air mixture into the combustion chamber in a manner that reduces the impingement of flow onto the combustor liner while maintaining a comparatively simple geometric configuration of the overall design. Impingement of the flow onto the liner wall can lead to carbon build up and decrease heat transfer performance and increase thermal fatigue.

It is further desired to provide an apparatus that is relatively less complex than other state of the art annular combustor apparatus and systems thereby facilitating ease of operation, lower initial cost and maintenance of the apparatus, and substantially improved fuel/air control by the avoidance of matching a large number of separate premixers.

SUMMARY OF THE INVENTION

Test experience from the development of low emission gas turbine combustors of the type described in, e.g., U.S. Pat. No. 5,377,483, indicate that undesirable combustion pulsations can occur which are dependent on both the velocity of the fuel/air mixture being ejected from the premixer mixing tube, as well as the composition of the fuel/air mixture itself. The geometry of the combustor as a whole will also influence the emission of nitrous oxides. Where the exit area for the mixing tube is fixed, the velocity of the discharged fuel/air mixture can vary between idle and full power conditions by a factor of three. In order to avoid undesired combustion "flash back" into the premixer and reduce emissions, a certain minimum velocity of the charge—well above the flame speed of the utilized fuel—should be provided.

A desired minimum velocity in the case of a typically used fuel, such as diesel fuel #2, is approximately 20–30 m/sec. At this velocity, the thickness of the boundary layer found at nozzle wall surfaces during operation is not great, which allows for a well performing combustor with essentially no "flash back" at low power levels including idle conditions. At full power, however, and depending on the type of turbine engine, the nozzle discharge velocity can increase to 100 m/sec for fixed exit flow areas. It has been found that at this higher level of velocity, flame stabilization is difficult to maintain and the flow of the fuel/air mixture will impinge onto adjacent combustor liner walls.

In accordance with the recent invention, as embodied and broadly described herein, the apparatus for premixing fuel and air to provide a fuel/air mixture includes a mixing tube configured for receiving and mixing the fuel and air, the mixing tube having an entrance, an axis, and an exit for discharging a fuel/air mixture. The apparatus also includes a mixture valve associated with the mixing tube exit and including inner and outer valve members that together define an exit flow area. The defined exit flow area includes at least two segmented, substantially opposed, mixture flow-directing area portions with respect to angular position about the mixing tube axis, and at least one of the inner and outer valve members is movable relative to the other valve member to selectively vary the defined exit flow area with respect to time.

Further in accordance with the present invention, as embodied and broadly described herein, the apparatus for combusting fuel and air includes an annular combustion chamber having an axis, and at least one premixer configured to receive fuel and air. The premixer has a venturi for mixing the received fuel and air to form a fuel/air mixture and an exit in fluid communication with the combustion chamber for discharging the fuel/air mixture, the venturi having an axis. The premixer exit further includes inner and outer members defining an exit flow area, and the exit flow area includes area portions configured for channeling the fuel/air mixture in substantially opposed tangential directions relative to the chamber axis. At least one of the inner and outer members is movable along the venturi axis relative to the other to selectively vary the defined exit flow area with respect to time, whereby a mixture discharge velocity can be varied.

Still further in accordance with the present invention, as embodied and broadly described herein, the apparatus for combusting fuel with air, includes an annular combustion chamber having an axis, and at least one premixer configured to receive the fuel and air. The premixer further includes means for mixing the received fuel and air to form a fuel/air mixture, and exit means in fluid communication with the combustion chamber for distributing the fuel/air mixture to the combustion chamber. The exit means further includes means for defining an exit flow area, the exit flow area including area portions for channeling fuel/air mixture flow in substantially opposed tangential directions relative to the combustion chamber axis, and means for selectively varying the defined exit flow area with respect to time.

Yet still further in accordance with the present inventions, as embodied and broadly described herein, the apparatus for premixing fuel and air to provide a fuel/air mixture includes a mixing tube configured for receiving and mixing the fuel and air, the mixing tube having an entrance, an axis, and an exit for discharging the fuel/air mixture; and a mixture valve associated with the mixing tube exit. The mixture valve includes coaxial inner and outer valve members having respective ends that define an exit flow area, and at least the outer valve member end is contoured such that the defined exit flow area includes two opposed exit area portions with respect to angular position about the mixing tube axis. At least said inner valve member is movable relative to the outer valve member to selectively vary the exit flow area with respect to time.

And still further in accordance with the present invention, as embodied and broadly described herein, the apparatus for combusting fuel and air includes an annular combustion chamber having an axis and at least one premixer configured to receive fuel and air. The premixer has a venturi for mixing the received fuel and air to form a fuel/air mixture, the venturi having an axis, and the premixer also has an exit in fluid communication with the combustion chamber for discharging the fuel/air mixture. The premixer exit includes inner and outer members defining an exit flow area, wherein at least the outer valve member is configured to define exit flow area portions positioned for directing the fuel/air mixture in substantially opposed tangential directions relative to the chamber axis. At least said inner member is movable relative to the outer member to selectively vary the defined exit flow area with respect to time, whereby a mixture discharge velocity can be varied.

In accordance with the present invention, as embodied and broadly described herein, the method for controlling the velocity and direction of a fuel/air mixture discharged from a premixer apparatus, the apparatus having a fuel/air mixing tube flow-connected to respective sources of fuel and compressed air, an axis, and an exit for discharging the fuel/air mixture, includes providing a mixture valve associated with the exit including inner and outer valve members together defining an exit flow area; channeling the discharged fuel/air mixture in at least two opposed directions relative to angular position about the axis using the mixture valve; and moving at least one of the inner and outer valve members relative to the other to increase or decrease the exit flow area, whereby the channeled fuel/air mixture velocity is respectively decreased or increased.

In accordance with the present invention, as embodied and broadly described herein, the gas turbine gas generator operable with a fuel source includes an air compressor; a turbine; a shaft assembly interconnecting the air compressor and the turbine; and a combustor operatively connected to provide combustion gases to the turbine. The engine further includes one or more premixers each having a mixing tube configured for receiving and mixing the fuel and air, the mixing tube having an axis and an exit for discharging a fuel/air mixture, and a mixture valve associated with the mixing tube exit and including inner and outer valve members that define an exit flow area. The defined exit flow area includes at least two segmented, substantially opposed area portions with respect to angular position about the mixing tube axis, and the segmented area portion includes ports for directing the discharged fuel/air mixture relative to the mixing tube axis. At least one of said inner and outer valve members is movable relative to the other valve member to selectively vary the defined exit flow area with respect to time.

Other advantages of the invention will be set forth in part in the description which follows, and in part will be apparent from the description, or may be learned by the practice of the invention. The advantages of the invention may be realized and attained by means of the instrumentalities and combinations particularly pointed out in the appended claims.

BRIEF DESCRIPTION OF THE DRAWINGS

The accompanying drawings, which are incorporated in and constitute part of the specification, illustrate a preferred embodiment of the invention and, together with a description, serve to explain the principles of the invention.

In the drawings:

FIG. 8A is a schematic cross-section of the premixer assembly taken along line 8A—8A of FIG. 8;

FIG. 9A is a schematic cross-section of a variation of the premixer assembly shown in FIG. 9 using a cylindrical air valve.

FIG. 16 is a schematic cross-section of a gas turbine engine module having a mixture valve to control premixer exit velocity made in accordance with the present invention;

FIG. 17B is a schematic detail cross-section of an alternate mounting configuration for the embodiment of FIG. 16;

FIGS. 21C and 21D are schematic cross-sections of a portion of a variation of the combustor and premixer embodiment shown in FIGS. 21A and 21B.

DESCRIPTION OF THE PREFERRED EMBODIMENTS

Reference will now be made to the present preferred embodiments of the invention, which are illustrated in the accompanying drawings. Specifically, the embodiments of the present invention are shown in FIGS. 19 through 21A–D which show gas turbine engines with premixers having variable geometries for control of the mixture exit velocity and distribution within a combustor. However, a review of related predecessor gas turbine engine and premixer combustor systems will facilitate a better understanding and appreciation for the present invention.

Figures 1A, 1B:
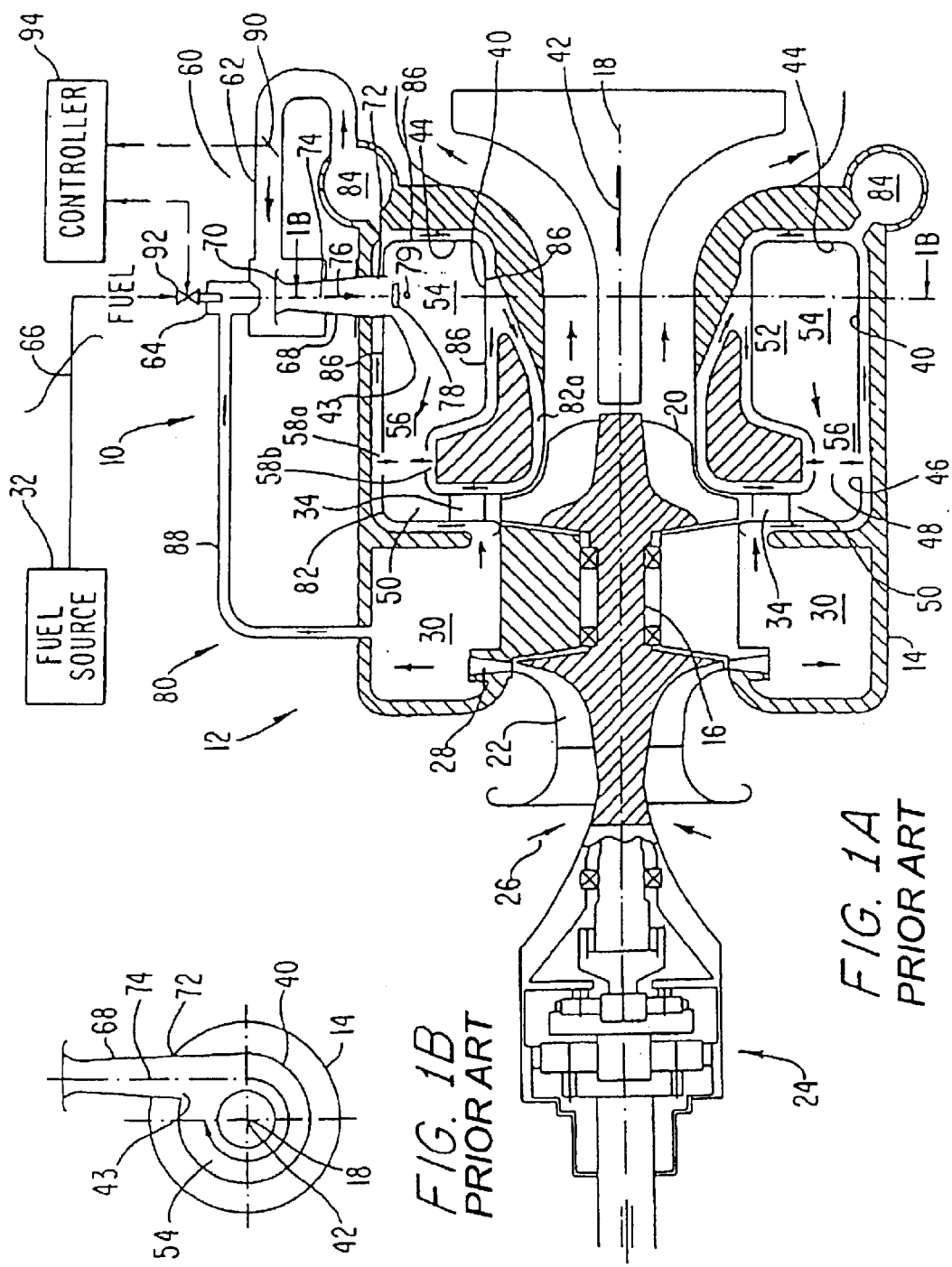
FIG. 1A is a schematic cross-section of a predecessor gas turbine engine module utilizing a single stage combustor system having controlled fuel/air ratio.
FIG. 1B is a schematic end view of the apparatus shown in FIG. 1A taken in the direction AA in FIG. 1A.

With initial reference to FIG. 1A, there is shown a predecessor combustor system of the present inventor, which system includes aspects of the present invention and is designated generally by the numeral 10. System 10 is depicted as being used in conjunction with radial gas turbine engine module 12. Gas turbine engine module 12 included a pressure housing 14 within which was mounted shaft 16 rotatable about axis 18. Mounted on one end of a shaft 16 was radial turbine 20 for driving centrifugal compressor 22 mounted at the opposed end of shaft 16. In the configuration depicted in FIG. 1A, gas turbine engine module 12 power is taken out through a mechanical coupling arrangement shown generally at 24 adjacent centrifugal compressor 22. However, the combustor system of the present invention like the configuration in FIG. 1A can be utilized in a gas generator in association, e.g., with a "free power turbine" (see FIG. 5A), a "free-jet" propulsion unit (not shown), or any other turbine engine system version as one skilled in the art would immediately realize. Also, the present invention is not limited to use in a radial gas turbine engine or gas generator module but, at least in its broadest extent, could be used with axial or mixed axial-radial turbine engine and gas generator modules as well.

With continued reference to FIG. 1A, gas turbine engine module 12 operates generally as follows. Air enters centrifugal compressor 22 in a direction designated by the arrows 26, is centrifugally accelerated to increase its velocity, whereupon it enters diffuser 28 to increase static pressure. The compressed air exiting diffuser 28 is collected in a plenum chamber 30. Thereafter, compressed air from plenum 30 is mixed with fuel from a fuel source 32 by means of premixer 60 of combustor system 10, to be described in more detail hereinafter, to produce hot exhaust gases which flow past inlet guide vanes 34 to radial turbine 20, where power is extracted. The exhaust gases from turbine 20 are ducted to the atmosphere or to a subsequent engine module. In the case of free power turbine arrangement, the gases exiting turbine 20 would be ducted to the free power turbine for extraction of further power.

The combustor system in FIG. 1A included a cylindrical housing defining a combustion chamber, the housing having an axis and having at least one inlet port adjacent one axial chamber end. Importantly, the portion of the chamber adjacent the one axial chamber end comprised a single stage combustion zone. An exhaust was positioned at the opposite axial chamber end, with the portion of the combustion chamber adjacent the opposite axial chamber end comprising a dilution zone. The housing further has aperture means in the form of dilution ports in flow communication with the dilution zone.

With continued reference to FIG. 1A, combustor system 10 included annular combustor liner housing 40 ("housing" or alternatively referred to as a "liner"), which is generally toroidal in shape. Although FIG. 1A is illustrated with an annular housing, a "can-type" cylindrical housing could also be used. Housing 40 is contained within pressure vessel 14 and defines an axis 42 essentially coincident with gas turbine engine module axis 18. Housing 40 is closed at axial end 44 except for inlet port 43, but is open at axial end 46 to form an annular exhaust port (or combustor exit) 48. Exhaust port 48 is in flow communication with radial turbine 20 through channel 50 past inlet guide vanes 34.

With continued reference to FIG. 1A, toroidal chamber 52 defined by housing 40 comprised two generally axial sections with different functions. Section 54 adjacent axial end 44 comprised a single stage combustion zone and section 56 adjacent housing end 46, comprises a dilution zone. A plurality of apertures 58a, 58b was provided in housing 40 opening into dilution zone 56. Dilution ports 58a are a series of apertures formed in the outer peripheral surface of housing 40, while dilution ports 58b are a series of apertures formed in an inner peripheral surface of housing 40, relative to housing axis 42. The aperture means generally comprising dilution ports 58a, 58b provided for the introduction of compressed air into the dilution zone 56 of combustion chamber 52 from compressed air conduit means which will be described in more detail hereinafter. However, dilution apertures need not be placed in both inner and outer walls of the combustion liner. For example, aperture 58a may be eliminated if apertures 58b are used and sized to accommodate the entire dilution flow rate.

At least one fuel/air premixer disposed outside the cylindrical housing was provided for mixing a portion of the compressed air flow with fuel to provide a fuel/air mixture and delivering the mixture to the combustion zone through the inlet port. The fuel/air premixer included means for receiving the compressed air, means for receiving the fuel and also chamber means for flow-smoothing the received compressed air and for mixing the received compressed air and fuel. With continued reference to FIG. 1A, combustion system 10 further included a single fuel/air premixer designated generally by the numeral 60. Premixer 60 includes housing assembly 62 for receiving the compressed air from conduit means which will be described in more detail hereinafter, and a single fuel nozzle 64 for receiving fuel from fuel source 32 via fuel line 66. Fuel nozzle 64 depicted in FIG. 1A is an "air-blast" type fuel nozzle especially advantageous for use with liquid fuel to provide atomization and thus enhance vaporization. However, use of an "air blast" nozzle with gaseous fuel can provide benefits in terms of providing an initial mixing of the fuel with air prior to admission to the venturi element which will be described hereinafter. Therefore, the combustion system of FIG. 1A was, like the present invention, not restricted to the use of liquid fuel or an "air-blast" fuel nozzle, but gaseous fuel and other types of fuel nozzles, such as swirling-type nozzles, can be used as well.

Fuel/air premixer 60 further included mixing chamber means in the form of venturi 68 having venturi inlet 70 disposed within fuel/air premixer housing assembly 62 and venturi exit 72 connected to inlet port 43. Venturi 68 defines a flow axis 74, and fuel nozzle 64 is positioned to deliver a fuel spray into venturi inlet 70 substantially along axis 74. The cross sectional flow area and dimensions of venturi 68 are chosen to provide vigorous and complete mixing of the fuel and compressed air within the venturi chamber and a directed flow of the resulting mixture along venturi axis 74 to combustion zone 54, such as indicated schematically by arrow 76. The flow area of venturi exit 72 should be chosen such that minimum velocities of the mixture (i.e., during idle) are greater than the flame propagation speed of the fuel/air mixture. Flame holder means such as depicted schematically as 78 may be provided proximate venturi exit 72 to enhance the stability of combustion in combustion zone 54.

As best seen in FIG. 1B, mixing venturi 68 is disposed such that venturi axis 74 is oriented substantially tangentially with respect to housing axis 42 such that the incoming fuel/air mixture is caused to swirl about axis 42 within the combustion zone 54. It has been found using the premixer construction to be described in more detail henceforth that combustion chamber 52 can be adequately fed by using only a single fuel/air premixer fed by a single fuel nozzle. As in FIGS. 1A and 1B, the present invention contemplates the possible use of multiple fuel/air premixers, particularly for situations wherein the radial "thickness" of combustion chamber 52 is small relative to the outer radius thereof, as measured from axis 42.

The combustor system included an ignitor disposed on the cylindrical liner housing at a location adjacent the intersection of the flow axis of the venturi. With continued reference to FIG. 1B, ignitor 79 is positioned near the intersection of flow axis 74 and housing 40, and extends at most only a short distance into combustion zone 54. Ignitor 79 is thus ideally positioned to intercept the fuel/air mixture emanating from premixer 60 to initiate combustion. Once started, the swirling hot combustion gases in zone 54 provided auto ignition of the fuel/air mixture and ignitor 79, which was electrical, is normally shut off.

In the predecessor combustion systems, compressed air conduit means were provided interconnecting the compressor exit and the fuel/air premixer for delivering a portion of the compressed air flow to the premixer compressed air receiving means and for delivering essentially the remaining portion of the compressed air flow to the aperture means for providing dilution air to the dilution zone. With continued reference to FIG. 1A, compressed air conduit means designated generally by the numeral 80 includes generally annular passageway 82 disposed between pressure housing 14 and housing 40. Passageway 82 extends between compressed air receiving plenum 30 and a ring-shaped plenum 84 and is formed as part of pressure vessel 14 adjacent the turbine exhaust section. Fuel/air premixer housing assembly 62 is connected to receive compressed air from plenum 84 for eventual communication to the venturi inlet 70 as explained previously. Plenum 84 is shown having a circular cross section but other shapes, configurations and locations are possible and are considered within the scope of the present invention.

As can be appreciated from the schematic in FIG. 1A, passageway 82 is configured such that the compressed air flowing therein provides cooling for housing 40, particularly housing portion 86 immediately surrounding the combustion zone 54 where the highest combustion temperatures are expected. Portion 86 of housing 40 is constructed for convection cooling only, with no film-cooling necessary. That is, in portion 86 of housing 40, the housing acts to seal off the compressed air flowing in passageway 82 from the fuel/air mixture being combusted in combustion zone 54. This construction provides for control of the fuel/air ratio of the mixture in combustion zone 54 and permits operation as a "single stage combustor" with a desired lean fuel/air ratio. Such an operation can yield low levels of $NO_x$ and unburned fuel and fuel by-product levels. As will be discussed henceforth, the particular construction of the combustor system permits extraordinarily low levels of $NO_x$ in comparison with other state of the art combustion systems.

Passageway 82 essentially envelopes combustion chamber 52 to provide convection cooling and also to supply compressed air to dilution ports 58a and 58b. Passageway 82 also may include a channel 82a for channeling compressed air flow for cooling the portion of the pressure vessel 14 adjacent turbine 20, as is shown in FIG. 1A. Turbine inlet guide vanes 34 may be film cooled inlet guide vanes and may be fed from passageway 82 or 82a. Also, compressed air conduit means 80 can include a separate passageway 88 interconnecting the compressed air receiving plenum 30 and air-blast fuel nozzle 64 when such a nozzle is used, particularly with liquid fuel operation.

As would be understood from the foregoing discussion in conjunction with FIG. 1A, compressed air conduit means 80 acts to channel a portion of the compressed air flow to the fuel/air premixer 60 and to channel essentially the remaining portion of the compressed air flow to the dilution ports 58a and 58b. The compressed air flow not channeled to either the fuel/air premixer or the dilution ports, namely the air used to cool the inlet guide vanes 34, is very small and in any event does not disturb the fuel/air ratio in the combustion zone but merely results in a small further dilution of the exhaust gases prior to entry into turbine 20.

Further, valve means are disposed in the compressed air flow path for determining the compressed air flow rate to the premixer. The compressed air valve means is especially important where the speed of the compressor, and thus the volumetric flow rate of compressed air, is essentially independent of the fuel flow rate, such as the application depicted in FIG. 1A. As embodied herein and with continued reference to FIG. 1A, valve 90 is positioned in fuel/air premixer housing assembly 62 for determining the rate of compressed air flow from plenum 84 to venturi inlet 70. Valve 90 is continuously adjustable, and a suitable construction of valve 90 will be discussed in more detail hereinafter in relation to the description of one preferred construction of the fuel/air premixer of the present invention. When the valve opening changes, the pressure drop over the premixer changes, resulting in an increase or decrease of air mass flow to the dilution zone. Thus, this variation and dividing of the air flow happen outside the combustor proper.

Figure 2:
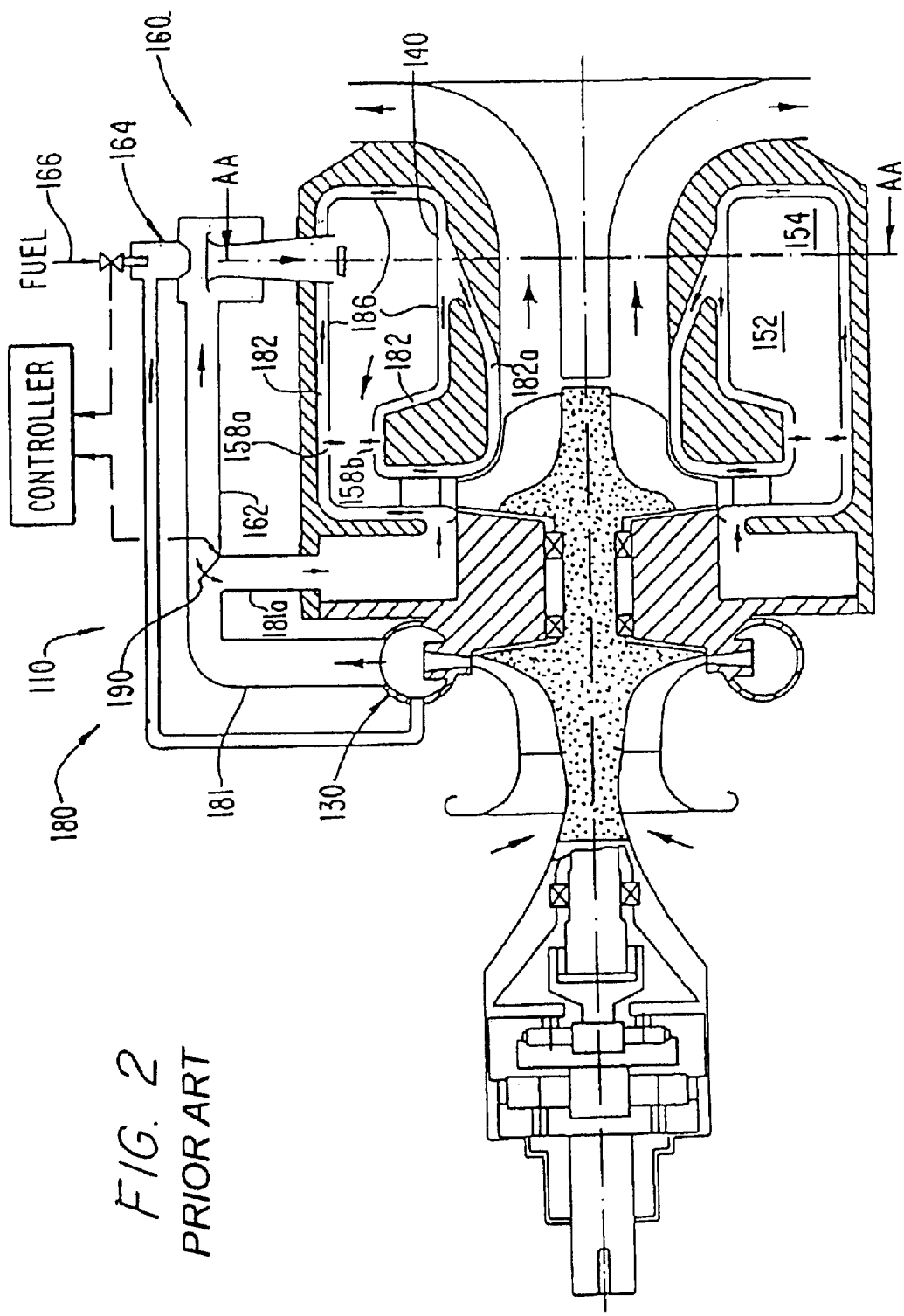
FIG. 2 is a schematic cross-section of a predecessor gas turbine engine module with an alternative version of the combustor system shown in FIG. 1A.

FIG. 2 discloses combustor system 110 having an alternate configuration for the compressed air conduit means. Components having the same or similar function relative to the embodiment in FIGS. 1A, 1B are given the same numeral but with a "100" base. In the compressed air conduit means designated generally as 180 in FIG. 2, a distribution conduit 181 is provided between compressed air collection plenum 130 and annular passageway 182 surrounding housing 140, and fuel/air premixer housing assembly 162 is directly connected to distribution conduit 181 upstream of passageway 182. Valve 190 is disposed at the connection between fuel/air premixer housing assembly 162 and distribution conduit 181 to positively divide the air flow into a first portion flowing to fuel/air premixer 160 and the remainder to passageway 182 via distribution conduit portion 181a. As compared with the construction in FIG. 1A, where substantially all of the compressed air portion flowing to the premixer was first used to cool at least a part of liner housing portion 86 defining combustion chamber 52, none of the compressed air portion flowing to fuel/air premixer 160 is used to cool portions 186 of housing 140 defining combustion zone 152. However, the FIG. 2 embodiment does allow for the direct control of the compressed air fractions flowing to the fuel/air premixer versus the compressed air flow fraction flowing to the dilution ports 158a and 158b. The configuration shown in FIG. 1A may be preferred nonetheless because of an ease of construction in assembly of the various components, principally the fuel/air premixer wherein the valve can be integrated directly with the fuel/air premixer housing, as will be discussed in more detail henceforth.

Further in accordance with the predecessor combustor system, fuel conduit means was provided interconnecting the fuel supply and the premixer fuel receiving means, the fuel conduit means together with the premixer fuel receiving means establishing a flow path for all the fuel to the premixer. Fuel valve means is disposed in the fuel flow path for determining the fuel flow rate therein. With reference again to FIG. 1A, fuel line 66 interconnects fuel source 32 with fuel nozzle 64. Fuel valve 92 is disposed in fuel line 66 immediately upstream of fuel nozzle 64, which is depicted as being an "air-blast" type fuel nozzle particularly suitable for use with liquid fuels, as stated previously.

Still further, the combustor system of FIGS. 1A and 1B includes controller means operatively connected both to the compressed air valve means and the fuel valve means for essentially controlling the respective flow rates of the compressed air portion and the fuel delivered to the premixer to provide a preselected lean fuel/air ratio mixture through the inlet port to the combustion zone. As depicted schematically in FIG. 1A, controller 94 which can be either mechanical or electric (e.g., a microprocessor) is interconnected with compressed air valve 90 to essentially control the flow rate of the compressed air flowing directly to venturi inlet 70. While a small portion (typically 5% or less), of the total compressed air flowing to fuel/air premixer 60 can travel through conduit 88 when an "air-blast" nozzle is utilized, the control provided by valve 90 of the remaining 95+% of the compressed air flow is expected to achieve adequate overall fuel/air ratio control. Moreover, for situations utilizing gaseous fuel, such as natural gas as provided in the Example to be discussed hereinafter, conduit 88 could be eliminated such that all of the compressed air flow to the fuel/air premixer will be under the control of the compressed air flow valve.

Also as depicted in FIG. 1A, controller 94 is operatively connected to fuel valve 92 to meter the fuel flow to fuel nozzle 64. As one skilled in the art would appreciate, controller 94 can act to control both the fuel flow and the compressed air flow to fuel/air premixer 60 to achieve a single preselected fuel/air ratio mixture over the entire operating range of the gas turbine engine module so that the mass flow of the combustible mixture would change as a function of the load. Or, alternatively, controller 94 can be configured to provide a sequence of preselected fuel/air ratio mixtures as a function of load. One skilled in the art would be able to select and adapt a suitable controller for a particular application based on the present disclosure and the general knowledge in the art.

In operation, and with reference to FIGS. 1A and 1B, compressed air from compressed air receiving means 30 is channeled via passageway/envelope 82 over the outside surface of housing 40 for cooling housing 40, and particularly portions 86 which surround combustion zone 54. A portion of the compressed air flowing in passageway 82 is admitted to plenum 84 and then flows to fuel/air premixer 60 via the interconnection between fuel/air premixer housing assembly 62 and 84 as controlled by compressed air valve 90 via controller 94. In venturi 68, the compressed air portion is mixed with the fuel from fuel nozzle 64, possibly with a small additional portion of compressed air if nozzle 64 is a "air-blast" type nozzle, and is injected along the venturi axis 74 through inlet port 43 and into combustion zone 54 of combustion chamber 52.

As shown in FIG. 1B, swirling flow and combustion is provided in combustion zone 54 by locating venturi axis 74 tangentially with respect to axis 42 of the housing. The direction of orientation of the venturi axis 74 is chosen to give a specific angular direction (clockwise or counterclockwise) with respect to the direction of rotation of the turbine in order to provide some aerodynamic unloading of the inlet guide vanes. For the configuration depicted in FIG. 1A and 1B where the fuel/air mixture is admitted to achieve a clockwise swirling combustion in combustion zone 54 as viewed in the direction AA, the direction of rotation of turbine 20 also would be in the clockwise direction. After combustion of the fuel/air mixture in zone 54, the hot exhaust gases pass to dilution zone 56 where dilution air from dilution ports 58a, 58b reduce the average temperature of the exhaust before it is ducted via channel 50 past inlet guide vanes 34 to turbine 20 for work-producing expansion.

The control of combustion afforded by combustion system 10 as well as in accordance with the present invention through the complete mixing of the fuel and air outside the combustion chamber in the fuel/air premixer, including complete vaporization of the fuel if liquid fuel is used, together with the control of the fuel/air ratio of the mixture delivered to the combustion chamber allows for significant reductions in $NO_x$ levels and the levels of unburned fuel and fuel byproducts, as mentioned earlier. Furthermore, the utilization of essentially the total amount of compressed air flow to either combust the fuel or to dilute the exhaust gases upstream of the turbine provides considerable reduction of peak combustor temperatures resulting in longer life for combustor liners compared to conventional combustor designs.

Figure 3A:
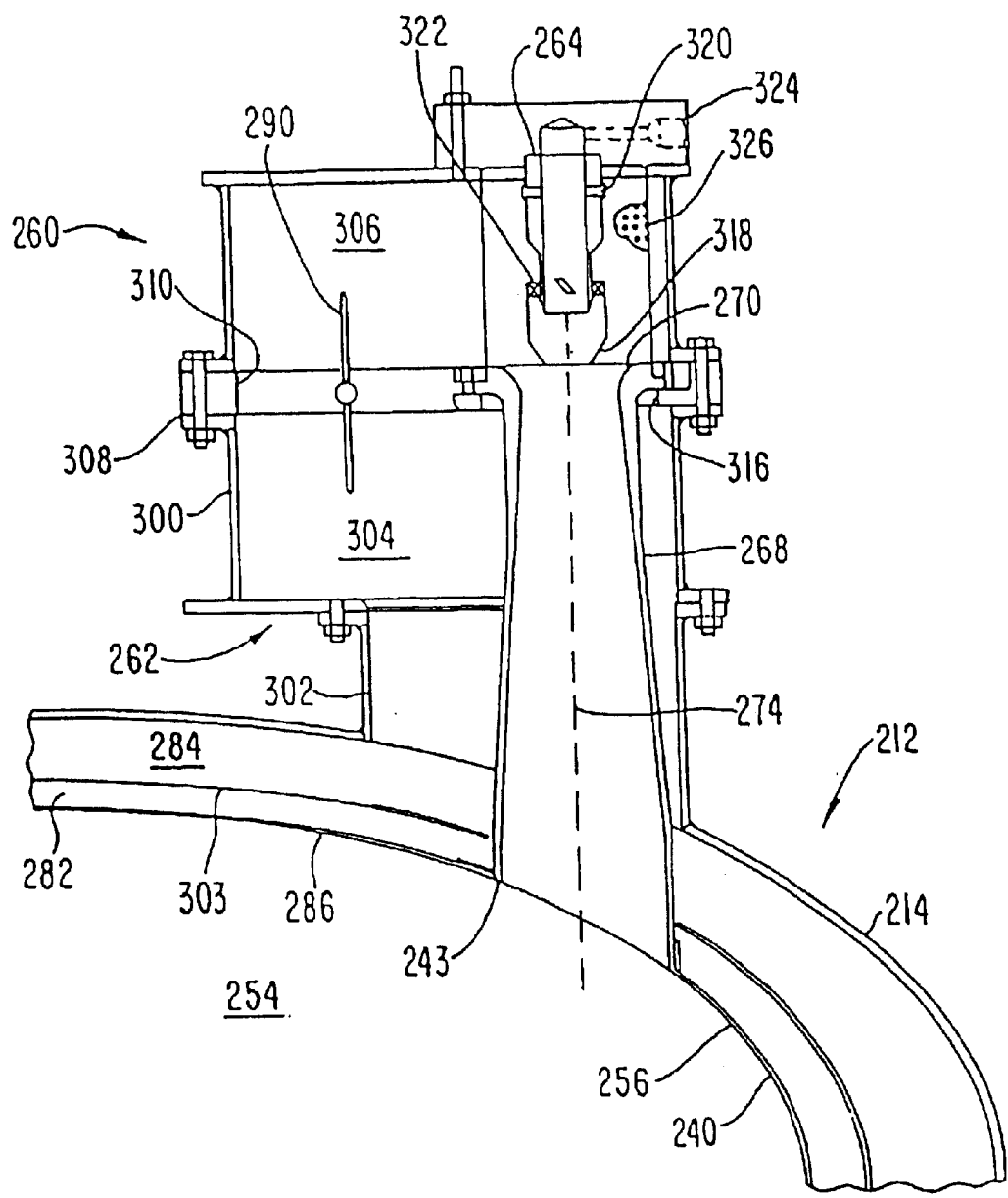
FIGS. 3A–3C are detailed cross-sectional views of a test version of the preferred fuel/air premixer component of the apparatus shown in FIG. 1A.

As previously mentioned, the fuel/air premixer of the FIGS. 1A and 1B constructions, as well as the preferred premixer of the present invention, includes a compressed air receiving means, a venturi having an inlet operatively connected to the compressed air receiving means with air flow smoothing means, a fuel receiving means including a nozzle with an exit positioned to deliver a spray of fuel into the venturi inlet substantially along the venturi axis, and valve means associated with the compressed air receiving means for determining the compressed air flow rate to the venturi inlet. With reference to FIG. 3A, fuel/air premixer 260 includes air receiving means in the form of housing assembly 262. Components having a like or similar function to those disclosed in the embodiments of FIGS. 1A and 1B will be designated by the same numeral but with a "200" base. Housing assembly 262, in turn, includes housing 300 and housing support 302 for mounting housing 300 on pressure vessel 214 of gas turbine engine module 212. Housing support 302 is hollow and, in addition to supporting housing 300 and the components contained therein, acts to channel compressed air from plenum 284 to housing 300. In the construction shown in FIG. 3A, cooling shroud member 303 is positioned between combustion chamber liner housing 240 and pressure vessel 214 for establishing the flow path 282, at least in the vicinity of portions 286 of housing 240 that define the boundary of the combustion zone 254. Shroud member 303 also defines with pressure vessel 214, plenum 284 for collecting the compressed air portion for eventual transmission to housing 300 via housing support 302.

With continued reference to FIG. 3A, fuel/air premixer housing 300 is divided into upstream and downstream compartments 304, 306 respectively by divider plate 308. Aperture 310 is provided in divider plate 308, and a butterfly-type valve plate 290 is mounted for rotation in aperture 310. In the FIG. 3A embodiment, he orientation of valve plate 290 in aperture 310 is controlled through control arm 312 (see FIG. 3B) to provide a selective degree of obstruction and, hence, pressure drop. In the orientation of valve plate 290 shown in FIGS. 3B and 3C, a minimum amount of obstruction occurs with valve plate 290 being oriented perpendicular to the divider plate 308, corresponding to a "zero" setting of the angular calibration plate 314 shown in FIG. 3C. A position of control rod 312 corresponding to either "9" position on indicator 314 would result in the greatest amount of obstruction and pressure drop in the compressed air portion flowing through aperture 310. As one skilled in the art would realize, the degree of obstruction and thus control of the compressed air flow between upstream compartment 304 and downstream compartment 306 could be varied by changing the angular orientation of control rod 312 between the "zero" and "9" positions, thereby controlling the compressed air flow rate to the balance of the fuel/air premixer 260 which will now be described in more detail.

Divider plate 308 includes an additional aperture 316 in which is mounted inlet 270 of venturi 268. Venturi inlet 270 is configured and mounted to divider plate 308 such that a smooth transition exists between the upper planar surface of divider plate 308 and the inner surface of venturi inlet 270. Venturi 268 extends through upstream housing compartment 304, housing support 302, past pressure vessel 214, combustion chamber liner 303, and connects to housing 240 at the location of inlet port 243. As described previously in relation to the embodiment depicted in FIG. 1A, the venturi axis 274 which corresponds generally to the flow direction of the fuel/air mixture in venturi 268 is oriented to provide a substantially tangential admission direction with respect to the axis (not shown) of annular combustion chamber housing 240.

With continued reference to FIG. 3A, fuel nozzle 264 is mounted in downstream compartment 306 with the fuel nozzle exit 318 positioned to deliver a spray of fuel into venturi inlet 270 along venturi axis 274. Fuel nozzle 264 is of the "swirling" spray type which utilizes ports 320 and swirl vanes 322 to channel some of the compressed air swirl the fuel entering through fuel port 324 before releasing the fuel spray through exit 318. Also shown in FIG. 3A is perforated flow-smoothing element 326 positioned in the downstream compartment 306 and surrounding fuel nozzle exit 318 and venturi inlet 270, to avoid uneven velocities and separation in the venturi which otherwise could result in "flame holding" in the venturi. While a small pressure drop is introduced by its incorporation, the perforated element 326 has been found to provide increased stability for the compressed air flow from downstream compartment 306 past the fuel nozzle 264 and into venturi inlet 270, without any separation at the lip of venturi inlet 270.

Figure 3B:
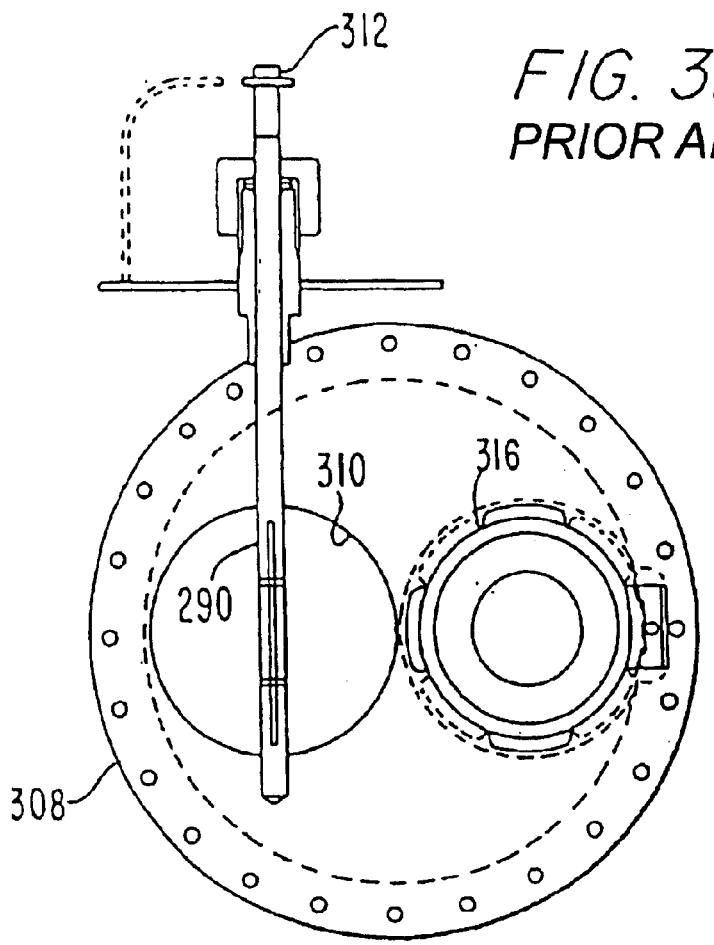
Figure 3C:
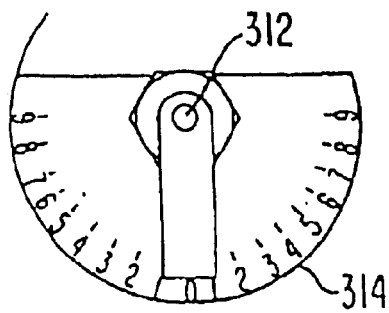
Figure 4:
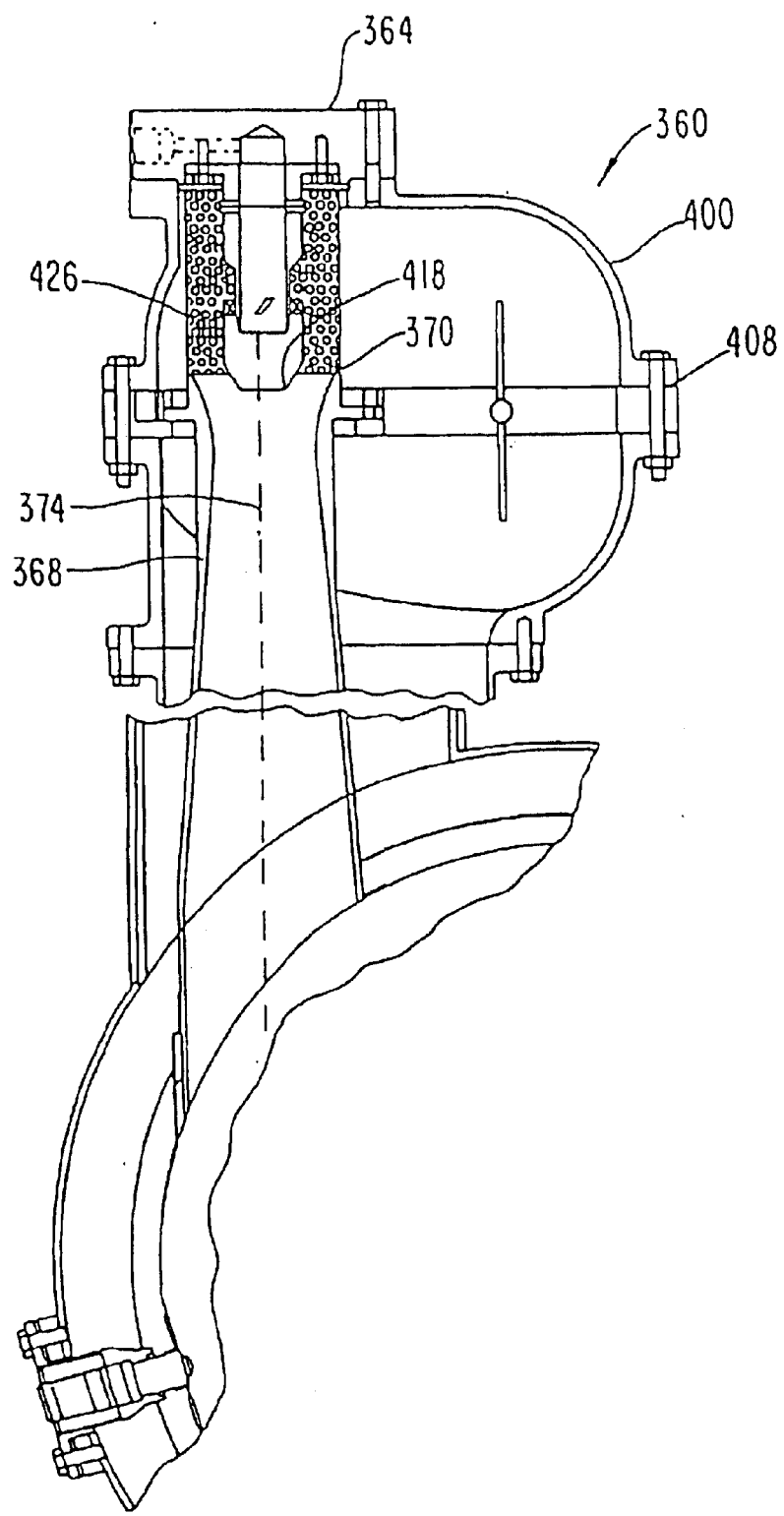
FIG. 4 is a detailed cross-sectional view of an engine version variation of the fuel/air premixer shown in FIGS. 3A–3C.

FIG. 4 shows a variation of the preferred fuel/air premixer depicted in FIGS. 3A–3C, which variation is designated generally by the numeral 360. Components having the same or similar function to those described in relation to the FIG. 1A, 1B embodiment are given the same numerals but with "300" base. Fuel/air premixer 360 includes a venturi 368 which has inlet 370 which extends slightly above the surface of divider plate 408. Also, fuel nozzle exit 418 extends a distance into venturi inlet 370. One skilled in the art would realize that the optimum performance of the fuel nozzle 364 in conjunction with the venturi 368 (as well as nozzle 264 and venturi 268 in the variation shown in FIGS. 3A–3C) may vary from application to application and that the positioning of fuel nozzle exit 418 along the venturi axis 374 in the vicinity of venturi inlet 370 may be adjusted to determine the optimum position. However, it is anticipated that perforated screen element 426 would provide flow stability for the FIG. 4 embodiment as well. Finally, the FIG. 4 embodiment incorporates contemplated refinements in the construction of the fuel/air premixer compared to the construction shown in FIG. 3A, such as the use of integral, bell-shaped housing 400.

Figure 5A:
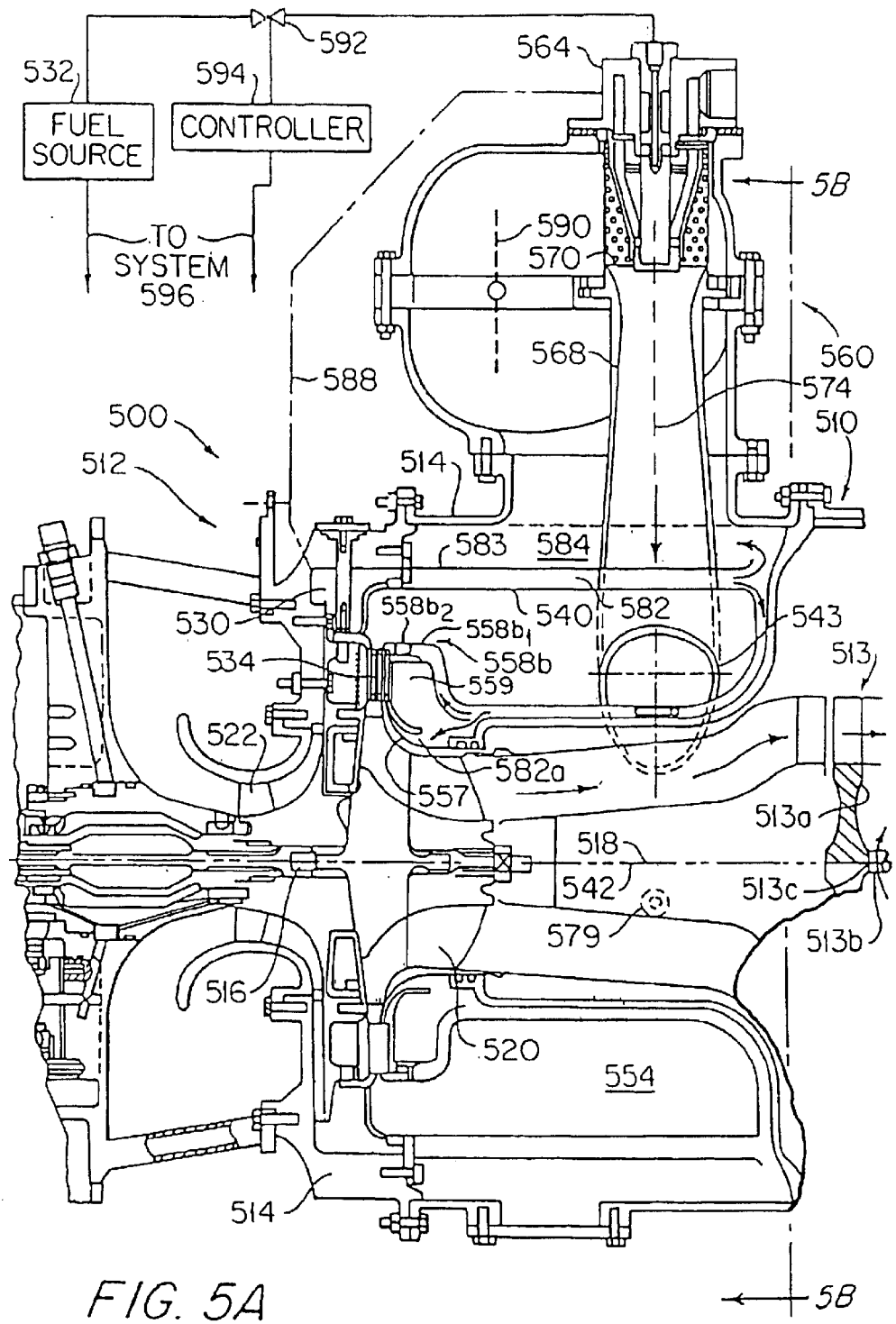
FIG. 5A is a schematic cross-section of another predecessor gas turbine engine module utilizing a single stage combustor system having a controlled fuel/air ratio.

As mentioned previously, the present invention advantageously can be adopted for applications such as gas turbine gas generator modules used in conjunction with free power turbines or free jet propulsion units, which gas generator modules may not require the use of a compressed air flow valve and associated controller functions. FIG. 5A depicts schematically such an engine system constructed in accordance with a predecessor combustion system which includes aspects of the present invention and designated generally by the numeral 500. Engine 500 comprises gas turbine gas generator module 512, including combustor system 510 to be discussed in more detail hereinafter and free power turbine module 513. Free turbine module 513 includes free turbine 513a which is depicted as an axial turbine, but could be pure radial or mixed axial-radial as the application may require. In comparison with the FIG. 1A engine system where power was extracted from gearing 24 connected to shaft 16, power is taken from the engine system 500 in the FIG. 5A embodiment via gearing associated with free turbine shaft 513b. Although shown coaxial with axis 518 of the gas generator module, rotational axis 513c of free power turbine 513 could be angularly displaced to meet the requirements of the overall system 500.

In the subsequent discussion, like components relative to the embodiment in FIG. 1A will be given the identical numeral but with a "500" prefix, for example.

Specifically, gas turbine gas generator module 512 includes a mechanically independent spool, namely centrifugal compressor 522 and radial turbine 520 mounted for dependent rotation on shaft 516, inside pressure housing 514. Thus, shaft 516 can rotate independently of free turbine shaft 513b although gas generator 512 and free turbine module 513 are interconnected in the gas flow cycle. Module 512 also includes combustor system 510 with combustor liner housing 540 which is contained within pressure housing 514 and which receives premixed air/fuel from external premixer 560 through inlet port 543 along venturi axis 574. Venturi axis 574 is oriented tangentially with respect to axis 542 of annular combustor liner housing 540 to provide efficient, swirling combustion and also to partially unload inlet guide vanes 534, as discussed previously in relation to the FIG. 1A embodiment. See FIG. 5B.

Figure 5B:
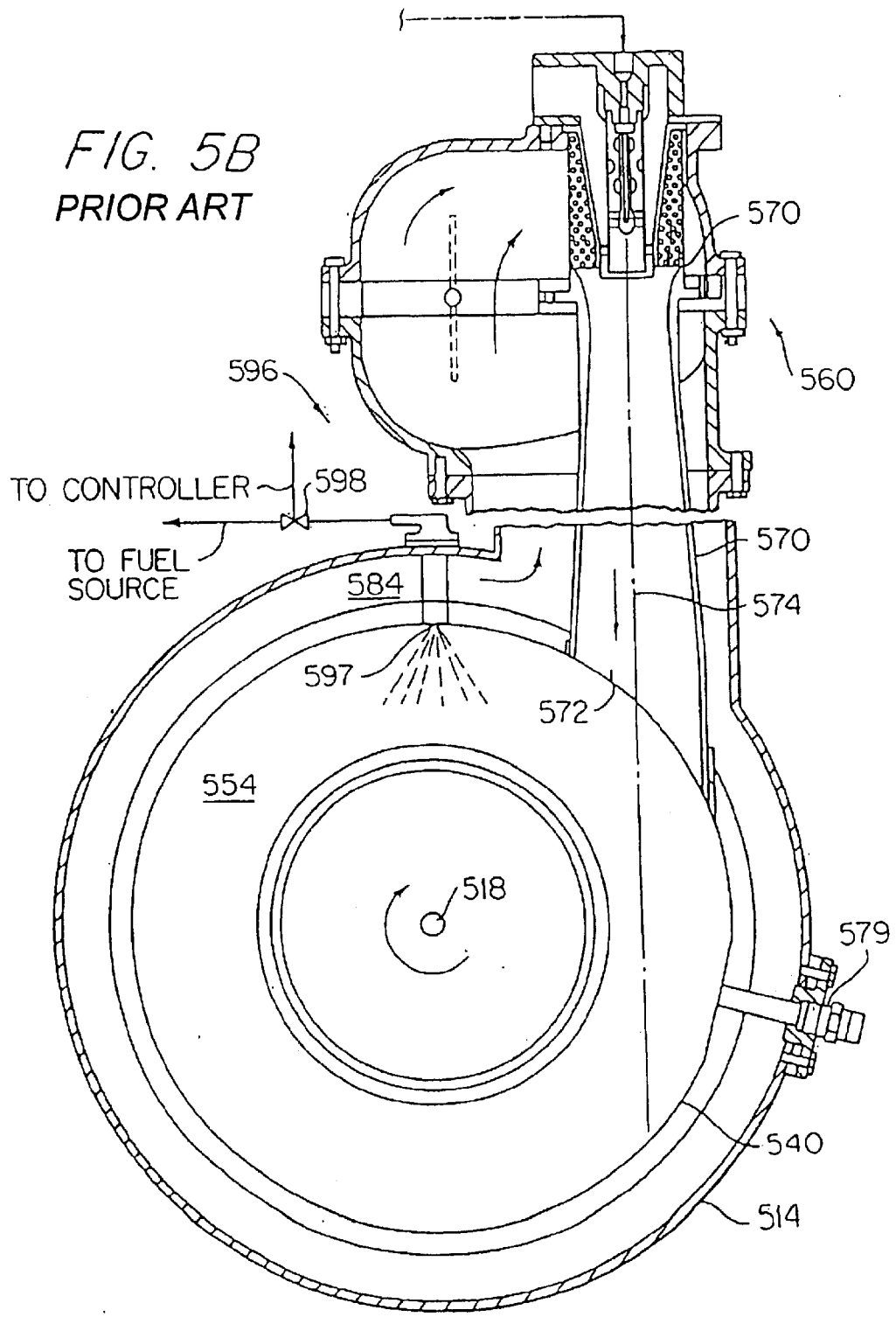
FIG. 5B is a schematic cross-section of the premixer assembly of FIG. 5A taken along line 5B—5B.

FIG. 5B also depicts a position of ignitor 579 on liner housing 540 adjacent the intersection of venturi axis 574. While it may eventually be possible to locate the ignitor in a relatively cooler environment, such as in the premixer, and thereby prolong ignitor life and further decrease the number of penetrations in liner housing 540, the location depicted in FIG. 5B is useful where it is necessary to ensure light-off because of the low velocities of the fuel/air mixture in the annular chamber.

In the construction depicted in FIGS. 5A and 5B, housing liner 540 and pressure housing 514 cooperate to form passages for the compressed air flow from compressor plenum 530. Also included in this engine is annular cooling shroud 583 disposed between, and radially spaced from both, housing liner 540 and the circumferentially adjacent portion of pressure housing 514. As can be appreciated from the figures, cooling shroud 583 and housing liner 540 cooperate to form part of the passageway 582 for convectively cooling the combustor chamber defined by liner 540 while cooling shroud 583 and pressure housing 514 cooperate to form annular plenum 584 to collect the portion of the compressed air flow to be channeled to premixer 560 for mixing with the fuel. In the FIG. 5A embodiment, as in the embodiment shown in FIG. 1A, a portion of the compressed air is taken from the passageway leading from the compressor exit after providing convective cooling and is then channeled to the premixer for mixing with fuel, but the FIG. 5A arrangement can be made more structurally compact than the ring-shaped plenum 84 in FIG. 1A. Furthermore, cooling shroud 583 provides radiation shielding of the adjacent parts of pressure housing 514 from the relatively hot liner housing 540, allowing the use of less expensive materials and increasing the service life of the pressure housing.

The balance of the compressed air flow in passageway 582 is channeled through dilution apertures 558b. There are no dilution ports corresponding to the ports 58a in the FIG. 1A embodiment, but dilution ports 558b include two separate circumferential port sets $558b_1$ and $558b_2$. Divider 559 and the sizing of ports $558b_1$ and $558b_2$ causes dilution air flowing through ports $558b_2$ to first flow through passageway $582a$ past turbine shroud 557. One skilled in the art would be able to perform the required sizing analysis to provide adequate distribution of the dilution air to achieve desired turbine shroud cooling. The elimination of film cooling provides for control over the fuel/air ratio in the combustion zone 554 and is one of the highly significant benefits and advantages of the present invention, as explained previously.

FIG. 5A also shows (in dotted line) conduit 588 leading from compressor exit plenum 530 to premixer 560 in the event "air-blast" type liquid fuel nozzle is utilized, for reasons explained previously. Although shown penetrating compressor plenum-exit 530 axially inclined in FIG. 5A for clarity, the inlet to conduit 588 would be tangential and in the axial plane of the compressor exit to capture the total dynamic head. One skilled in the art would be able to design an appropriate inlet configuration given the present description.

Aside from the small amount of compressed air that may be required to operate an air blast-type liquid fuel nozzle and, possibly, for inlet guide vane cooling, all of the compressed air is used to convectively cool at least part of liner housing 540 before being used for mixing with the fuel or for dilution. This construction optimizes the convective cooling capacity of the compressed air inventory. Although not shown, the present invention is also intended to include a gas generator variation corresponding to the FIG. 2 embodiment where the compressed air flow portion used for mixing with the fuel is not first used for convective cooling. The simplified construction of such a system might outweigh the reduction in cooling capacity and therefore be desired for certain applications.

As depicted in FIG. 5A, air is channeled from passageway 582 through annular plenum 584 for mixing directly with the fuel in premixer 560. FIG. 5A depicts compressed air valve 590 by broken lines to indicate that the valve is optional. It may be used for "fine tuning" the fuel/air ratio during operation, it may be preset to a fixed opening for operation, or it may be eliminated entirely, for the following reason. In engine system 510, the speed of compressor 522 and thus the compressed air flow rate is essentially proportional to the fuel flow over the operating range. Hence, gross control of the fuel/air ratio to a preselected lean value can be achieved automatically. The function of controller 594 acting to control fuel flow to fuel nozzle 564 from source 532 through fuel valve 592 thus becomes similar to that of a conventional throttle responsive to power demands.

While premixer 560 channels all the fuel/air mixture to combustion zone 554 required over the intended operating range of engine system 510, an auxiliary fuel supply system such as system 596 depicted in FIG. 5B may be used to provide a richer mixture for start-up and idle conditions. System 596 includes a conventional fuel spray nozzle 597 fed from fuel source 532 (see FIG. 5A), and the auxiliary fuel flow rate can be controlled by controller 594 through valve 598. In the disclosed construction, spray nozzle 597 is positioned to penetrate liner housing 540 adjacent venturi outlet 572 and disposed radially. However, nozzle 597 can be positioned in an opposed tangential orientation relative to venturi 570 (not shown) to enhance mixing with the fuel/air mixture entering through venturi 570. Other positions, constructions and orientations of spray nozzle 597 are, of course, possible and are considered to fall within the general teachings herein.

Figure 6:
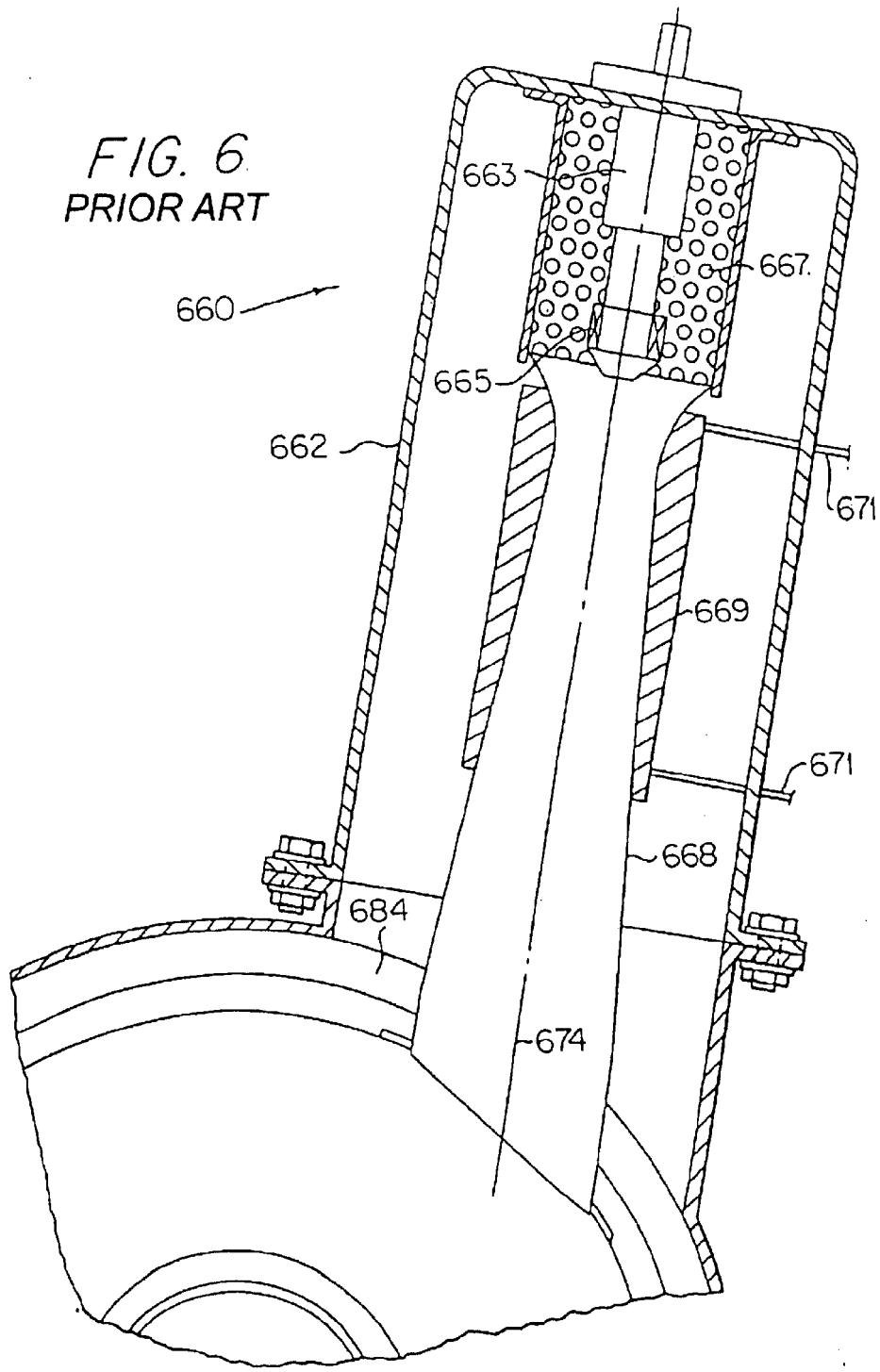
FIG. 6 is a schematic cross-section of an alternative premixer construction without an integrated compressed air flow valve, for use in the gas turbine engine module shown in FIG. 5.

FIG. 6 is a schematic of an alternative "valve-less" premixer design which could be used in engine system 510, and which is designated generally by the numeral 660. Premixer 660 includes housing 662, fuel nozzle 663 which is of the type having peripheral swirl vanes 665, and venturi 668 oriented with venturi axis 674 tangential to the combustor axis (not shown). Also, perforated flow-smoothing member 667 surrounds nozzle 664 and the entrance to venturi 668, for reasons explained previously in relation to the corresponding components in the "valved" embodiment in FIG. 3A. Premixer 660 additionally includes heating means such as electric resistance heater jacket 669 surrounding the throat area of venturi 668 and operatively connected to a power source (not shown) via electrical leads 671. During start up and using liquid fuels, a film of fuel tends to collect on the venturi inner surface. Heater jacket 669 augments vaporization of this fuel film and thus promotes the overall mixing of the fuel and air in the premixer. During operation, the temperature of the compressed air portion flowing past the outer surface of venturi 668 from plenum 684 may provide sufficient heat for vaporizing a liquid film, or prevent the formation of a liquid fuel film altogether, thereby dispensing with the need for continued activation of heating jacket 669.

Figure 7:
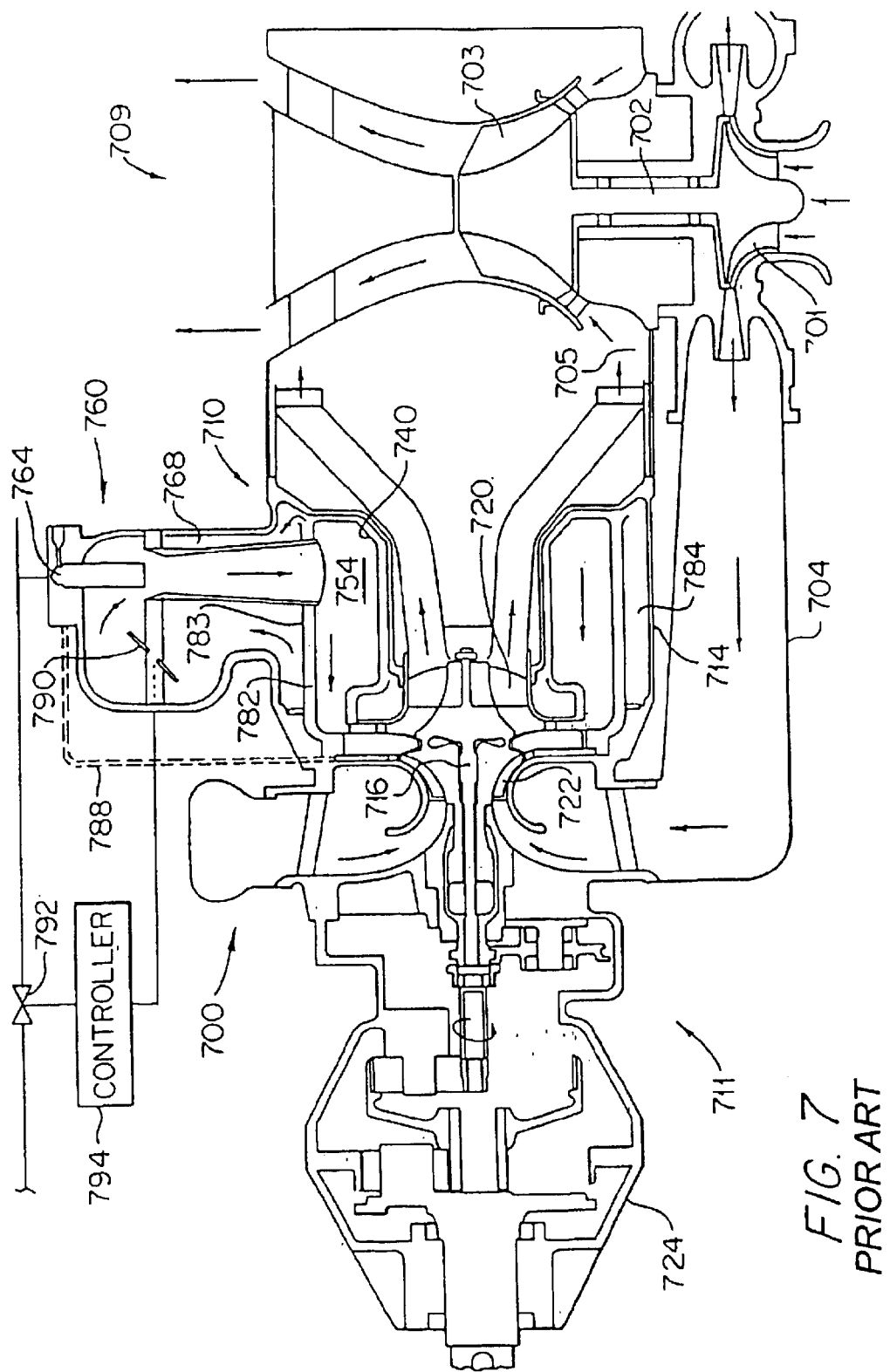
FIG. 7 is a schematic cross-section of yet another predecessor gas turbine engine module having a single stage combustor with controlled fuel/air ratio.

FIG. 7 schematically depicts yet another engine construction that may advantageously utilize the combustor of the present invention, namely, a gas turbine engine system such as described in my previous patent U.S. Pat. No. 5,081,832, the disclosure of which is hereby incorporated by reference. In FIG. 7, engine system 700 includes high pressure spool 711 and mechanically independent low pressure spool 709. Low pressure spool 709 includes low pressure compressor 701 which is driven through shaft 702 by low pressure turbine 703. The compressed air exiting low pressure compressor 701 flows through diffuses 704 and enters high pressure compressor 722 for further compression. As components of high pressure spool 711 high pressure compressor 722 is driven by high pressure turbine 720 via shaft 716. Gases exhausted from high pressure turbine 720 are diffused in diffuser 705 and then expanded in low pressure turbine 703. For reasons explained more fully in U.S. Pat. No. 5,081,832, net power is taken from engine system 700 via gearing 724 connected to shaft 716 of high pressure spool 711. Low pressure spool 709 is used principally to supply pre-compressed air to high pressure spool 711 and possibly to drive engine support systems (e.g., lubrication).

As seen in FIG. 7, engine system 700 includes combustor system 710 to provide hot combustion gases to high pressure turbine 720 by combusting fuel with a portion of the compressed air from high pressure compressor 722. Importantly, combustor system 710 uses external premixer 760 which includes fuel nozzle 764 (which may be an "air-blast" type receiving compressed air directly from compressor 722 via conduit 788 with a tangential inlet-shown dotted) and venturi 768 to supply fully premixed fuel/air tangentially to annular combustion zone 754 defined by liner housing 740. Cooling shroud 783 and liner housing 740 cooperate to define part of convective cooling passageway 782, while cooling shroud 783 and the circumferentially adjacent portion of pressure housing 714 cooperate to form annular plenum 784 to channel a portion of the compressed air to premixer 760. The balance of the compressed air flow is used for additional convective cooling and finally dilution, using a configuration and construction similar to that shown in FIG. 5A.

However, the engine system configuration shown in FIG. 7 is intended for producing power at essentially constant high pressure spool shaft speed. Like the FIG. 1A embodiment, the total compressed air flow rate will not automatically adjust to a changed fuel flow in the manner of gas generator module 512 in the FIG. 5A embodiment. As a result, combustor system 710 specifically includes compressed air valve 790 integrated with premixer 760 and under the control or controller 794, which also controls fuel valve 792, to achieve a preselected lean fuel/air ratio. It is understood that, although not shown, the FIG. 7 embodiment could include features described in relation to the other embodiments, including a liner-mounted ignitor, auxiliary fuel spray system, staged dilution ports, etc.

Figure 8:
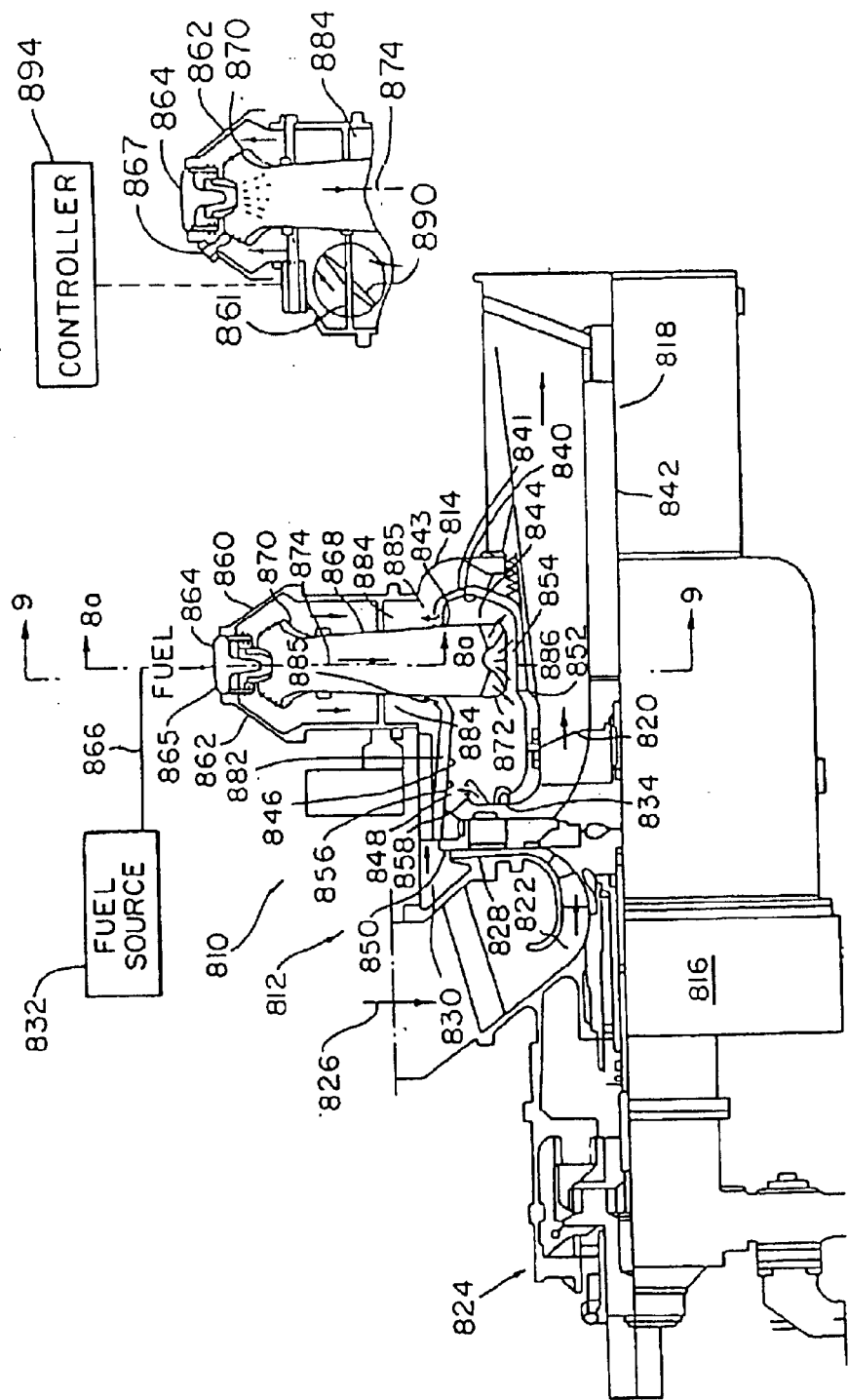
FIG. 8 is a schematic cross-section of yet another predecessor gas turbine engine module having a single stage combustor with controlled fuel/air ratio.

FIG. 8 schematically depicts yet another engine configuration that advantageously utilizes certain aspects of the present invention. With initial reference to FIG. 8, a combustor system is shown and designated generally by the numeral 810. (Note, the upper portion of combustor system 810, like shown in several other figures, is a cut-away view, illustrating the upper cross-sectional half of the system.) System 810 is depicted as being used in conjunction with radial gas turbine engine module 812. Gas turbine engine module 812 includes a pressure housing 814 within which is mounted shaft assembly 816 rotatable about axis 818. Mounted on one end of shaft assembly 816 is radial turbine 820 for driving centrifugal compressor 822 mounted at the opposed end of shaft assembly 816. In the configuration depicted in FIG. 8, power from gas turbine engine module 812 is taken out through a mechanical coupling arrangement shown generally at 824 adjacent centrifugal compressor 822. However, the combustor system of the present invention can be utilized in a gas generator in association e.g., with a "free power turbine," a "free-jet" propulsion unit, or any other turbine engine system version as one skilled in the art would immediately realize. Also, the present invention is not limited to use in a radial gas turbine engine or gas generator module but, at least in its broadest extent, could advantageously be used with axial or mixed axial-radial gas turbine engines and gas generator modules as well.

With continued reference to FIG. 8, gas turbine engine module 812 operates generally as follows. Air enters centrifugal compressor 822 in a direction designated by the arrows 826, is centrifugally accelerated to increase its velocity, whereupon it enters diffuser 828 to increase static pressure. The compressed air exiting diffuser 828 is collected in a plenum 830. Thereafter, a portion of the compressed air from plenum 830 is mixed with fuel from a fuel source 832 by means of premixer assembly 860 of combustor system 810, to be described in more detail hereinafter, to produce hot exhaust gases which flow past inlet guide vanes 834 to radial turbine 820, where power is extracted. The exhaust gases from turbine 820 are ducted to the atmosphere or to a subsequent engine module. For example, in the case of free power turbine arrangement, the gases exiting turbine 820 would be ducted to the free power turbine for extraction of further power.

The combustor system includes a cylindrical combustor liner defining a combustion chamber, the liner having an axis and having one or more inlets adjacent one axial chamber end. The portion of the chamber adjacent the one axial chamber end comprises a single stage combustion zone. With continued reference to FIG. 8, combustor system 810 includes annular combustor liner 840 which is generally toroidal in shape. Housing 840 is contained within pressure vessel 814 and defines an axis 842 essentially coincident with gas turbine engine module axis 818. Liner 840 is closed at axial end 844 except for inlet 843, but is open at axial end 846 to form an annular combustor exit 848. (If multiple premixers are utilized, it should be understood that additional inlets may be provided in the liner to accommodate the added premixers.) Combustor exit 848 is in flow communication with radial turbine 820 through channel 850 past inlet guide vanes 834.

With continued reference to FIG. 8, toroidal chamber 852 defined by liner 840 comprises two generally axial sections or portions with different functions. Region 854 adjacent axial end 844 comprises a single stage combustion zone (e.g., a combustion volume) and region 856 adjacent liner end 846, comprises a dilution zone. A plurality of ports 858 are formed in the outer peripheral surface of liner 840 and open into dilution zone 856. Dilution ports 858 provide for the introduction of compressed air into the dilution zone 856 of combustion chamber 852 from a compressed air conduit, which will be described in more detail hereinafter. Alternatively, compressed air may be delivered into the dilution zone through a second set of dilution ports (not shown) provided as a series of apertures formed in an inner peripheral surface of liner 840 by redirecting compressed air from the premixer into the dilution zone.

Further, one or more fuel/air premixer assemblies are each disposed relative the cylindrical liner and is provided for mixing a portion of the compressed air flow with fuel to provide a fuel/air mixture and for delivering the mixture to the combustion zone through the respective liner inlet. The fuel/air premixer assembly includes an air inlet for receiving the compressed air, a fuel inlet for receiving the fuel and also a mixing tube for flow-smoothing the received compressed air and for mixing the received compressed air and fuel. Essentially all of the air used during combustion is delivered to the combustion zone through one or more fuel/air premixer assemblies. The combustion zone is otherwise sealed off from receiving compressed air except through the premixer assembly.

With reference to FIGS. 8 and 8A, combustion system 810 further includes a single fuel/air premixer assembly designated generally by the numeral 860. Premixer assembly 860 includes housing assembly 862 for receiving the compressed air through an air inlet 861 from an air conduit (described later), and a fuel nozzle 864 for receiving fuel through a fuel inlet 865 from fuel source 832 via fuel line 866. Fuel nozzle 864 depicted in FIG. 8 is an "air-blast" type fuel nozzle that mixes the fuel with swirling compressed air that is especially advantageous for use with liquid fuel to provide atomization and thus enhance vaporization. However, use of an "air blast" nozzle with gaseous fuel can provide benefits in terms of providing an initial mixing of the fuel with air prior to admission to the venturi element. Thus, the combustion system of the present invention is not restricted to the use of liquid fuel or an "air-blast" fuel nozzle, but gaseous fuel and other types of fuel nozzles, such as other swirling-type nozzles, can be used as well. As shown in FIG. 8A, an auxiliary fuel nozzle 867 may be provided for use during the start-up sequence of combustor system 810.

The mixing tube, such as a venturi, has a flow axis substantially radially disposed with respect to the combustion liner axis, an inlet adjacent one mixing tube axial end, and a nozzle assembly at the opposite mixing tube axial end. The mixing tube inlet is flow connected to the premixer air inlet and the premixer fuel inlet. The mixing tube is connected to the liner inlet, and the nozzle assembly extends into the combustion chamber along the flow axis to deliver the fuel/air mixture within the combustion zone.

With continued reference to FIG. 8, premixer assembly 860 further includes a mixing chamber in the form of a venturi-type mixing tube 868 having mixing tube inlet 870 disposed within fuel/air premixer housing assembly 862 and connected to liner 840 at inlet 843. Further, mixing tube 868 has a nozzle assembly 872 for delivering fuel/air mixture into the combustion chamber that is connected to a portion of the mixing tube that extends into combustion zone 854. Mixing tube 868 defines a flow axis 874, and fuel nozzle 864 is positioned to deliver a fuel spray into mixing tube inlet 870 substantially along axis 874. The cross-sectional flow area and dimensions of mixing tube 868 are chosen to provide sufficient residence time to obtain vaporization and mixing of the fuel and compressed air within the mixing tube and to direct the flow of the resulting mixture along mixing tube axis 874 to nozzle assembly 872. Preferably, the minimum residence time of particulate matter in the mixing tube should be on the order of 5–10 milliseconds for the high mass flow rate conditions associated with power operation. Some engine configurations such as recuperated designs where the combustion air is at an elevated temperature, may dictate these low residence times to avoid pre-ignition of the fuel/air mixture in the mixing tube. Although the preferred mixing tube depicted in FIG. 8 is a venturi-type mixing tube 868, one skilled in the art would appreciate that other geometrical configurations are possible, including conically or cylindrically shaped mixing tubes, for example.

As further shown in FIG. 8, compressed air conduit includes generally annular cooling passageway 882 disposed between liner 840 and a second, outer annular liner 841. Passageway 882 extends between compressed air plenum 830 and dilution ports 858. Fuel/air premixer housing assembly 862 is connected to receive compressed air from orifices 885 in liner 841 for eventual communication to the mixing tube inlet 870 by delivering the air through plenum 884 and valve 890 (discussed later).

As can be appreciated from the schematic in FIG. 8, passageway 882 is configured such that the compressed air flowing therein provides cooling for liner 840, particularly liner portion 886 immediately surrounding the combustion zone 854. Portion 886 of liner 840 is constructed for convection cooling only, with no film-cooling. That is, in portion 886 of liner 840, the liner acts to seal off the compressed air flowing in passageway 882 from the fuel/air mixture being combusted in combustion zone 854. Passageway 882 envelopes combustion chamber 852 to provide convection cooling and also to supply compressed air to dilution ports 858. This construction provides for control of the fuel/air ratio of the mixture in combustion zone 854 and permits operation as a "single stage combustor" with a desired lean fuel/air ratio. Such an operation can yield low levels of $NO_x$ and unburned fuel and fuel by-product levels.

Further shown in FIG. 8A, a valve 890 is positioned in fuel/air premixer housing assembly 862 for determining the rate of compressed air flow from plenum 884 to mixing tube inlet 870. Valve 890 is continuously adjustable, and a suitable construction of valve 890 can vary, but is depicted as a butterfly-type. When the valve opening changes, the pressure drop over the premixer changes, resulting in an increase or decrease of air mass flow. A controller 894 (depicted schematically), which, for example, can include a microprocessor, is interconnected with valve 890 to essentially control the flow rate of the compressed air flowing directly to mixing tube inlet 870. Controller 894 is also operatively connected to a fuel valve to meter the fuel flow to fuel nozzle 864. As one skilled in the art would appreciate, controller 894 can act to control both the fuel flow and the compressed air flow to premixer assembly 860 to achieve preselected fuel/air ratios—e.g., preselected in accordance with atmospheric conditions, operating conditions, and fuel-type—over the entire operating range of the gas turbine engine module. Controller 894 could provide infinitely variable fuel/air ratios or step-type ratios. One skilled in the art would be able to select and adapt a suitable controller for a particular application based on the present disclosure and the general knowledge in the art.

Figure 9:
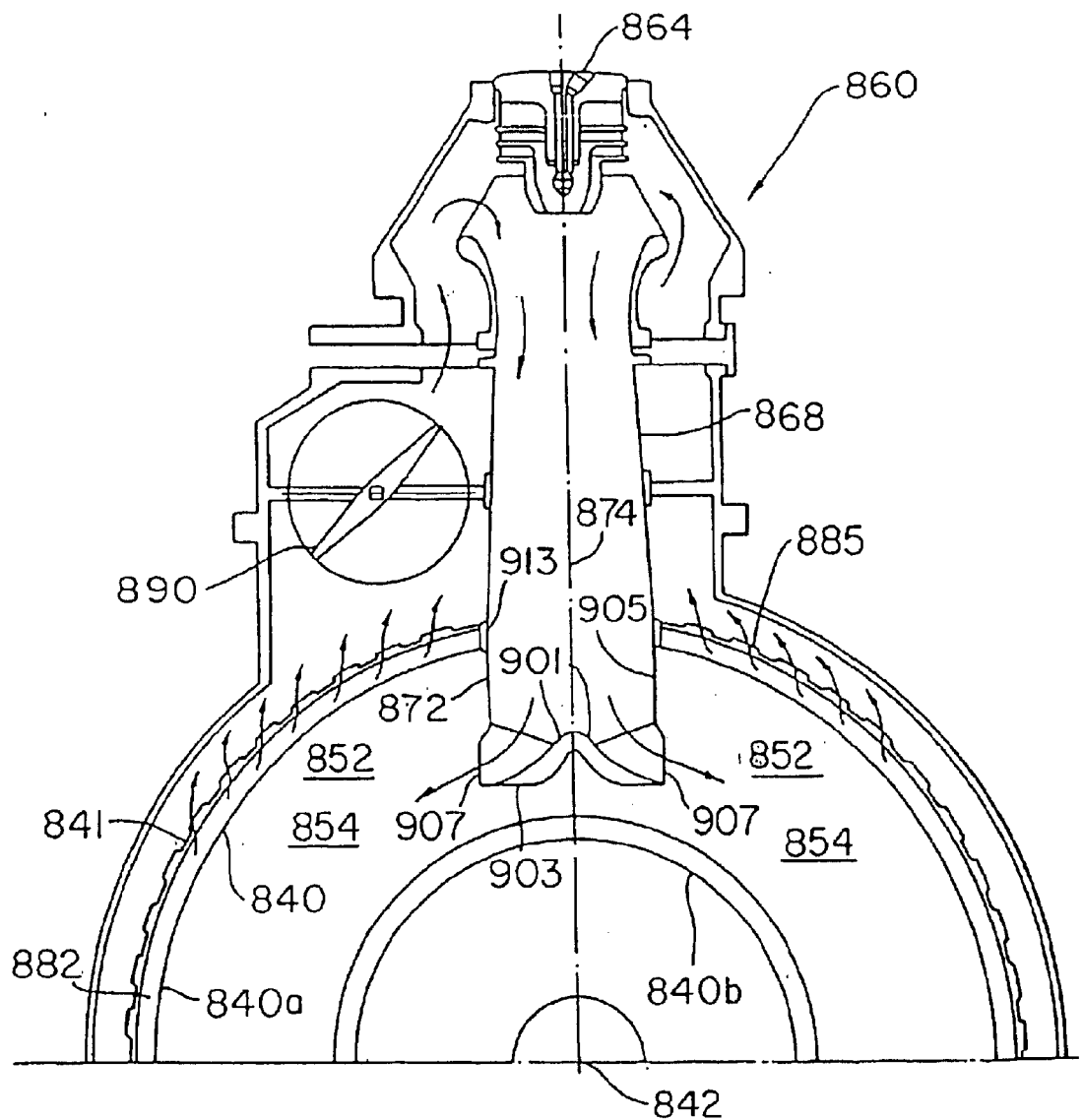
FIG. 9 is a schematic cross-section of the premixer assembly taken along line 9—9 of FIG. 8.
Figure 11:
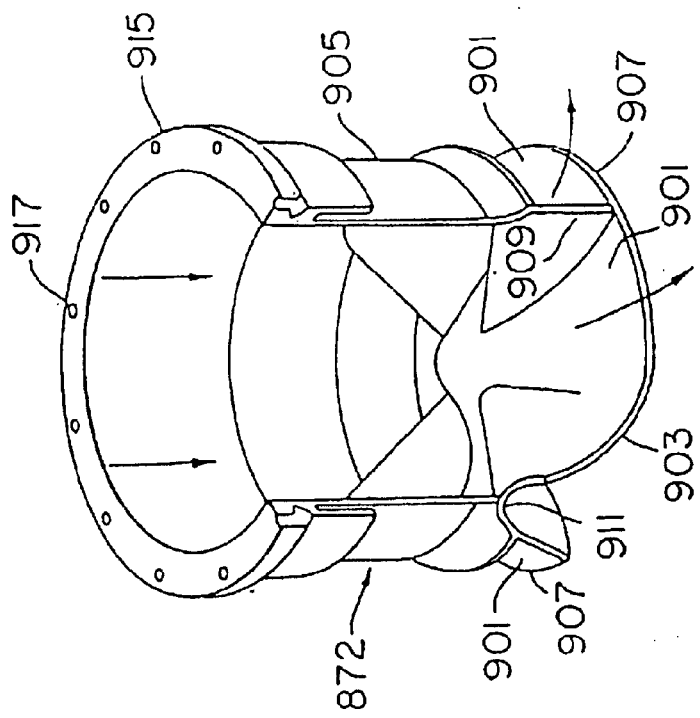
FIG. 11 is a perspective cross-sectional view of the nozzle assembly of FIG. 10.
Figure 10:
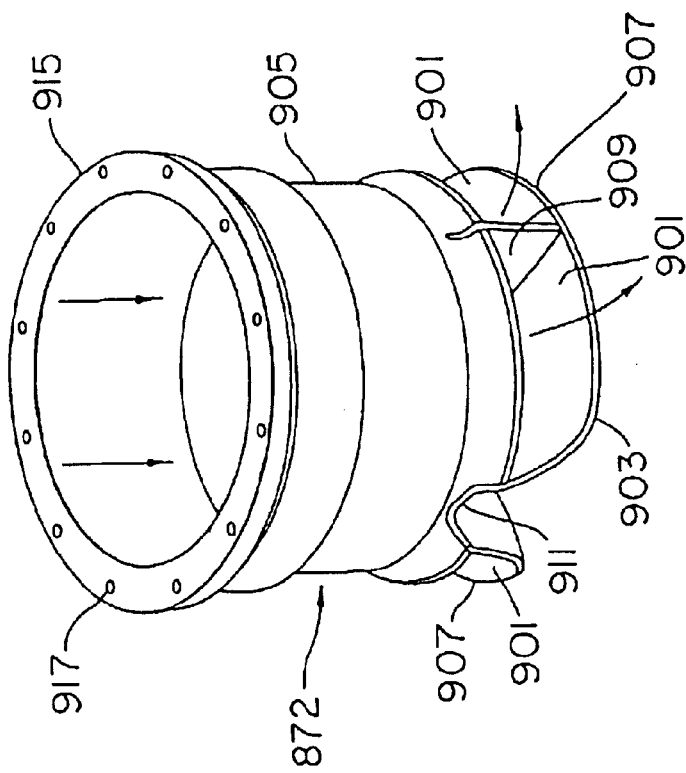
FIG. 10 is a perspective view of a preferred nozzle assembly for use in the engine modules depicted in FIGS. 8 and 9.

With reference to FIGS. 9–11, nozzle assembly 872 extends along the mixing tube flow axis into the combustion chamber and has one or more ports for distributing the fuel/air mixture within the combustion zone. The nozzle assembly further may have at least one channel for each nozzle assembly port, wherein each channel is angled away from the mixing tube flow axis and terminates at a nozzle assembly port for distributing the fuel/air mixture within the combustion zone.

Specifically, nozzle assembly 872 is positioned within combustion chamber 852, and has channels 901 defined by the geometrical configuration of end cap 903 and interior side walls 905 of nozzle assembly 872. Side walls 905 can be configured as an extension member for mixing tube 868 or can have different geometrical shape. Nozzle assembly 872 further includes ports 907 defined by end cap 903 and side walls 905. Ports 907 are in flow communication with channels 901 and distribute fuel/air mixture within combustion zone 854. Fins or ribs 909 are additionally provided to connect end cap 903 to side walls 905.

Due to the beveled or sloped surfaces of the nozzle assembly (and in particular channels 901), the flow of the fuel/air mixture is directed away from flow axis 874, as can be seen by the arrows in FIG. 11. That is, the flow of the fuel/air mixture can be diverted in a desired direction by utilizing surfaces of varying geometrical orientations. Although several channels and nozzle assembly ports are depicted, it is understood that the present invention can be achieved by utilizing only a single channel and associated port. However, at least two ports for delivering the fuel/air mixture in opposed angular directions relative to the liner axis is particularly beneficial in utilizing the overall combustion volume.

Further, the structural components of the nozzle assembly (and in particular channels 901) can be configured to direct the fuel/air mixture into the combustion zone in a variety directions, with the flow preferably not impinging the walls of the combustion liner. For example, channels 901 of the nozzle assembly 872 could be configured so that the fuel/air mixture flows into the combustion zone in substantially radial or mixed radial-axial directions away from the mixing tube flow axis. Further, the flow could be directed in multiple directions relative to the liner axis, e.g., along at least two generally opposed, substantially tangential angular directions relative to the combustion chamber liner axis as is shown by the arrows in FIG. 9. Moreover, the channels 901 could also be configured to direct flow in more than two directions relative to the mixing tube axis, such as is depicted in FIGS. 10 and 11.

It should be further understood that the aforementioned geometry of nozzle assembly 872 advantageously provides a flame holding effect by causing the sudden expansion and recirculation of the exiting fuel/air mixture in the vicinity of end cap 903. That is, the configuration of end cap 903, for example, provides areas 911 for the circulating fuel/air mixture to burn outside nozzle assembly 872 adjacent ports 907. Flame holding is beneficial in providing a stable flame near ports 907 in order to maintain a steady flame front to stabilize combustion during the varying operating conditions.

Preferably, the total cross-sectional area of ports 907 are collectively about 70–90% of the cross-sectional area of mixing tube 868 (generally indicated at reference point 913) in order to accelerate the fuel/air mixture and thereby increase the mixture velocity delivered into combustion chamber 852 relative to the velocity in the mixing tube 868. The significance of this feature can be appreciated from understanding that flames from chamber 852 could otherwise ignite fuel within mixing tube 868 when the flow of fuel/air mixture is at a low speed relative to the flame speed in combustion zone 854. By utilizing ports 907, sized to increase the velocity of the flow of fuel/air mixture, the likelihood that flame from combustion chamber 852 will "flash back" into the mixing tube is reduced. Further, by increasing the velocity of the flow, it is believed that the boundary layer along channels 901 and at ports 907 is reduced, thereby eliminating low velocity regions where the flame from combustion chamber 852 can creep along the surfaces of nozzle assembly 872 and flash back into mixing tube 868. It is also believed that the aforementioned geometry is particularly useful when compressed air variations occur in mixing tube 868, which otherwise could cause variable flame fronts or pulsations within combustion chamber 852. The increased pressure at ports 907 also can dampen the minor variation in compressed air velocity in the premixer and reduce such pulsations. These advantages are useful in maintaining the structural integrity of the combustor system and its individual components, and thus provide a benefit to the integrity and performance of the overall gas turbine engine itself.

FIG. 9A depicts a variation of the construction shown in FIGS. 8 and 9 with the principal differences being that the premixer 860' includes a cylindrical-type air valve 890' in place of the butterfly-type air valve 890 and an asymmetric nozzle assembly 872' arrangement. Air valve 890' has a rotatable inner cylinder section 890a', which progressively increases or diminishes the amount that valve outlet opening 890c' is occluded to permit more or less air flow through valve 890' upon rotation of the cylinder/sleeve 890a' about axis 890b'. One skilled in the art would understand that other cylindrical valve constructions could be used.

FIG. 9A also depicts a nozzle assembly 872' having asymmetric nozzle ports 907a' and 907b' configured to minimize the amount of fuel/air mixture impinging on the axially rear wall of liner 840. That is, the flow directing surfaces 901a' and 901b' of nozzle end cap 872a' are configured to admit the fuel/air mixture into combustion zone 854 predominantly in the tangential direction with respect to axis 842 of the combustion chamber while still admitting some of the fuel/air mixture into other regions (i.e., to the right and left of the venturi axis 874 in FIG. 9A). This asymmetric nozzle port arrangement permits more effective utilization of the combustion volume while minimizing fuel/air mixture impingement on the liner wall, which can lead to carbon build up, uneven heat transfer, and increased thermal stress-caused distortions.

Figure 9B:
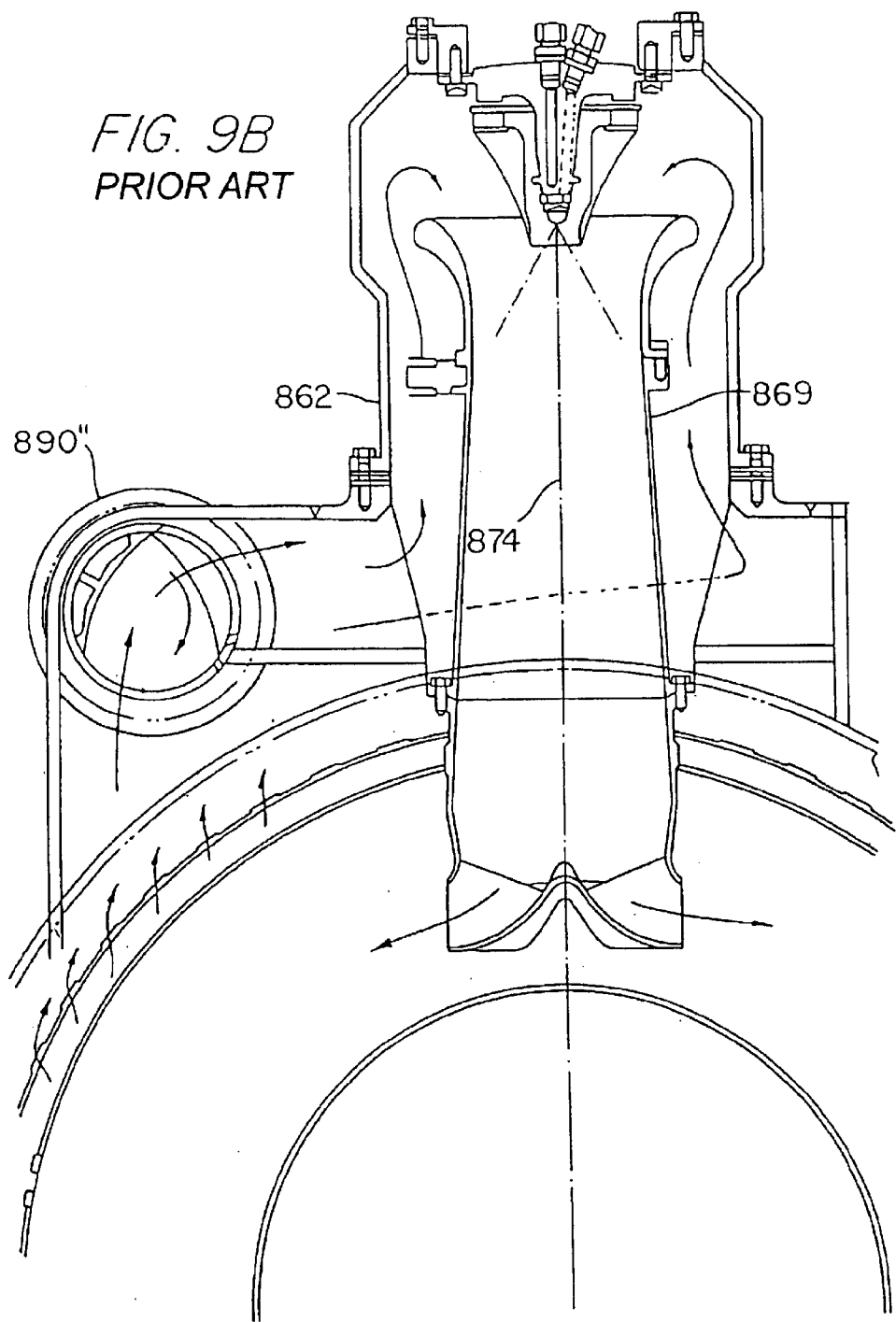
FIG. 9B is a schematic cross-section of a further modification of the premixer assembly in FIG. 9A.

FIG. 9B is a modification of the construction shown in FIG. 9A with the cylindrical-type air valve 890" spaced a greater distance from the portion of premixer housing 862 supporting the venturi mixing tube 868. It is expected that spacing air valve 890" a greater distance from the premixer housing will help reduce the unavoidable asymmetries in the compressed air flow field exiting air valve 890" and allow the compressed air flow to be distributed more evenly in the premixer housing leading to the inlet of venturi mixing tube 868. This will minimize the pressure drop along the air flow path from the air valve to the venturi inlet and allow a higher maximum power level for the engine while maintaining low emission levels.

It should be appreciated that an exit nozzle assembly can be connected to a mixing tube by installation methods known to those skilled in the art. For example, as depicted in FIGS. 10 and 11, nozzle assembly 872 may have a flanged connection 915 and attachment locations 917 for connecting the nozzle assembly to a mixing tube having a mating flanged structure. Alternatively, a mixing tube can incorporate the nozzle assembly into its overall structure.

With continued reference to FIGS. 8 and 9, the mixing tube is connected to the liner so the flow axis of the mixing tube is aligned to generally intersect the liner axis. However, at least some of the channels of the exit nozzle are formed to direct fuel/air mixture in the combustion zone in a substantially tangential direction with respect to the liner axis. This radial orientation of the mixing tubes can provide a more precise sliding fit between the mixing tube and the combustor liner because the combustor inlet opening is less elongated. This results in less leakage, and less lateral movement and thermal distortion during operation.

Specifically, controlled swirling flow and combustion is provided in combustion zone 854 by orienting nozzle assembly 872 so the fuel/air mixture will flow in a direction generally between liner wall 840a and liner wall 840b. Mixing tube 868 is radially mounted to liner 840 so that mixing tube flow axis 874 generally intersects liner axis 842. It should be appreciated that alignment need not be precise, so long as divided flows of the fuel/air mixture can be directed by nozzle assembly 872 into the combustion chamber without appreciably impinging liner walls 840a and 840b. Although some impingement of liner wall can be expected, it is preferred to minimize the amount of fuel/air mixture impacted on a given surface in order to reduce the amount of carbon deposited on such a surface during the combustion process. Carbon deposits can eventually insulate areas of the liner, causing problems of thermal fatigue and localized overheating of the combustion chamber.

In operation, and with reference to FIGS. 8–11, compressed air from plenum 830 is channeled via passageway 882 over the outside surface of liner 840 for cooling liner 840, and particularly portions which surround combustion zone 854. A portion of the compressed air flowing in passageway 882 is admitted to plenum 884 through orifices 885 and then flows to fuel/air premixer assembly 860 via the interconnection between fuel/air premixer housing assembly 862 and plenum 884 as controlled by compressed air valve 890 via controller 894. This portion of the compressed air is essentially all the compressed air used for combustion (except for inadvertent leakage and compressed air that may be used to power an air-blast type fuel nozzle). In mixing tube 868, the compressed air portion is mixed with the fuel from fuel nozzle 864, again possibly with a small additional portion of compressed air if nozzle 864 is a "air-blast" type nozzle, and is directed along the mixing tube axis 874 to nozzle assembly 872, where the fuel/air mixture is divided into paths along channels 901 and accelerated out of ports 907 into combustion zone 854 of combustion chamber 852. By the orientation and sizes of the nozzle assembly ports 907, the designer can control the distribution and direction of the fuel/air mixture within the combustion volume.

After combustion of the fuel/air mixture in zone 854, the hot exhaust gases pass to dilution zone 856 where dilution air from dilution ports 858 reduces the average temperature of the exhaust before it is ducted via channel 850 past vanes 834 to turbine 820 for work-producing expansion.

The control of combustion afforded by combustion system 810, which includes aspects of the present invention, through the complete mixing of the fuel and air outside the combustion chamber in the fuel/air premixer, including complete vaporization of the fuel if liquid fuel is used, together with the control of the fuel/air ratio of the mixture delivered to the combustion chamber allows for significant reductions in $NO_x$ levels and the levels of unburned fuel and fuel by-products emanating from engine module 812, as mentioned earlier. Furthermore, the efficient utilization of essentially the total amount of compressed air flow to either combust the fuel or to dilute the exhaust gases upstream of the turbine provides increased efficiency, considerable reduction of peak combustor temperatures resulting in longer life for combustor liners compared to conventional designs.

The system described is expected to provide low emissions at all power ratings for high inlet temperature gas turbine applications while keeping variable geometry flow apparatus away from and outside the hot combustor area.

Figure 12:
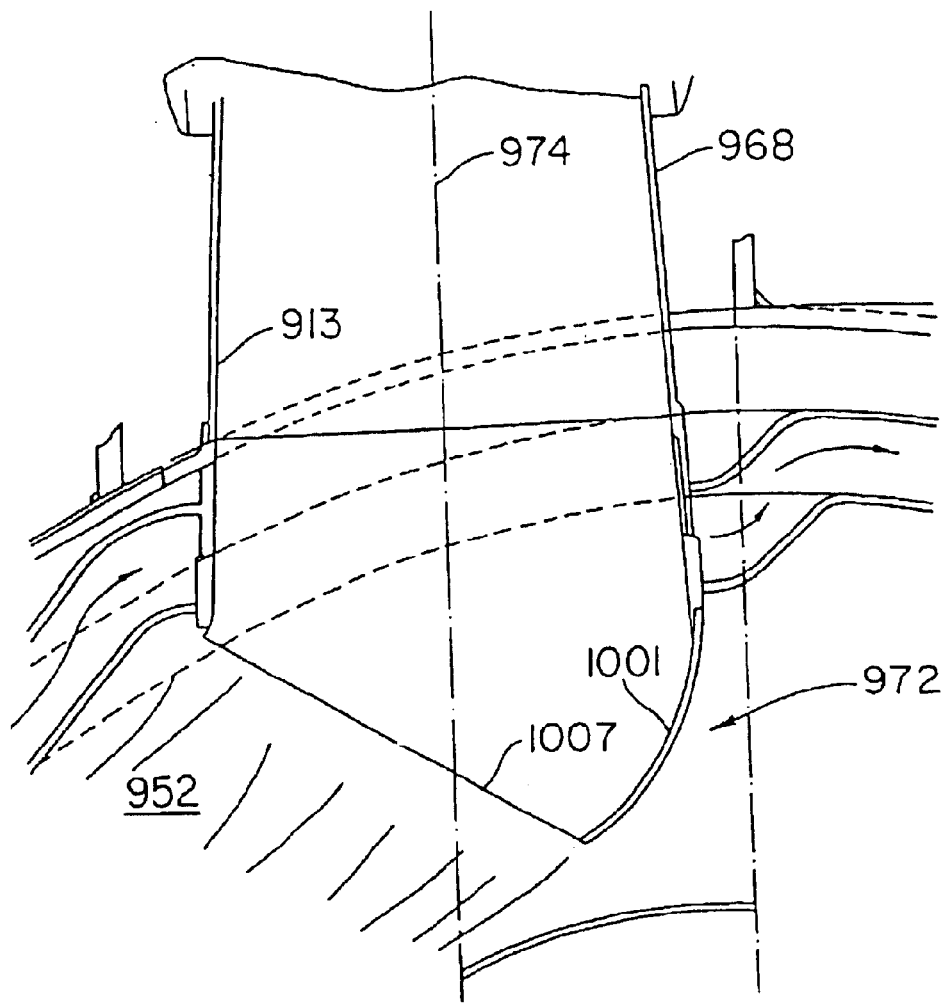
FIG. 12 is a schematic cross-section of an alternate premixer assembly exit nozzle configuration.

Alternatively, as seen in FIG. 12, another predecessor construction of the named inventor having aspects of the present invention is illustrated. In particular, nozzle assembly 972 has a single channel 1001 for directing the flow of fuel/air mixture in a direction that is generally tangential to the combustion chamber axis due to the downwardly sloped surfaces of channel 1001. Nozzle assembly 972 further includes a single port 1007 in flow communication with channel 1001 for distributing fuel/air mixture within combustion chamber 952. Preferably, the total cross-sectional area of port 1007 is about 70–90% of the cross-sectional area of mixing tube 968 (generally indicated at reference point 913) in order to increase the acceleration of the fuel/air mixture delivered into combustion chamber 952.

Although the above descriptions relate to radially mounted mixing tubes which have a nozzle assembly that extends into the combustion chamber, the present invention and its advantages can employ other mixing tube positions and configurations. For example, it should be appreciated that a mixing tube may be connected to the liner so the flow axis of the mixing tube is slightly tangentially aligned to the liner axis. As such, the mixing tube's exit nozzle or other like structure can be oriented to direct the flow of the fuel/air mixture tangentially into the combustion zone and preferably minimize impingement of flow onto the liner while maintaining a simple geometric configuration at the liner inlet compared to constructions such as depicted, e.g., in FIG. 1B, where venturi axis 74 is substantially tangentially oriented with regard to liner axis 42.

Figure 13:
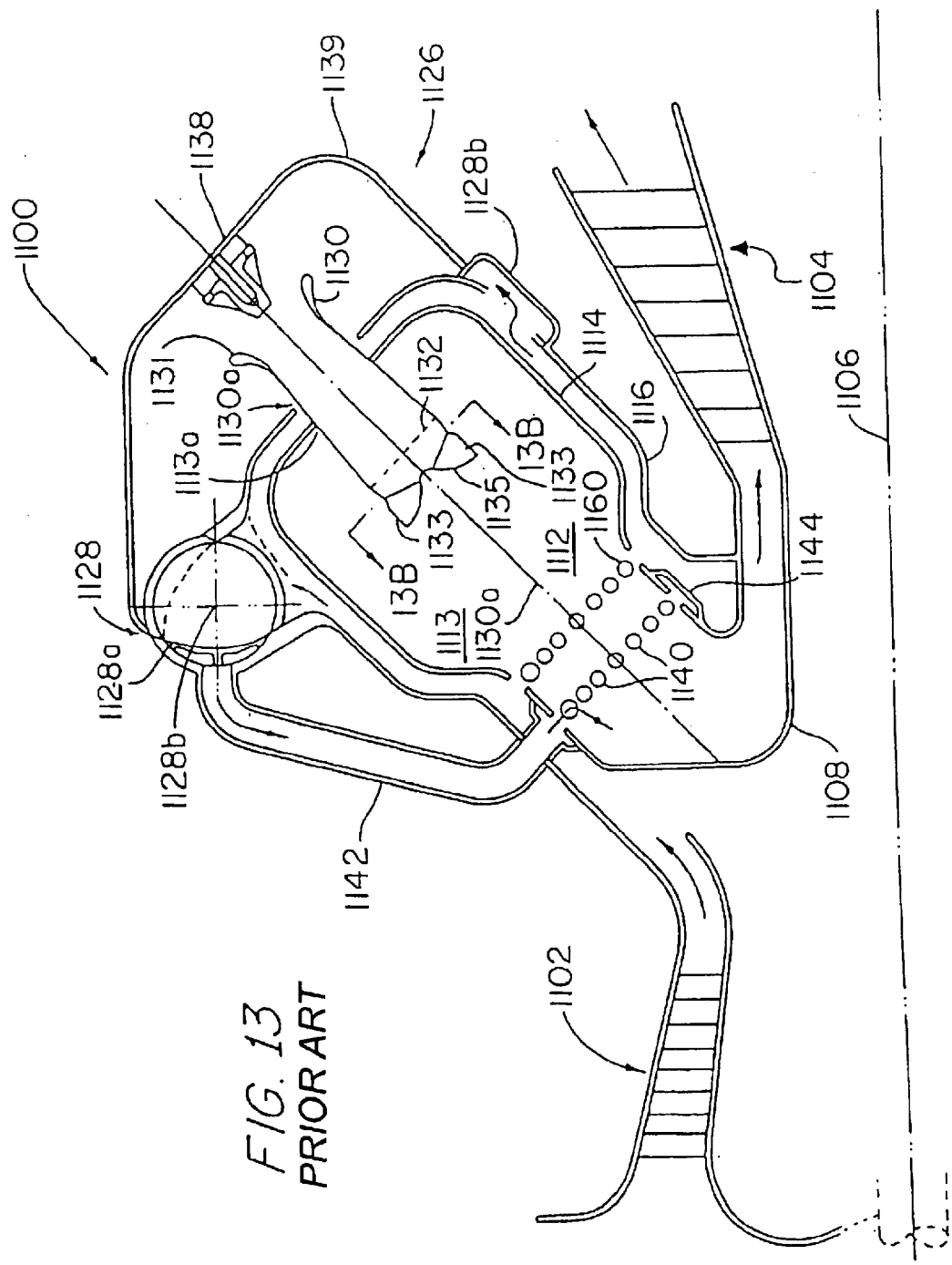
FIG. 13 is a schematic cross-section of yet another predecessor gas turbine engine module and having a can-type combustor.

Further, the present invention may be utilized by a can-type combustor configuration such as shown in FIG. 13. In FIG. 13, combustor system 1100 includes a combustion chamber 1112 including combustion zone 1113 defined by combustion chamber liner 1114. Around liner 1114 is disposed, in spaced relation, pressure vessel 1116, which partly functions as a cooling shroud. A premixer assembly 1126 includes an air valve 1128 and a venturi-type mixing tube 1130, a portion of which is disposed outside liner 1114, and a nozzle assembly portion 1132 disposed to deliver a fuel/air mixture within combustion zone 1113 of chamber 1112. Fuel nozzle assembly 1138 mounted in premixer housing 1139 delivers a spray of fuel into a mixing tube inlet region 1131, where it is mixed in mixing tube 1130 with compressed air in an amount partially controlled by valve 1128 that is fed by compressor 1102. As shown in FIG. 13, valve 1128 is a cylindrical-type three-way valve with rotatable sleeve 1128a (although other types of valves are possible) and can direct air to venturi mixing tube 1130 or to secondary dilution ports 1140 in liner 1114 via bypass conduit 1142 and manifold 1144 (as taught earlier in this specification).

Figure 13A:
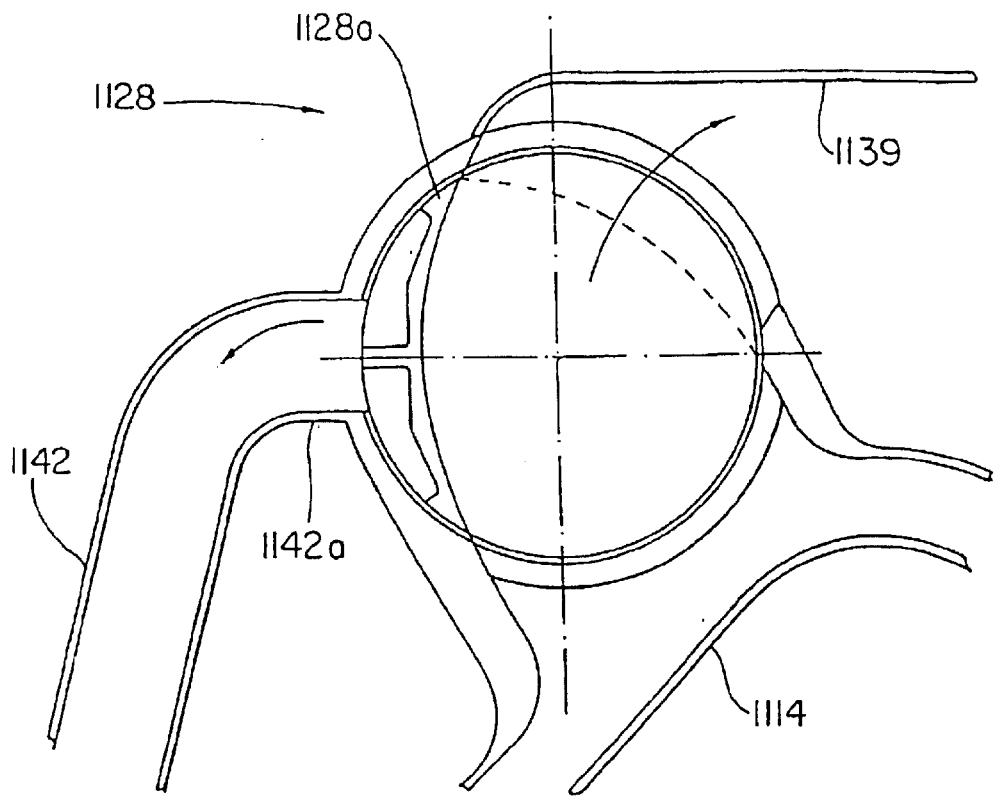
FIG. 13A is an enlargement of the air valve component depicted in FIG. 13.

FIG. 13A is an enlargement of the portion of FIG. 13 showing air valve 1128 including rotatable sleeve 1128a, which is a circular segment that can act as a seal against about ⅓ of the inner circumference of the valve. Sleeve 1128a can be rotated by an actuator (not shown) about axis from a position totally obscuring the entrance 1142a to bypass conduit 1142 (as shown in solid in FIG. 13A) to a position blocking air flow to venturi mixing tube 1130 via premixer housing 1139 (shown in dotted FIG. 13A), and allowing full bypass flow to secondary dilution ports (not shown).

For engine applications requiring multiple premixers, an air valve can be provided for each can combustor (as shown in FIG. 13A) or for each pair of combustors, such as depicted in the FIGS. 14A-14D embodiment (to be discussed infra), and then connected to a common actuator which would move all the valves simultaneously, in the same way as variable stator blades are moved on axial compressors. One skilled in the art thus would be able to easily adapt the present invention, to be discussed subsequently, to such engine applications.

With continued reference to FIG. 13A, primary dilution ports 1160 receive a portion of the compressed air from compressor 1102 at a point upstream of manifold 1128b of valve 1128. The dilution portion is dependent upon the pressure drops through the respective flow paths as well as the number and sizing of dilution ports 1160, as one skilled in the art would readily understand. The portion of liner 1114 defining combustion zone 1113 is purposefully sealed off from receiving air except through mixing tube 1130 disposed in chamber inlet 1113a in order to maintain control of the fuel/air ratio and provide low emissions, and a gap 1130a. Gap 1130a is provided between mixing tube 1130 and pressure vessel 1116 to pass combustion air sufficient for idle operation. This arrangement simplifies the construction of the air valve which no longer has to pass the (low) flow necessary for idle operation.

Figure 13B:
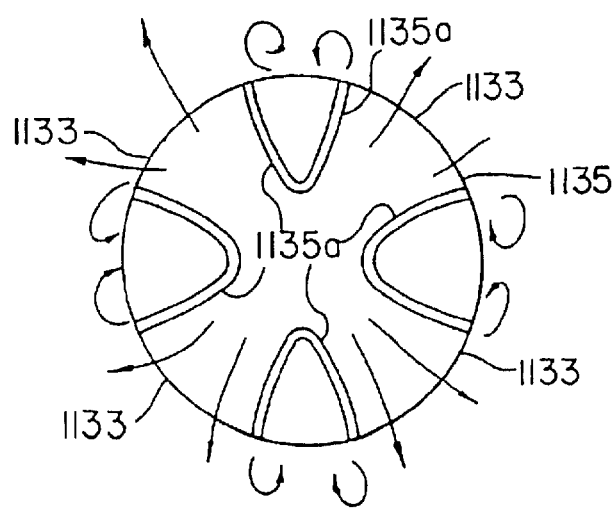
FIG. 13B is a schematic cross-section of the nozzle of FIG. 13 assembly taken along line 13B—13B.

Nozzle assembly 1132 is depicted as part of mixing tube 1130 and extending into the combustion chamber 1112 at the center of the can-type combustor liner 1114. As further shown in FIG. 13B, nozzle assembly 1132 has an end plate 1135 with surface convolutions 1135a forming four channels that direct the fuel/air mixture within chamber 1112 through ports 1133, thereby optimizing the available combustion volume. A total of four ports 1133 are depicted as symmetrically arranged about mixing tube axis 1130a but an asymmetric arrangement with fewer or more ports can be used. Preferably still, the collective area at ports 1133 for nozzle assembly 1132 should be between about 70 and 90% of the largest cross-sectional area of the mixing tube 1130 in order to increase the velocity of fuel/air mixture admitted into chamber 1112 through ports 1133. It is believed that the aforementioned configuration will likewise achieve the benefits described for nozzle assembly 872 of the FIG. 8 embodiment.

Although shown with a three-way valve 1128 that is highly useful in applications requiring high bypass air flow (i.e., past the cooling channels formed by liner 1114 and pressure vessel 1116) during low power applications, can-type combustor system 1100 can be used with a two-way air valve as described elsewhere in this specification. Also, combustor system 1100 is depicted in use with an axial-type engine having axial compressor section 1102 and axial turbine section 1104, the engine axis being shown schematically as 1106 in FIG. 13. Combustor system 1100 using a can-type combustion chamber can be used in engine configurations employing radial and mixed axial-radial type compressors and turbines, as well.

It is also understood that one or more of the combustor systems can be positioned circumferentially about axis 1106 with the hot gas output of each collected and distributed in turbine inlet plenum 1108 providing low emission operation for the engine.

Figure 14A:
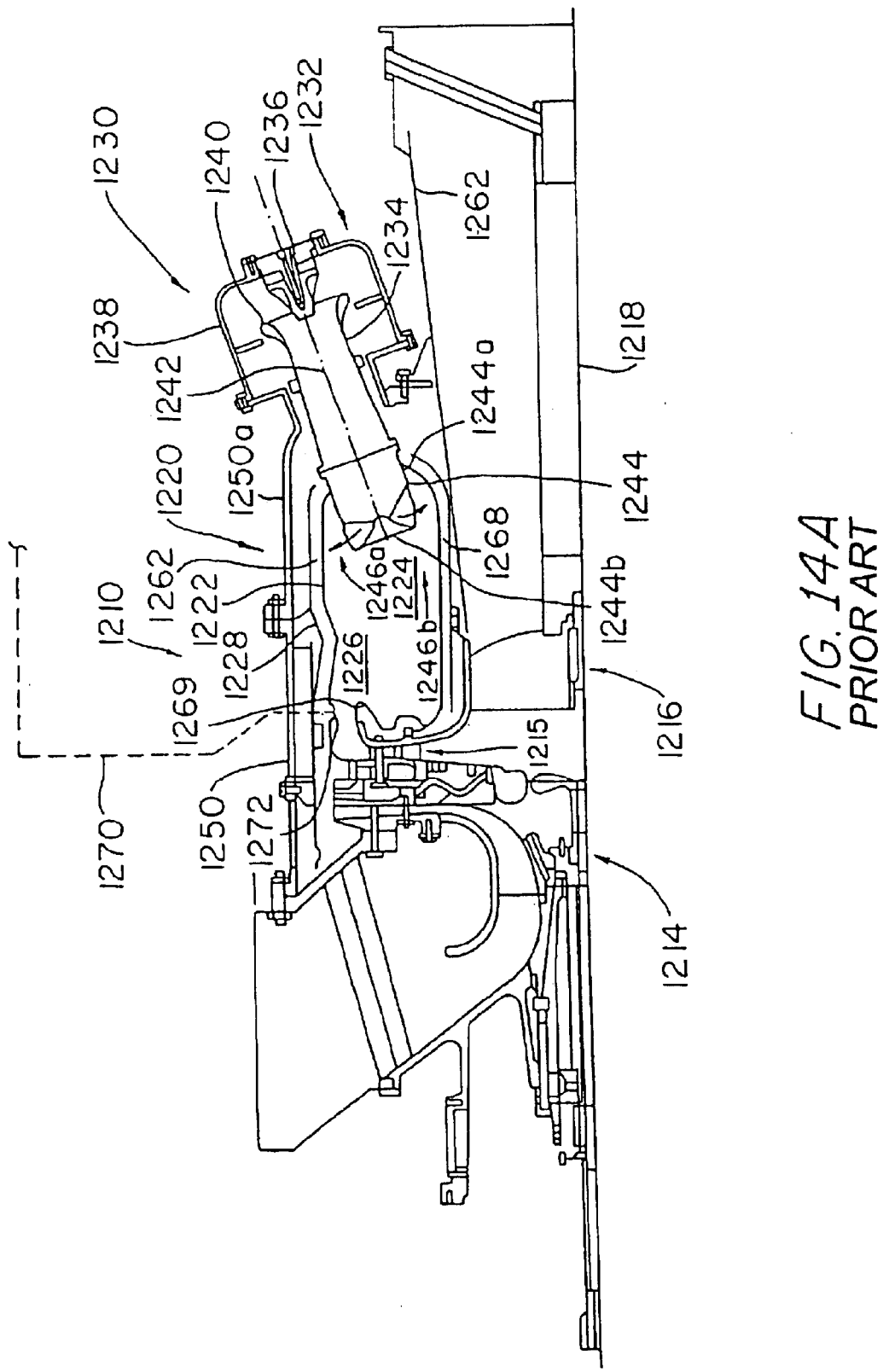
FIG. 14A is a schematic cross-section of still another predecessor gas turbine engine module having a single stage combustor and controlled fuel/air ratio.

FIGS. 14A–14D show a configuration of a gas turbine engine having combustion apparatus which could advantageously utilize the present invention. Specifically, FIG. 14A shows a sectional view through gas turbine engine 1210 having compressor section 1214 and turbine section 1216 operatively connected for rotation about engine axis 1218. Engine 1210 includes annular combustor chamber 1220, defined by liner 1222, with combustion zone 1224 and dilution zone 1226. Cooling shroud 1228 surrounds liner 1222 to provide flow passageways for convection cooling of liner 1222 particularly in the vicinity of combustion zone 1224. As with the other embodiments discussed previously, combustion zone 1224 is sealed off from the cooling air flowing through passageways 1262 and 1268 (see FIG. 14D) between shroud 1228 and liner 1220. Thus the combustion zone 1224 receives air for combustion essentially only as part of the fuel/air mixture delivered to combustion zone 1224 through premixer assembly 1230 (to be discussed in more detail henceforth) and thus constitutes a "single stage" combustion zone.

With continued reference to FIG. 14A, premixer assembly 1230 includes a pair of premixers 1232 (only one being shown in FIG. 14A) each having a venturi-type mixing tube 1234 positioned to receive fuel from fuel nozzle 1236 and air from premixer housing 1238 through venturi inlet 1240. Each venturi mixing tube 1234 is configured to deliver fuel/air mixture along venturi axis 1242 and through nozzle assembly 1244 into combustion zone 1224. Nozzle assembly 1244 is constructed of extension member 1244a and end cap 1244b having its surface contoured to provide channels and ports 1246a, b for distributing the fuel/air mixture within combustion zone 1224, generally at an angle with respect to venturi axis 1242. See FIGS. 10 and 11 for examples. Although not seen in FIG. 14A, the ports 1246 also provide a flow direction for the fuel/air mixture that is in opposed angular directions with respect to axis 1242. Also as seen in FIG. 14A, premixer housing 1238, which surrounds venturi mixing tube 1234 and mounts fuel nozzle 1236, is itself mounted to separable end portion 1250a of engine pressure vessel 1250.

Figure 14B:
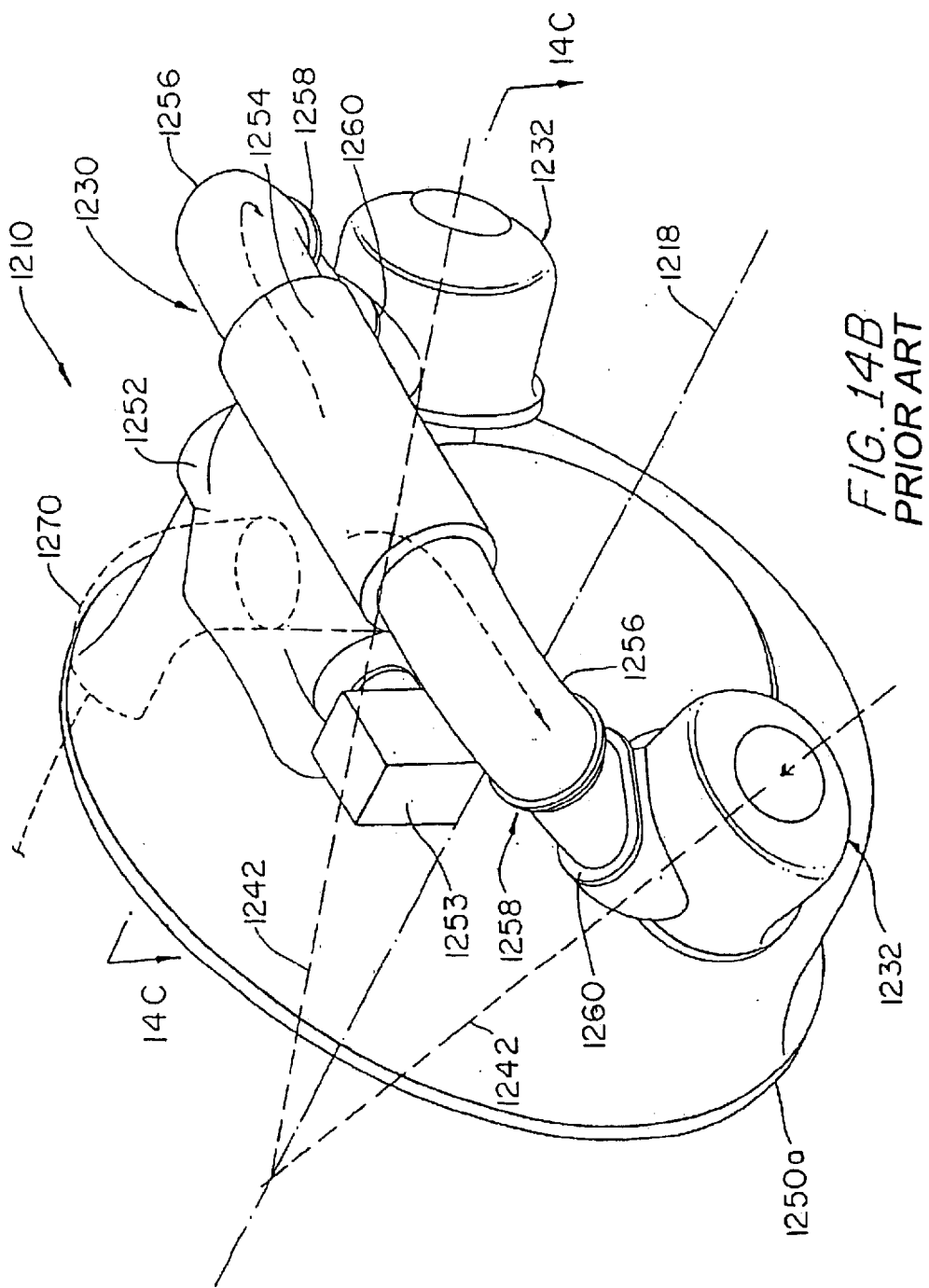
FIG. 14B is a schematic perspective end view of a part of the engine module of FIG. 14A.

FIG. 14B is a perspective schematic view of an end portion of engine 1210, which provides an understanding and appreciation for the highly advantageous configuration of engine 1210. As seen in FIG. 14B, the pair of premixers 1230 are mounted to the separable pressure vessel end portion 1250a at essentially diametrically opposed positions with respect to axis 1218. Premixer assembly 1230 also includes a single, cylindrical-type air valve 1252 also mounted on pressure vessel end portion 1250a. Air valve 1252 is activated by actuator 1253 to control the flow of compressed air for combustion to both premixers 1232 along air paths through manifold 1254 and a pair of distribution conduits 1256. Distribution conduits 1256 can be of a variety of shapes depending on the space limitations afforded by the balance of the components of the combustion apparatus and the engine. However, they should be configured to provide a minimum pressure drop and present essentially identical flow restriction characteristics. Distribution conduits 1256 are shown with bellows connectors 1258 leading to compressed air inlets 1260 in each of premixers 1232. Also, air valve 1252 is angularly disposed with respect to axis 1218 to be essentially equidistant from each of premixers 1232 to provide a compact arrangement for premixer assembly 1230 and to help ensure equal pressure drops between air valve 1252 and the individual premixers 1232. Although not shown in FIG. 14B, one or both of the distribution conduits 1256 can be purposefully made with a slightly higher or lower flow resistance than the other to allow flow balancing at the time of construction. Alternatively, preset flow restrictors could be used in distribution conduits 1256 to ensure proper flow balancing between the premixers, but such a construction would entail increases in the overall restriction in the compressed air flow path and thus is not presently preferred.

As a consequence of the configuration of premixer assembly 1230 including the mounting of not only premixers 1232 but also air valve 1252 on separable pressure vessel end portion 1250a, the entire premixer assembly 1230 is removable along with pressure vessel end portion 1250a. As best seen in FIG. 14A, upon removal of the turbine exhaust pipe 1262, premixer assembly 1230 can be removed along with pressure vessel end portion 1250a. This ease of assembly/disassembly is a significant advantage for the configuration of the combustion apparatus shown in FIGS. 14A–14D.

Importantly, the individual premixers 1232 are oriented and constructed such that the flow axes 1242 of venturi mixing tubes 1240 are both radially disposed and axially inclined with respect to axis 1218. That is, the extensions of venturi axes 1242 intersect or pass in close proximity to engine/combustion chamber axis 1218 while at the same time exhibit angles of significantly less than 90° with respect to axis 1218 as is depicted schematically in FIG. 14B. This orientation effectively utilizes the normally wasted annular space surrounding the turbine exhaust pipe and advantageously provides a smaller overall "envelope" diameter for engine 1210, of importance in applications requiring a minimized axial profile, that is, a minimized overall engine O.D., such as in certain aircraft applications. Moreover, the more effective utilization of the combustion space in combustion zone 1224 may allow the axial length of combustion chamber 1220 to be reduced, while maintaining sufficient residence time in the combustor to reduce CO and $NO_x$ levels to acceptable values. The axial shortening of combustion chamber 1220 has the advantage of reducing the total heat transfer area that must be cooled by passageways 1262 and 1268 (see FIG. 14D). The reduction in the required cooling air flow leads to a more effective use of the available supply of compressed air, particularly in recuperated engine applications when the recuperated return air would be hot.

Figure 14C:
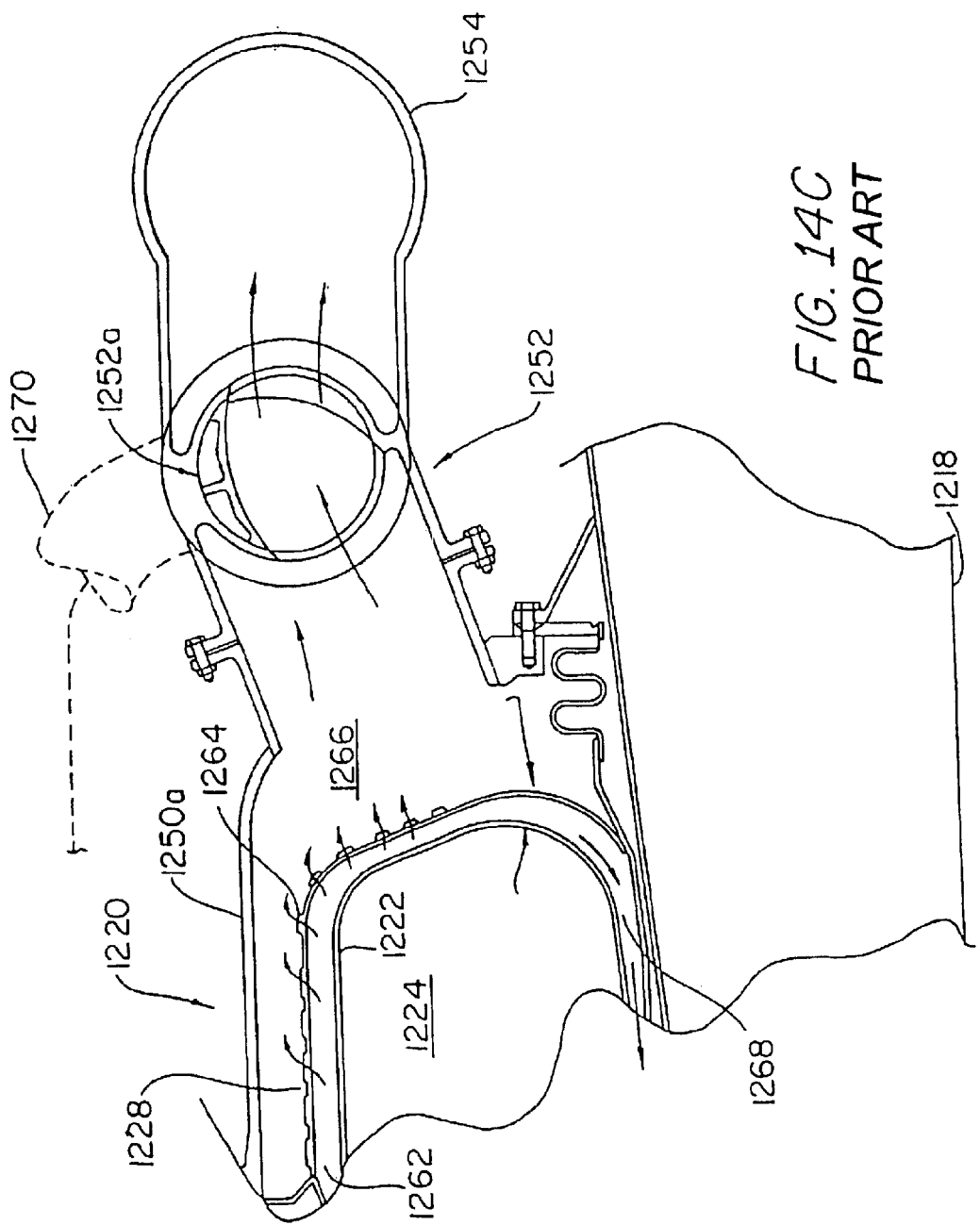
FIG. 14C is a schematic cross-section through the engine module part depicted in FIG. 14B taken along the line 14C—14C.

With reference now to FIG. 14A and to FIG. 14C, which is a cross-section through the air valve 1252 and distribution manifold 1254, the principal combustion air flow path to the premixer assembly can be seen. In particular, air flows from the radial compressor unit 1214 first along the cooling passages 1262 formed between the combustion chamber liner 1222 and the cooling shroud 1228. In the vicinity of the end of the combustion chamber 1220 proximate the single stage combustion zone 1224, a portion of the compressed air flows outward through apertures 1264 in cooling shroud 1228 and is collected in plenum 1266 formed by cooling shroud 1228 and pressure vessel portion 1250a. Apertures 1264 may have any form and number as long as the remaining cooling air has guidance and maintains the correct velocity.

From plenum 1266, the compressed air flows past air valve 1252 and into distribution manifold 1254 where it splits with essentially half going to each of the respective premixers (not shown in FIG. 14C). The remainder portion of the compressed air, that is, the portion not flowing through the apertures 1264, flows to dilution ports 1269 (FIG. 14A) along passageway 1268 along the inner portion of the annular combustion chamber 1220. Because combustion is essentially completed in the vicinity of the dilution zone 1226 where the dilution air is added, the air traveling along passageway 1268 does not undergo combustion but only mixes with the hot combustion products prior to entering nozzle guide vanes 1215 and then turbine unit 1216 to provide efficient air flow and heat value management.

As shown in FIG. 14C, air valve 1252 is a cylindrical-type valve having a rotatable inner cylinder section 1252a that can progressively close off or open flow paths through the air valve under the control of a fuel/air controller (now shown) via actuator 1253 as in previous embodiments. While other types of air valves can be used, such as butterfly valves, etc., cylindrical valves have been found to exhibit more predictable flow characteristics and be less subject to aerodynamic oscillations at a low flow rates and thus are presently preferred. While the cylindrical air valve 1252 shown in FIG. 14C is a "two-way air valve" the configuration could be modified to include a three-way valve used in conjunction with a second set of dilution ports. Such a construction is depicted in dotted lines in FIGS. 14A, 14B, and 14C which shows bypass conduit 1270 interconnected with secondary dilution ports 1272 (FIG. 14A) and is similar to the system shown in FIG. 13 at 1144. The benefits and advantages of such a bypass configuration are set forth in my copending application Ser. No. 08/892,397 filed Jul. 15, 1997 and my provisional application Ser. No. 60/038,943 filed Mar. 7, 1997, the contents of both of which are hereby incorporated by reference.

Figure 14D:
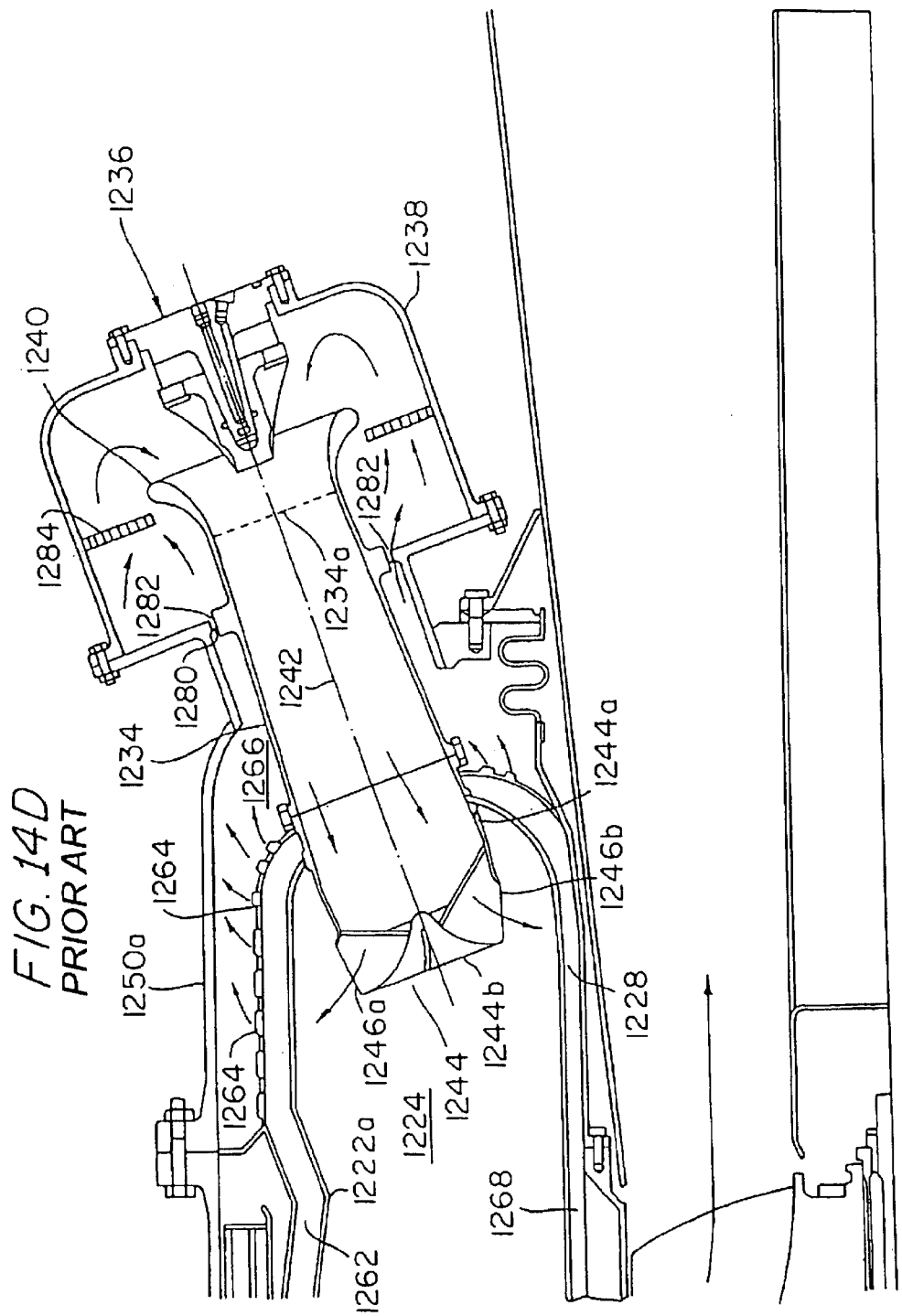
FIG. 14D is an enlargement of the portion of FIG. 14A showing the premixer assembly.

FIG. 14D is an enlargement of the premixer cross-section shown in FIG. 14A and shows in more detail certain additional features of the preferred design. Specifically, FIG. 14D shows venturi mixing tube 1234 having cylindrical flange 1280 which defines an annular opening with premixer housing 1238. This annular opening is configured and sized to pass an amount of compressed air sufficient for operation of engine 1210 at idle conditions. That is, the air flowing through opening 1282 is taken from the same plenum 1266 that supplies air to the premixers through air valve 1252 but bypasses air valve 1252 and thus is not directly controlled by it. This arrangement allows for simplification in the design of air valve 1252 inasmuch as it is not required to pass a minimum amount of air to sustain combustion at idle operation. Opening 1282 can be configured to have predictable and thus easily controlled air flow rates.

Also shown in FIG. 14D is a flow-evening grid 1284 mounted in premixer housing 1238 to surround venturi mixing tube 1234 in the vicinity of inlet 1240. The function of grid 1284 is to redistribute the flow entering premixer housing 1238 via inlet 1260 and to even out other flow asymmetries arising from the structural features of the premixer housing 1238 in order to obtain a more even circumferential inflow into venturi inlet 1240. Grid 1284 can have an array of evenly spaced and dimensioned orifices or the array can be asymmetric in either orifice positioning or orifice dimensions in order to achieve the desired redistribution of the flow about the venturi entrance 1240.

Also depicted in FIG. 14D is a circumferential indent 1222a in combustion liner 1222 which is intended both to retard the axial flow of combustion products in combustor 1220 to gain more residence time and thus lower CO levels, and to strengthen the structure against buckling. Nozzle assembly 1244 can clearly be seen to be asymmetric in terms of the outlet ports 1246a and 1246b formed by the cooperation of nozzle end cap 1244b and extension member 1244a. As discussed previously, the asymmetries in the nozzle exit ports are intended to allow better distribution of the fuel/air mixture within the volume of the combustion zone while precluding excessive direct impingement of the fuel/air mixture on proximate portions of the combustor liner. That is, exit ports 1246a and 1246b provide fuel/air mixture flows at different angles with respect to venturi axis 1242 and are related to the orientation of the nozzle in the combustion chamber. And, as in the embodiment disclosed in FIGS. 8, 9, 9A and 9B, the total exit area of the nozzle exit ports 1246a and 1246b can be made less than the maximum cross-sectional flow area in venturi-type mixing tube 1234 to provide acceleration through nozzle ports in order to reduce the possibility of "flash backs" and burning within the venturi mixing tube itself. Generally, the area of the maximum flow area is at the end of the diverging portion of the venturi region for venturi-type mixing tubes.

While a single pair of premixers 1232 is shown in the FIGS. 14A–14D embodiment, two or more pairs could be used, each pair feeding an angular sector of the combustion chamber and having a single air valve and respective distribution manifold and distribution conduits located between the associated premixers. In general, particularly for larger engine sizes, it is highly useful to have multiple premixers to provide a substantially even gas velocity distribution in all portions of the combustion zone, to minimize variations in heat transfer to the liner. The shape, location and number of the nozzle ports, such as ports 1246a,b in the FIGS. 14A–14D embodiment, also can impact on the gas velocity distribution and should be taken into account.

Figure 15A:
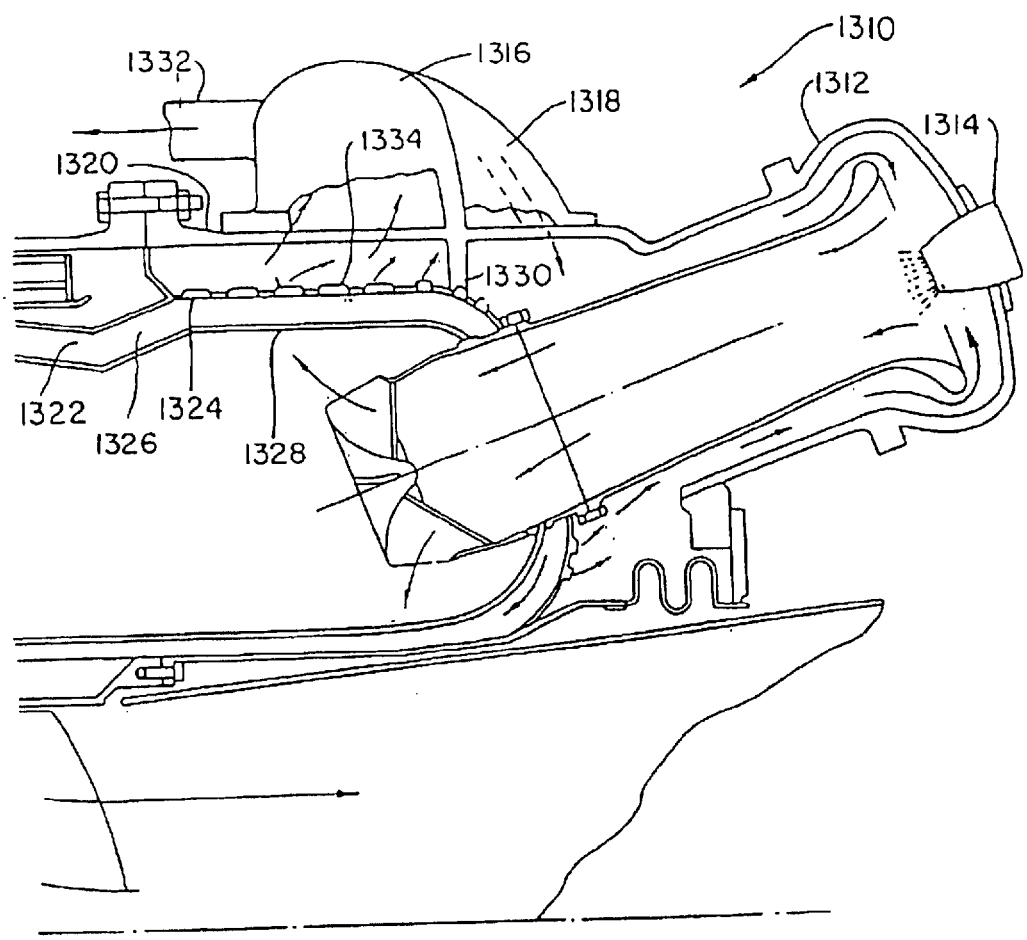
FIG. 15A is a longitudinal, schematic cross-section of yet still another predecessor engine having a single stage combustor with controlled fuel/air ratio.
Figure 15B:
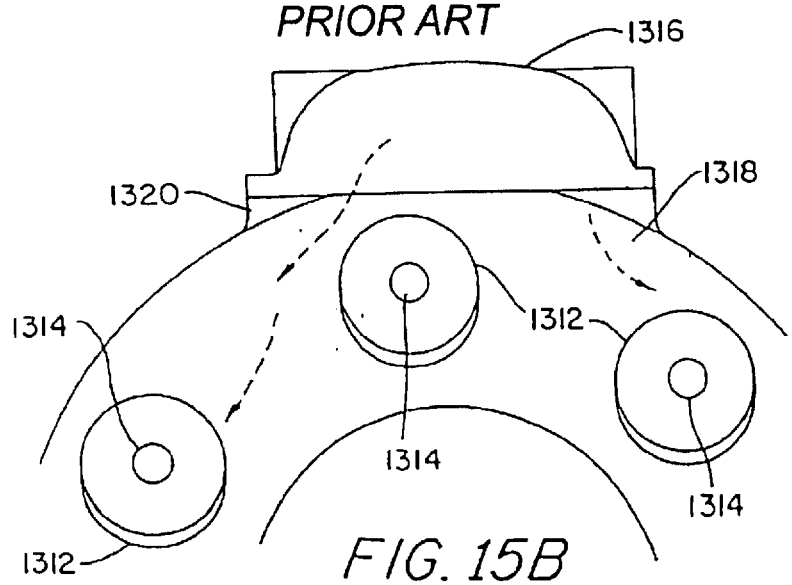
FIG. 15B is a partial end view of the embodiment in FIG. 15A.

Alternatively, multiple premixers can be used each with an associated air valve and actuator, but with the actuators interconnected, e.g., by a rotating ring to provide uniform control. A still further alternative uses a single air valve interconnected with multiple premixers via a doughnut-shaped plenum. Such a configuration is depicted schematically in FIGS. 15A and 15B which show a longitudinal cross-section and end view, respectively, of engine 1310 having multiple premixers 1312 each with a separate fuel nozzle 1314. A single air valve 1316 controls the flow of combustion air to distribution plenum 1318 which feeds each premixer 1312. The cross-sectional flow areas of plenum 1318 are made large enough so that the pressure drop along the flow paths from valve 1316 to the individual premixers is substantially the same, to ensure balanced flow. Air valve 1316 can be mounted on the circumference of pressure vessel 1320 and preferably is of the "cylindrical" type discussed in previous embodiments. As seen in FIG. 15A, compressed airflow enters air valve 1316 directly from the compressor (not shown) through passage 1322 between pressure vessel 1320 and cooling shroud 1324 and also from cooling passage 1326 between shroud 1324 and liner 1328 through aperture 1334. Circumferential seal 1330 blocks compressed air flow from passages 1322 and 1326 directly into plenum 1318. Air valve 1316 is a "three-way valve" shunting excess compressed air directly to secondary dilution ports (not shown) via conduit 1332.

The present invention, as broadly described and claimed hereinafter represents a further and significant improvement of the foregoing single stage combustion apparatus and methods in that it provides a variable mixing tube exit geometry for controlling the velocity and the distribution of the fuel/air mixture discharged to the combustor.

Previous pre-mixer systems of the single stage, constant fuel/air ratio type, as discussed above, have as their main elements an air valve, fuel nozzle, venturi-type mixing tube and a fixed, constant area venturi exit nozzle. At varying loads, the air valve admits varying air mass flows to match the varying amounts of fuel added. With the constant area venturi exit nozzle used in the above constructions, the exit velocity of the premixed charged could vary appreciably, for example from less than 20 m/sec to more than 60 m/sec in a typical single shaft turbine engine. At the lower end, the achievement of stable combustion could cause problems and at the higher end, pressure losses and charge impingement on the combustor walls could be harmful. The variable geometry venturi exit of the present invention could enable pre-mixer operation with a constant, selected exit velocity of, for example 30 m/sec, independent of power rating, or within a range above and below predetermined minimum and maximum exit velocity limits, respectively. Preferred embodiments of the present invention would also provide preselected distribution of the velocity controlled mixture within the combustor volume. This could provide the following advantages:

1. Enhance predictable combustion performance over the entire load range.
2. Avoid flash-back at low loads and impingement at high loads.
3. Reduce pressure losses at higher loads that can cause venturi air "starvation".
4. Better utilization of combustor volume at high fuel/air mass flow rates.

FIG. 16 shows a first embodiment of a gas turbine engine having combustion apparatus made in accordance with the present invention and using premixer apparatus variable exit geometry where the possible side effects of flash backs, flame instability, and/or impingement due to uncontrolled mixing tube exit velocities can be minimized or eliminated. It will be evident from the succeeding discussion that while the methods and apparatus of the present invention can advantageously and preferably be used with the previously described constructions that provide controlled fuel/air ratio mixtures for single stage combustion for gas turbine engines and gas generators, the present invention is not limited to such use.

Specifically, FIG. 16 shows a sectional view through gas turbine engine 1410 having compressor section (not shown) and turbine section 1416 operatively connected for rotation about engine axis 1418. Engine 1410 includes annular combustor chamber 1420, defined by liner 1422, with combustion zone 1424 and dilution zone (not shown). Cooling shroud 1428 surrounds liner 1422 to provide flow passageways for convection cooling of liner 1422 particularly in the vicinity of combustion zone 1424. As with the other constructions discussed previously, combustion zone 1424 preferably is sealed off from the cooling air flowing through passageways 1462 and 1468 (see e.g., FIG. 14D) between shroud 1428 and liner 1422. Thus the combustion zone 1424 receives air for combustion essentially only as part of the fuel/air mixture delivered to combustion zone 1424 through premixer assembly 1430 (to be discussed in more detail henceforth) and thus constitutes a "single stage" combustion zone.

In accordance with the present invention, as broadly envisioned, a premixer apparatus for mixing fuel and compressed air from respective sources to provide a fuel/air mixture comprises a premixer housing operatively connected to the sources of compressed air and fuel, a mixing tube disposed in the housing and having an entrance for receiving fuel and compressed air, an axis, and an exit for delivering a fuel/air mixture, the mixing tube exit having a flow area, and a mixture valve for varying the fuel/air mixture velocity through the exit.

As embodied herein, and with continued reference to FIG. 16, premixer assembly 1430 includes premixer 1432 having venturi-type mixing tube 1434 positioned to receive fuel from a source (not shown) via fuel valve 1435 and fuel nozzle 1436 and air from premixer housing 1438 through venturi inlet 1440. Venturi mixing tube 1434 is configured to deliver fuel/air mixture along venturi axis 1442 and through mixture valve assembly 1444 into combustion zone 1424.

With continued reference to FIG. 16, mixture valve 1444 is formed by the cooperation of valve member 1452 and an exit portion 1454 of mixing tube 1434, as will be discussed hereinafter. Valve member 1452 includes elongated stem 1446 disposed substantially along the mixing tube axis 1442 and conically shaped plate member 1448 disposed proximate mixing tube exit 1454. Valve actuator 1456 engages stem end 1450 through a drive 1458 configured to selectively move stem 1446 and plate member 1448 along mixing tube axis 1442. A person having ordinary skill in the art will appreciate that valve actuator 1456 can comprise a cam drive, a screw drive, a rack and pinion drive, or a hydraulic/pneumatic drive, being located at a position spaced from combustion zone 1424. As shown, drive 1458 includes a cam 1449 that interacts with a spring loaded follower 1447 connected to stem 1446 to provide an infinitely variable position and thus velocity control. A simpler, two position valve motion control using mechanical stops (not shown) can also be used at some sacrifice in velocity control. Stem 1446 extends through aperture 1460 in premixer housing 1438. The effective exit flow area at mixing tube exit 1454 increases or decreases as valve stem 1446 is actuated in one or the other axial direction, respectively because of the influence of plate member 1448.

Portion 1434a of mixing tube 1434 proximate said entrance preferably is curved away from axis 1442 wherein stem 1446 extends through an aperture 1462 in mixing tube 1434. Valve actuator 1456 is capable of engaging stem 1446 outside of housing 1438 and mixing tube 1434.

As further shown in FIG. 16, valve member 1452 preferably includes interconnected cooling channels 1466 formed in plate member 1448 in flow communication with conduit 1468 in stem 1446. Conduit 1468, in turn, is in flow communication with inlets 1470 operatively connected to conduit 1468 for admitting compressed air from housing 1438. Preferably still, plate member 1448 is configured in the shape of a hollow inverted cone with a base edge 1472, and multiple channel exits 1474 distributed about the base edge. Cooling channels 1466 serve to cool plate member 1448. The compressed air admitted directly into combustion chamber 1424 through channels 1466 is small, and not an amount that would significantly affect either the average or local fuel/air ratio. The hollow cone configuration provides a recirculation volume for the fuel/air mixture downstream of the premixer exit which promotes flame-holding and combustion stability. See e.g., discussion in relation to FIG. 11.

In operation, valve member 1452 would be moved along axis 1442 by stem 1446, which is affixed to a spring loaded follower 1447 resting on a cam 1449 that is rotated by actuator 1456 such as at the direction of controller 1457. Controller 1457, which could be a microprocessor, would control the position of valve stem 1446 and thus the mixing tube exit flow area on the basis of engine power (actual or demand) or a related variable, as depicted in FIG. 16.

Generally, high mixing tube exit mass flow rates associated with high power conditions could result in higher than desired velocities for fixed exit areas, thus prompting the need to increase the flow area to decrease the exit velocity to prevent flame instability and/or impingement. This would be accomplished by a left-ward movement of valve stem 1446 in the FIG. 16 schematic. Conversely, for idle flow, minimum mixture mass flow rates, a decrease in the flow area may be needed by right-ward movement of stem 1446 to increase exit velocities above the minimum to guard against flash backs.

Also in accordance with the invention, a sensor preferably is provided for sensing pressure upstream of mixing tube exit, in which a mixture valve actuator, operatively associated with the mixture valve, and a controller, operatively connected to the pressure sensor and the mixture valve actuator, can varying the mixing tube flow exit area in response to the sensed pressure. The controller controls the mixture tube exit flow area to provide mixture exit velocities greater than a predetermined minimum value and less than a predetermined maximum value.

As further embodied in FIG. 16, a sensor 1480 is provided having sensing element 1480a for sensing pressure upstream of the mixing tube exit area between plate 1464 and mixing tube exit 1454. Sensor 1480 is operatively connected to controller 1457, which is operatively connected to actuator 1456 which, in turn, engages valve stem 1446. Thus, in response to sensed pressure conditions alone, or in conjunction with a power level variable as discussed previously, controller 1457 can control mixture valve 1452 to vary the mixing tube flow exit area to provide desired fuel/air mixture exit velocities. Generally, the exit velocity only needs to be controlled to a value or values greater than a predetermined minimum value to avoid flash backs and less than a predetermined maximum value that would cause flame instability and/or impingement problems. This control could be provided by a two-position control scheme for plate member 1448. However, the infinitely variable position control that can be achieved using the cam drive shown in FIG. 16 could be used to control velocity to a single target value, e.g., 30 m/sec, using an appropriate programmed microprocessor for controller 1457.

FIG. 16 further shows controller 1457 being used to control fuel valve 1435, and thus the engine power, and also actuator/valve 1486 controlling compressed air bypass 1488 from premixer housing 1438 to a secondary set of dilution ports (not shown). The object of bypass 1488 is to prevent undue pressure drops in the coolant passages 1468 leading to the primary dilution ports (not shown) for reasons given previously in relation to e.g., the FIG. 13 construction.

Figure 17A:
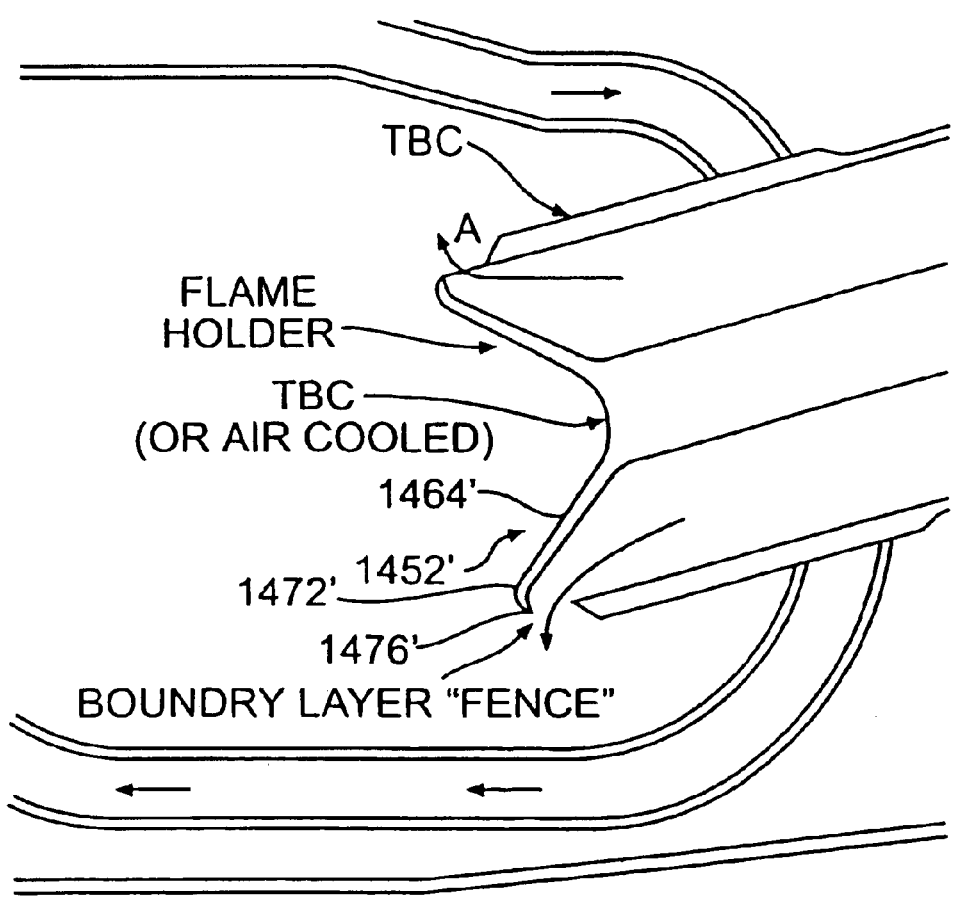
FIG. 17A is a schematic detail cross-section of an alternate mixture exit valve member configuration.

As shown in FIG. 17A, which is a schematic detail of a variation of the FIG. 16 embodiment, plate member 1448' can be configured in the shape of a hollow cone with a base edge 1472', in which base edge 1472' includes a fence 1476' positioned to strip the boundary layer formed on plate member 1448' by the flowing fuel/air mixture. Also, premixer exit 1454' can be sharp edged to increase turbulent mixing.

Also, as is shown in FIG. 17B which is a schematic detail of another variation of the embodiment of FIG. 16, venturi tube 1434" can be spaced from liner 1422" and cooling shroud 1428" by sleeve member 1478" which provides coolant channels 1478a" to prevent excessive temperatures at venturi exit 1454". Due to the compressed air flow through coolant channels 1478a" directly into combustion zone 1424" by passing venturi mixing tube 1434", the fuel/air ratio may not be controlled to the degree possible with the variations in FIG. 16 and FIG. 17A which may relay on a thermal barrier coating to prevent excessive mixing tube exit temperatures. While not presently preferred, however, the variation depicted in FIG. 17B is considered part of the present invention in its broadest aspect and is expected to minimize flash backs and fuel residue due to impingement, as explained previously.

Figure 18A:
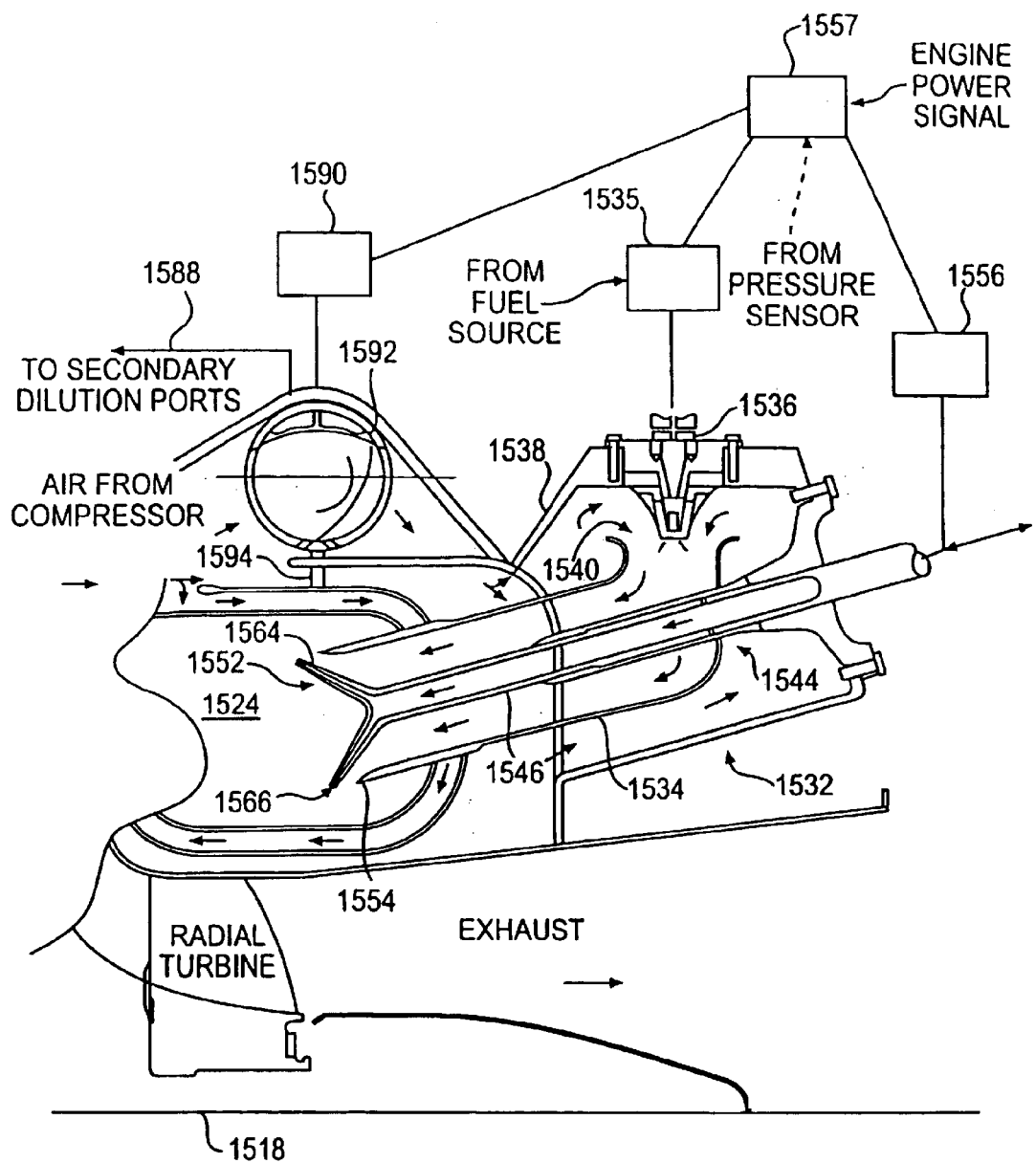
FIG. 18A is a schematic cross-section of a further embodiment of the gas turbine engine module of the present invention.
Figure 18B:
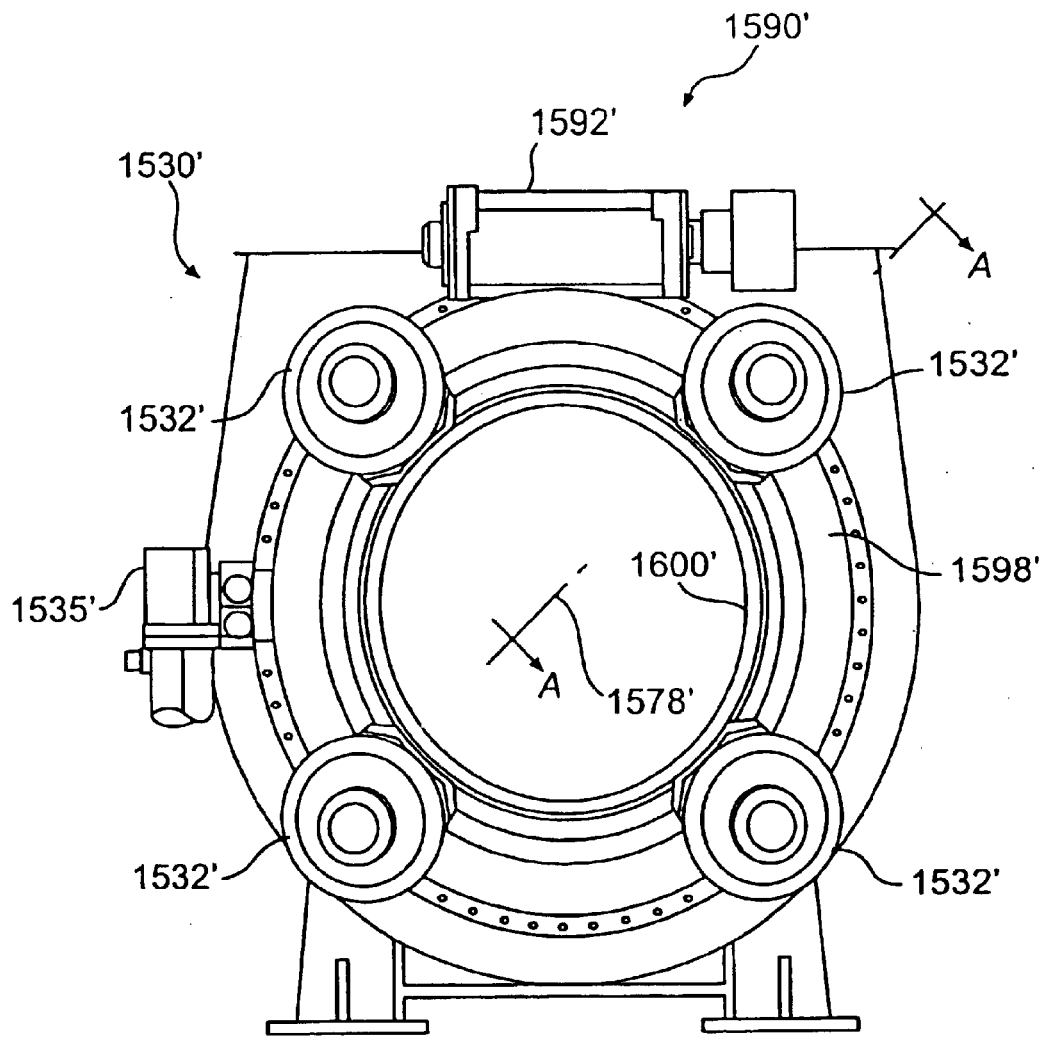
FIG. 18B is a schematic end view of a multiple premixer variation of the embodiment of FIG. 18A.
Figure 18C:
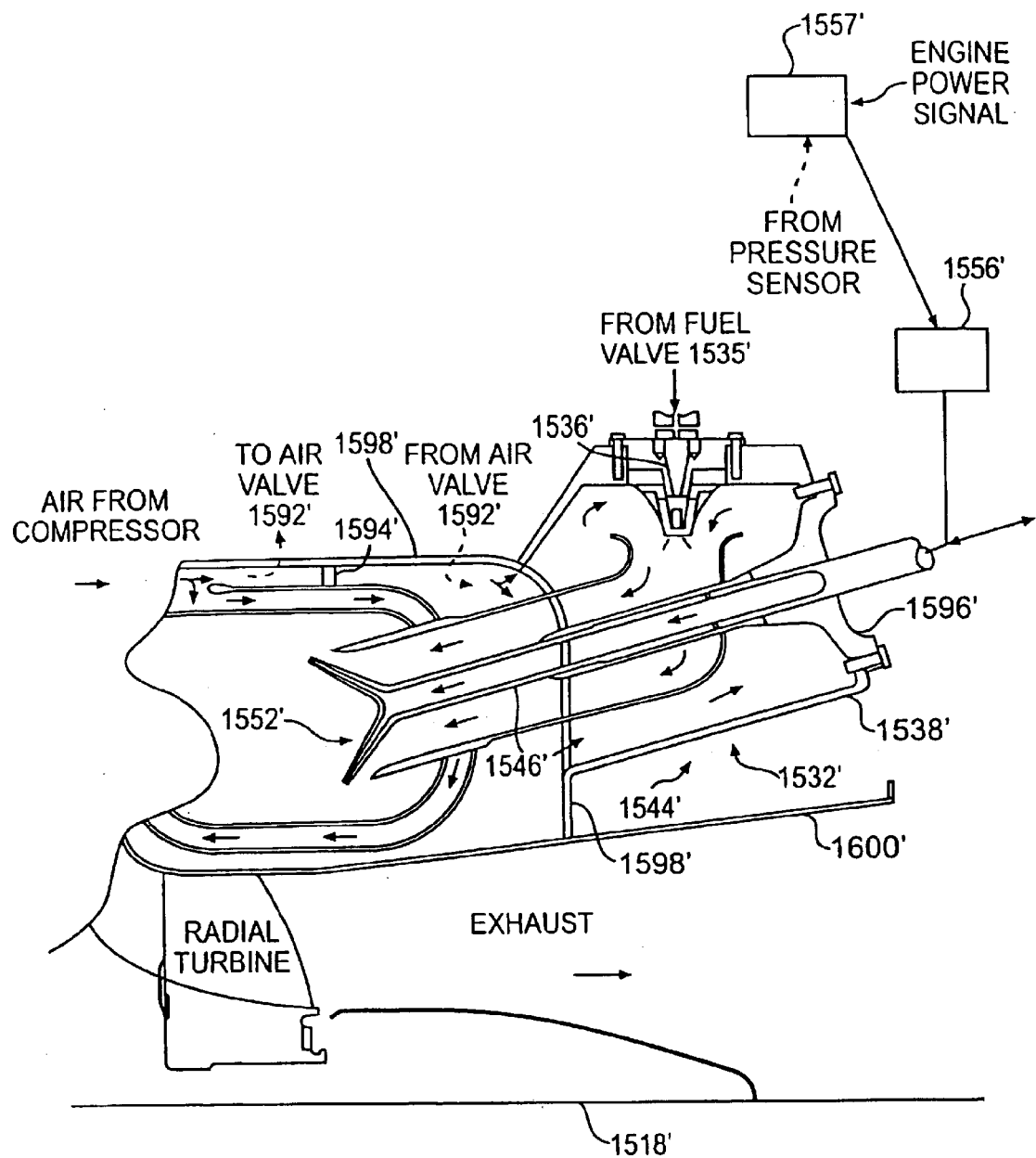
FIG. 18C is a schematic cross-section of the configuration in FIG. 18B taken along the line AA.

FIGS. 18A–18C show other variations of the embodiment of FIG. 16. As shown in FIG. 18A, mixture valve 1552 is provided at exit 1554 of mixing tube 1534. Mixture valve 1552 includes a valve plate 1564 of valve member 1552 configured preferably in the shape of a hollow cone cooperating with mixing tube exit 1554. An exit area is provided between valve plate 1564 and mixing tube exit 1554 to allow fuel/air mixture into the combustion zone 1524. Plate member 1564 is connected to stem 1546 and includes cooling channels 1566. Valve stem 1546 is moved along axis 1542 by actuator 1556 under the control of controller 1557. The exit flow area will vary depending on the axial position of plate member 1564 in relation to mixing tube exit 1554, as discussed in relation to FIG. 16.

Importantly, as compared to the FIG. 16 embodiment, the embodiments depicted in FIGS. 18A–18C include air valve/actuator assemblies that, in conjunction with respective fuel valves, determines the fuel/air ratio of the mixture in the mixing tube. With initial reference to FIG. 18A which shows a single premixer engine configuration, air valve/actuator assembly 1590 directly regulates the flow of compressed air to premixer 1530 under the control of controller 1557. Through the combined control of the fuel from nozzle 1536 via fuel valve 1535 and compressed air via air valve assembly 1590, a mixture with a controlled fuel/air ratio can be obtained for admission to combustion zone 1524, inasmuch as essentially all the air for combustion enters through the premixer as in FIG. 16. While the benefits of the present invention using a controlled mixing tube exit area are not confined to apparatus with controlled fuel/air ratio mixtures, the significant benefits attributable to combustion with controlled fuel/air ratio mixtures discussed previously can be obtained while flash back, flame instability, and/or impingement phenomena are minimized.

It also should be remembered, however, that the FIG. 16 "air valve-less" embodiment can be used to achieve fuel/air ratio control in certain applications where compressed air flow is a function of power level, as discussed in relation to the construction shown in FIGS. 5A and 5B.

Further, air valve assembly 1590 includes three-way valve 1592 for regulating air flow to premixer housing 1538 and thus to venturi inlet 1540, and also to secondary dilution ports (not shown) via bypass 1588, in a manner similar to that shown in the FIGS. 13A, 14C, and 15A, B constructions. However, the premixer apparatus of the present invention can be configured with a two-way air valve if the bypass feature is not used.

Moreover, the premixer apparatus can include multiple premixers as well as the single premixer depicted in FIG. 18A. FIG. 18B shows an axial end view of a four-premixer-single air valve/single fuel valve engine configuration that can achieve space savings for reasons explained in more detail in my copending application Ser. No. 60/081,465, the disclosure of which is specifically incorporated herein by reference. Specifically, the engine depicted schematically in FIG. 18B utilizes air valve/actuator assembly 1590' to control combustion air flow to each of the four premixer 1532' of premixer assembly 1530' while fuel valve 1535' controls fuel flow to the premixers 1532'. The axes of the mixing tubes of premixers 1532' generally intersect axis 1518', similar to the configuration in FIG. 14B, being inclined less than 90° relative to turbine axis 1518'. FIG. 18C, a schematic cross-section taken along line AA of FIG. 18B, depicts premixer 1532' of premixer assembly 1530' at a position circumferentially spaced about axis 1518' from air valve/actuator assembly 1590'. Note in FIG. 18C that compressed air from the compressor is channeled to air valve 1592' by circumferential seal 1594', as in the manner explained in relation to the FIG. 15A construction, and air exiting valve 1592' is distributed to the individual premixers 1532' via manifold 1598'. Manifold 1598' is positioned in the annular space surrounding exhaust cone 1600', in the manner described in Ser. No. 60/081,465.

Alternatively, the premixer apparatus of the present invention can include a separate air valve and fuel valve for each premixer, rather than the single air valve 1592' and fuel valve 1535' used in the embodiment depicted in FIGS. 18B and 18C. Still further, single interconnected mixture valve actuating systems could be used rather than the individual actuators 1556, 1556' shown in FIGS. 18A and 18C. Also, although depicted in dotted lines in FIGS. 18A and 18C, pressure sensors similar to that shown in FIG. 16 as 1480, 1480a could be used to provide a further input to controllers 1557 and 1557' for use in controlling the respective mixture valve positions via actuators 1556 and 1556'.

Still further, it can be seen from FIG. 18C that mixture valve 1552' including stem 1546' and plate member 1564' is slidably mounted in fixture 1596' which is attached to premixer housing 1538'. Fixture 1596' advantageously provides an elongated bearing support for valve stem 1546', as one skilled in the art would appreciate.

Figure 19A:
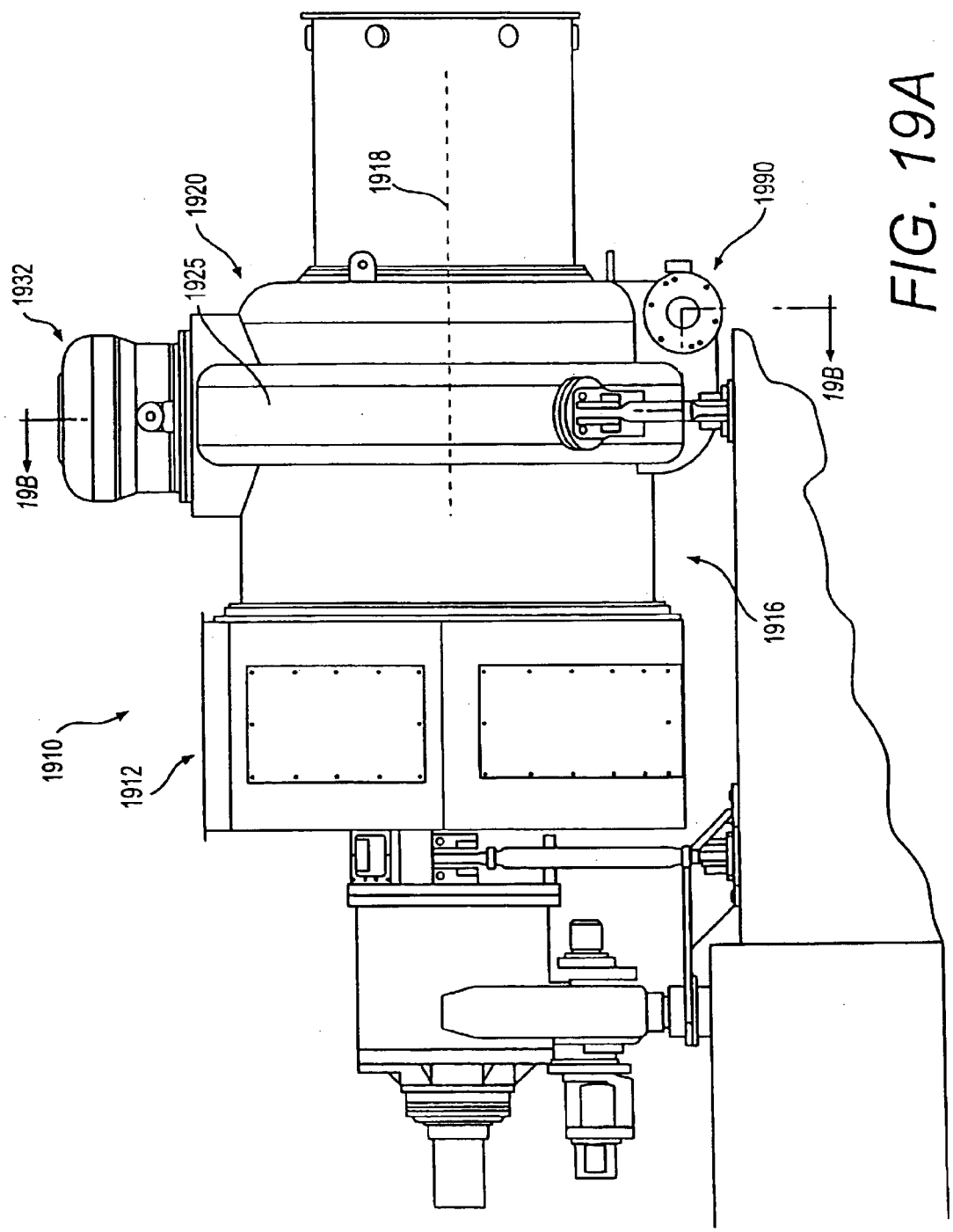
FIGS. 19A–19C are schematics of yet another gas turbine engine embodiment of the present invention which uses variable premixer exit geometry for controlling mixture exit velocity and angular distribution of the discharged mixture for use especially with annular combustors, FIG. 19A being an outside plan view, and FIGS. 19B and 19C being a cross-section view and a detail view, respectively, taken along the line 19B—19B.
Figure 19B:
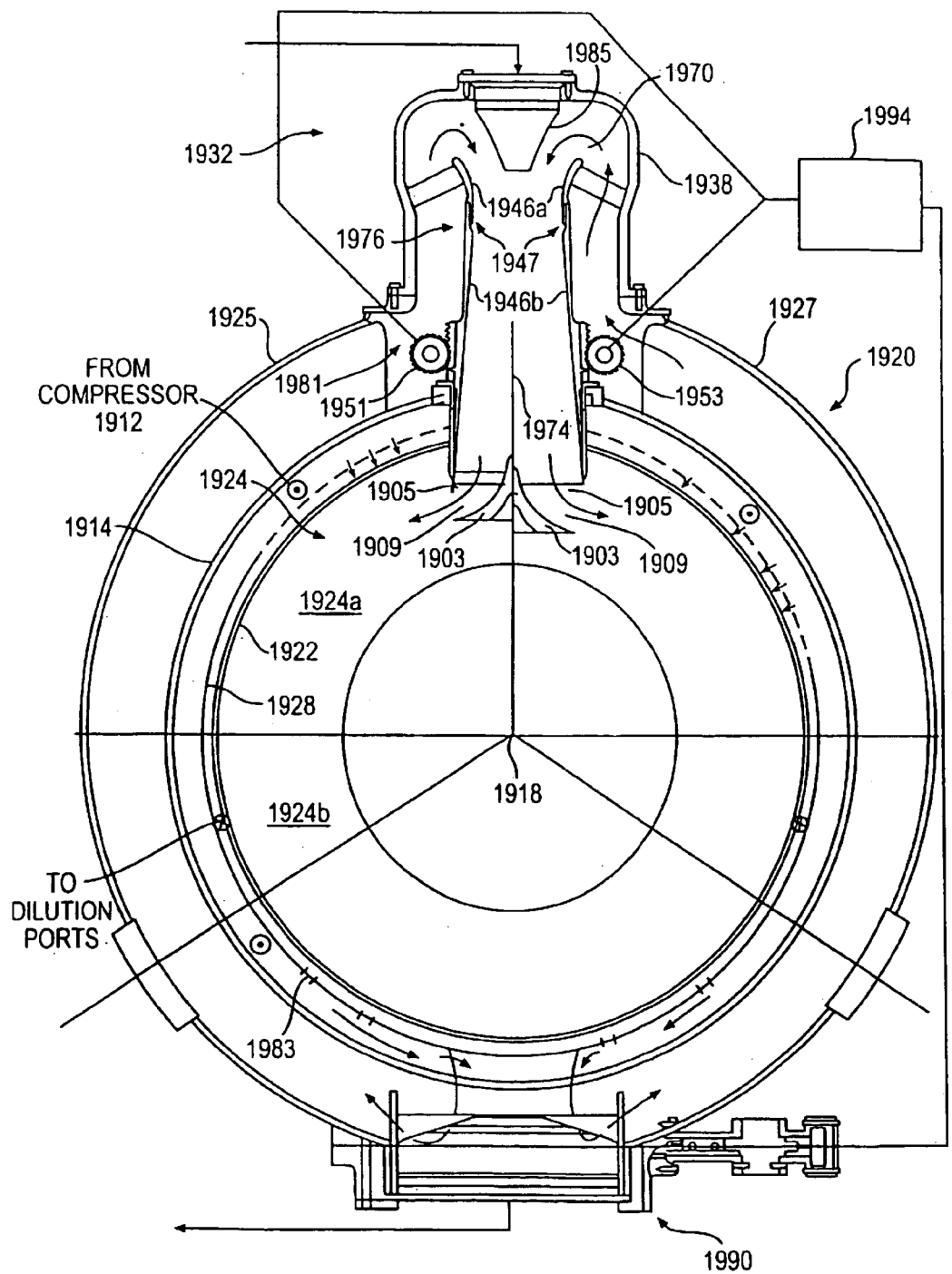
Figure 19C:
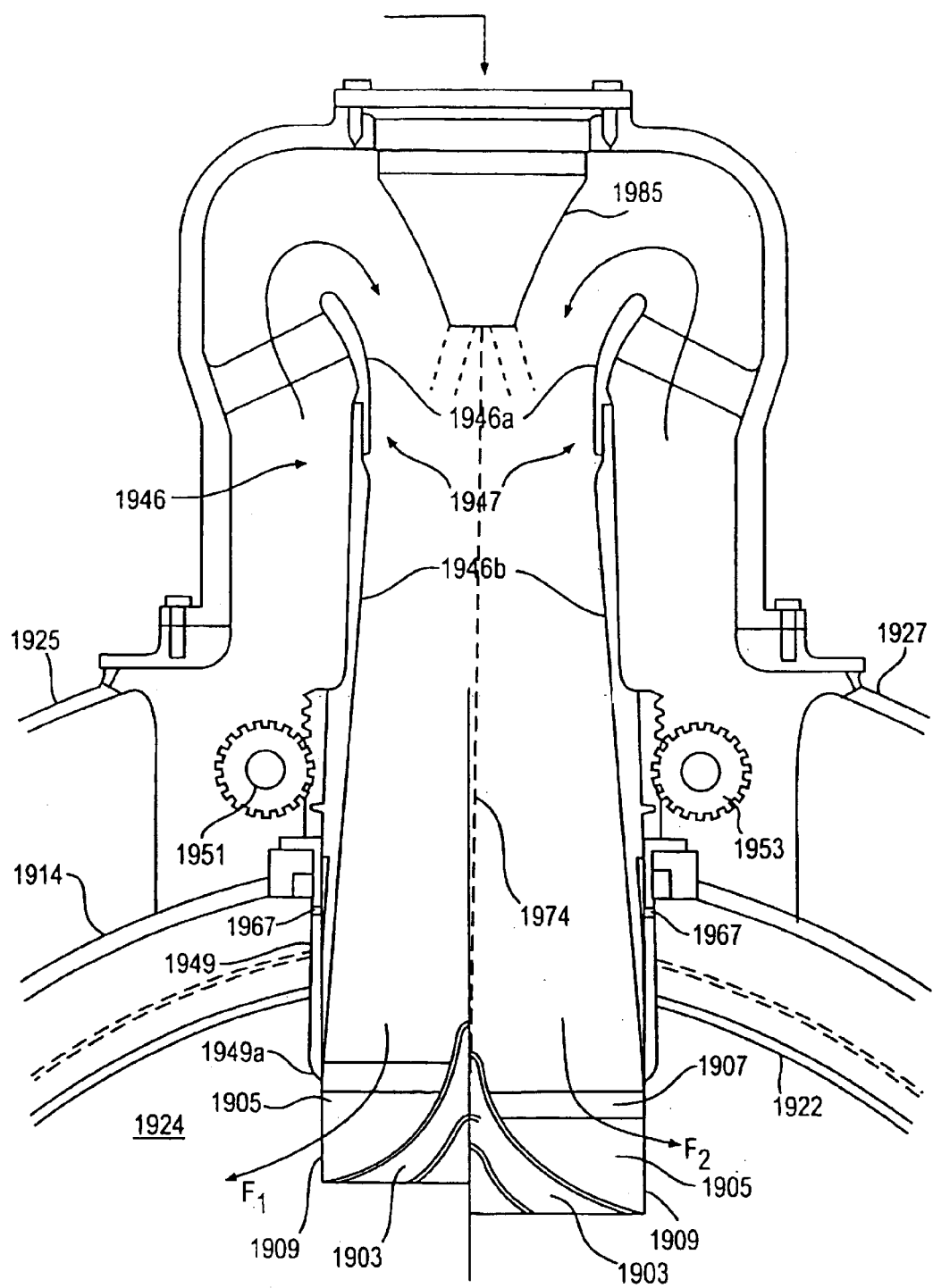

FIGS. 19A–19C depict a second embodiment of the present invention of apparatus, combustor systems, and gas turbine engines utilizing a variable geometry mixing tube exit to control the fuel/air mixture velocity discharged into the combustor from a premixer. Specifically, FIG. 19A depicts a gas turbine engine 1910 with compressor section 1912, annular combustor 1920, and radial turbine 1916 situated similarly to the engine layout in FIG. 8. Engine 1910 includes a single premixer 1932 supplied with a controlled flow rate of compressed air for combustion from single air valve 1990 via a pair of manifolds 1925,1927 (only 1925 visible in FIG. 19A). As depicted in FIG. 19A, air valve 1990 is purposefully disposed at a diametrically opposed angular position relative to premixer 1932, for reasons that will be discussed later. While shown in FIGS. 19A–19C with a single premixer, the present invention nevertheless can be used with multiple premixers with a single or multiple air valves, and the premixers can be angularly inclined with respect to the engine axis 1918, such as shown in e.g., FIGS. 14–15 but using predecessor premixer combustor systems.

As best seen in FIGS. 19B and 19C, premixer 1932 includes a venturi-type mixing tube 1946 including an inlet part 1946a and an outlet part 1946b connected by a sliding joint 1947. Joint 1947 is configured to allow sliding relative movement between venturi part 1946a, which is fixed relative to premixer housing 1938, and part 1946b which is movable along mixing tube axis 1974 by a pair of rack and pinion drives 1951, 1953. Drives 1951, 1953 are mounted internal to premixer housing 1938 but can be synchronously driven in turn by electric, hydraulic, or pneumatic actuators (not shown) mounted external to housing 1938 and under the control of controller 1994 depicted schematically in FIG. 19B. For explanation purposes only, the portion of the venturi part 1946b to the left of venturi axis 1974 in FIGS. 19B and 19C is shown in a fully retracted (upward) position relative to the insertion depth into combustion zone 1924 while the portion of venturi part 1946b to the right of axis 1974 is shown in a fully extended (downward) position.

As best seen in FIG. 19C, movable venturi part 1946b includes nozzle assembly 1972. Nozzle assembly 1972 includes hollow conical end cap 1903, sleeve extension 1907 connected to venturi part 1946b, and wall or rib sections 1905 which define with sleeve 1907 and end cap 1903, nozzle exit ports 1909. Exit ports 1909 together comprise a segmented, generally cylindrical-annular exit flow area geometry. Nozzle assembly 1972 is thus similar to the nozzle assembly construction depicted in use with predecessor systems, particularly the asymmetric nozzle assembly construction adapted for use with annular combustors. Nozzle assembly 1972 together with venturi part 1946b are slidably disposed in co-axial skirt member 1949. Skirt 1949 is connected to engine pressure vessel 1914 and is therefore, like venturi part 1946a, "fixed" relative to movable venturi part 1946b and attached nozzle assembly 1972. FIG. 19C also shows cooling holes 1967 formed in skirt 1949 to provide a small amount of cooling air which flows axially between skirt 1949 and movable venturi part 1946b to reduce operating temperatures in skirt portion 1949a which extends into combustion zone 1924.

Importantly, as can be appreciated from FIG. 19C, the degree of overlapping relation of skirt end 1949a and nozzle assembly exit ports 1909 act to limit the available flow area for the discharged fuel/air mixture. In this sense, movable nozzle assembly 1972 and fixed skirt member 1949 cooperate and act as a valve to increase or decrease the effective flow area of the fuel/air mixture through exit ports 1909 depending upon the direction of movement of venturi part 1946b. That is, for a given fuel/air mixture mass flow rate through premixer 1932, decreasing the available exit flow area by withdrawing venturi part 1946b and nozzle assembly 1972 in an upward direction in FIG. 19C would act to increase the fuel/air mixture velocity, while a downward movement of venturi part 1946b in the FIG. 19C construction would have the opposite affect of increasing the available flow area and necessarily decreasing the mixture exit velocity, as explained previously in relation to the embodiment of the present invention shown in FIGS. 16–18.

The advantages afforded by nozzle assembly 1972 include distributing the fuel/air mixture within the annular combustor without undue wall impingement, as explained in relation to predecessor constructions shown in FIGS. 8–11. As in the FIG. 8 embodiment, nozzle assembly 1972 also can be configured with a reduced exit port area relative to a mixing tube area to accelerate the flow through ports 1909 and provide a greater margin against flash back. Although not shown, the present invention clearly encompasses variations in the construction of the mixing tube and skirt components, such as a single piece movable mixing tube, or a fixed single piece venturi mixing tube (and nozzle assembly) together with an axially movable skirt component. As one skilled in the art would readily understand, it is the relative movement between these components which provides the desired mixture valve effect. Thus, the invention is to be limited only by the appended claims and their equivalents in this respect, and not restricted to the actual embodiments shown.

In operation, and with reference to FIG. 19B, the fuel/air premixer 1932 receives compressed air from the gas turbine engine compressor 1912 (not shown in FIG. 19B) via cylindrical air valve 1990 and manifolds 1925,1927. Manifolds 1925,1927 can be separate conduits or, as shown in FIG. 19B, be formed from members cooperating with the outside surface of pressure vessel 1914. As depicted in FIG.

19B, the air from compressor 1912 flows generally axially between pressure vessel 1914 and cooling shroud 1928. Thereafter, a portion of the compressed air flows through impingement cooling holes 1981,1983 while the balance flows circumferentially to air valve 1990. While depicted in FIG. 19B as a "two-way" air valve, air valve 1990 can be configured as a three-way valve which can divert the portion of compressed air not required for combustion or impingement cooling directly to a second set of dilution ports (not shown) thereby bypassing the normal flow path for coolant air, namely axially, between combustor liner 1922 and cooling liner 1928 to the primary dilution ports (also not shown). A full explanation of the benefits and advantages of such a configuration is set forth in the discussion of the predecessor systems such as the systems shown in FIGS. 13A–13C.

The compressed air that is ducted from the air valve 1990 through manifolds 1925, 1927 to premixer housing 1938 enters venturi 1946 via the inlet venturi part 1946a, which is the fixed part of the venturi mixing tube. This air is mixed with fuel from fuel nozzle 1985 as it flows along premixer axis 1974 until it reaches the end cap 1903 of the nozzle assembly 1972. There the mixture is deflected away from premixer axis 1974 and is distributed in opposing tangential directions designated by the arrows $F_1, F_2$ in FIG. 19C, as well as in the direction of engine axis 1918 (not shown in the Figure). In FIG. 19C, the flow arrow $F_1$ is depicted larger and longer than the flow arrow $F_2$ to represent the increased velocity through nozzle exit ports 1909 when partially restricted by skirt 1949 (left side of premixer axis 1974 in FIG. 19C) relative to the fully extended and open nozzle exit ports on the right side of FIG. 19C.

Although the movement of the venturi mixing tube 1946 can be varied to provide an intermediate opening area, it is expected that a two-position system (fully retracted or fully extended) would suffice since the fuel/air ratio is controlled by air valve 1990 as shown in FIG. 19B. However, the present invention is intended to cover configurations where the position of movable venturi part 1946b would controlled to an intermediate position such as by controller 1994.

Figure 20A:
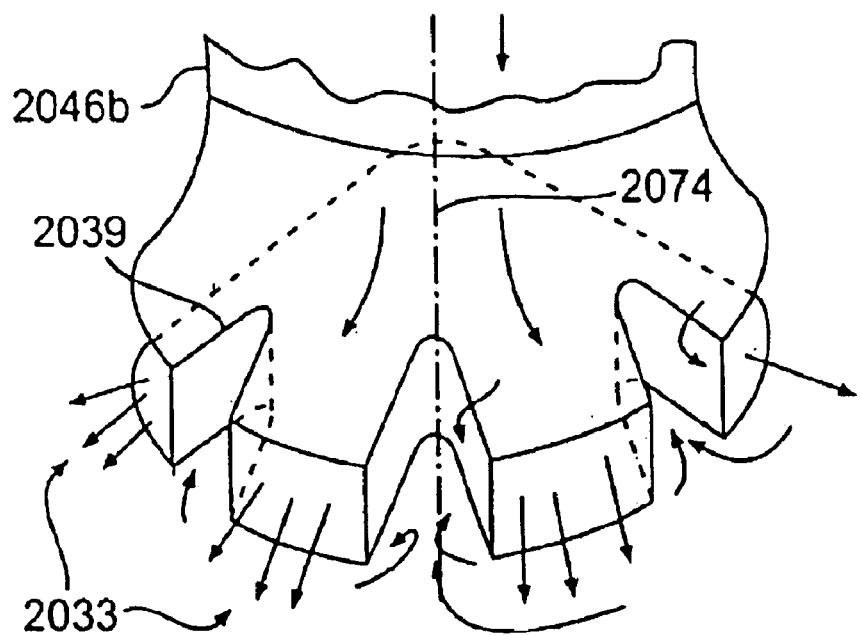
FIGS. 20A and 20B are schematic illustrations of a variation of the variable exit geometry premixer of the FIGS. 19A–19C embodiment but adapted for can-type combustors.
Figure 20B:
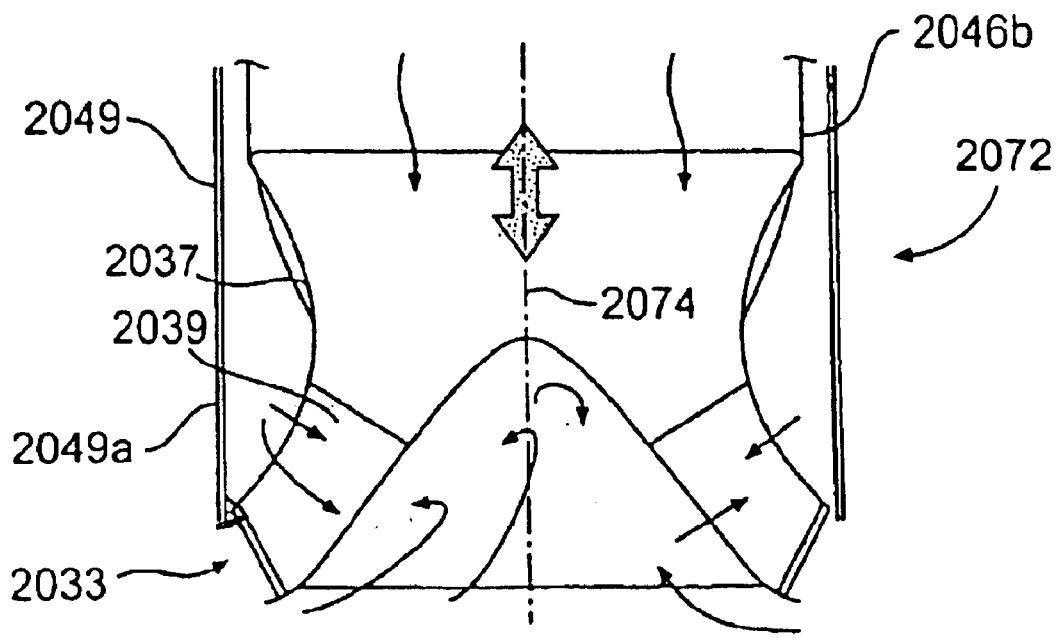

FIGS. 20A and 20B are schematic illustrations of a variation of the premixer variable geometry construction shown in FIGS. 19A–19C suitable for can-type combustors. FIG. 13 depicts such a can combustor application albeit with a predecessor fixed geometry premixer exit system. However, the specific application shown in FIG. 13 is not intended to restrict the application of the embodiment shown in FIGS. 20A and 20B, much less the scope of the present invention.

Specifically, FIG. 20A shows the lower part 2046b, of a venturi-type mixing tube to which is connected nozzle assembly 2072. Nozzle assembly 2072 includes open-ended conical end cap 2035, sleeve extension 2037, and open-ended wedge-shaped ribs 2039 interconnecting end cap 2035 and sleeve 2037. The upper conical surface of end cap 2035 together with wedge ribs 2039 and sleeve 2037 form a plurality of nozzle exit ports 2033 for discharging the fuel/air mixture into the can combustor. Nozzle ports 2033 define generally a segmented cylindrical-annular exit flow area for nozzle assembly 2072. Both open ends of end cap 2035 and the open ends of wedge ribs 2039 provide recirculation of the fuel/air mixture (depicted by curved arrows in FIGS. 20A and 20B) and flame holding downstream of exit ports 2033 to enhance combustion stability.

Nozzle assembly 2072 is thus similar to the axisymmetric nozzle assembly 1132 in the FIG. 13 construction with the important difference that nozzle assembly 2072 can move up or down along mixing tube/premixer axis 2074 along with mixing tube part 2046b. As in the FIGS. 19A–19C embodiment, this movement can be accomplished using rack and pinion drives to move part 2046b relative to a fixed mixing tube part (all not shown). Alternatively, a one piece mixing tube suitably mounted for sliding within a premixer housing (also not shown) carrying nozzle assembly 2072 can be used.

Importantly, as best seen in FIG. 20B, a lower portion 2049a of co-axially disposed stationary skirt 2049 is configured to act with movable nozzle assembly 2072 as a valve to define the effective nozzle flow area through exit ports 2033, to provide mixture exit velocity control. The position depicted in FIG. 20B is the full-open position, representing the maximum insertion depth of nozzle assembly 2072 into the combustor. Withdrawing mixing tube part 2046b and nozzle assembly 2072 (upward) along axis 2074, such as during low power or idle conditions, will cause the axial end 2049a to block a portion of exit ports 2033 decreasing the effective flow area and increasing the velocity, for constant mixture mass flow rate, as one skilled in the art would understand.

With reference again to FIGS. 19A–19C, the particular air valve and premixer orientation shown has a further advantage. Due to the proximity to the premixer nozzle assembly in the FIGS. 19A–19C embodiment and the mixture exit velocity control, the upper half 1924a of combustion zone 1924 in annual combustor 1920 provides most of the reaction zone where combustion of fuel and air take place while the lower half 1924b functions more like a transition duct. The cooling of combustor 1920 is designed according to this requirement. At full power, more than 30% of the engine air massflow is used to cool the top half of the combustor, while only about 20% is required for bottom half cooling. The premixer massflow accounts for about 45% of the air massflow, and about 5% is required for hot section cooling under these conditions. Extracting the air from the bottom half 1924b of the combustor to supply the premixer provides a more optimal split for the following reasons.

First, a smaller amount of air has to be diverted, than if the valve was at the top. Because the compressor delivers the air uniformly distributed to the pressure vessel 1914 surrounding cooling liner 1928, only about 15% (20%+45%–50%) of air has to flow from the top to the bottom half of the engine around the combustor in the case of a top premixer and a bottom air valve placement. In the case of a top air valve and top premixer arrangement, about 25% (30%+45%–50%) of air would have to displaced from the lower half of the engine to the upper half. The available flow areas are thus utilized more efficiently and available pressure drop is conserved with a bottom air valve arrangement, because average velocities and therefore pressure losses are decreased.

The second reason for placing the valve at the bottom in the FIGS. 19A–19C embodiment is that the air traveling to the air valve experiences a static pressure depression according to the equation $P + \frac{1}{2}\rho v^2 = $ CONSTANT. As the static pressure between pressure vessel and cooling liner is decreased, the pressure differential across the cooling liner decreases as well resulting in a decreased cooling mass air flow rate through a fixed size hole. Close to the valve, the amount and thus velocity of air traveling towards the valve is the highest, resulting in the lowest static pressure and lowest impingement cooling flow. However, the impingement cooling flow decreases where less cooling is required if the reaction zone is at the top. Therefore it is advantageous to extract the premixer air in a zone of low cooling requirements, i.e., at the bottom of the engine in the configuration depicted in FIGS. 19A–19C.

In summary, extracting the premixer air from the region of the pressure vessel remote from the premixer exit in a single premixer configuration similar to FIGS. 19A–19C is beneficial because:

1. Less air has to be displaced within the engine;
2. The biggest decrease in static pressure occurs where there is the least cooling required.

In a premixer with a fixed geometry exit, the exit velocity of a premixed charge would vary with the position of the air valve. In a configuration with no variable geometry exit, where the air valve is nearly closed during idle or low power operations, only a small amount of air passes through the venturi mixing tube with the velocity and the range of about 20 m/s in order to provide ample margin above the flame speed, somewhere below the 10 m/s to avoid flashback. In such a construction, at full power the exit speed may exceed 70 m/s and lead to combustion instabilities. Also, at the high end there may be insufficient available pressure drop to push the air through the venturi, leading to reduction in rated power, or to push sufficient cooling air through the cooling shroud to cool the liner and finally to exit the flow through the dilution ports. In order to conserve the pressure drop and yet avoid flash back under part power, it is thus advantageous to use variable exit geometry premixer constructions such as are shown in FIGS. 16–21A,B. When the compressor flow varies the flow, for example, in a two-shaft engine or in any multi-spool engine, the idle mass flow could be very small at low powers, making the use of a variable exit premixer even more beneficial in order to avoid flashback with resulting internal premixer burning. In addition to preserving pressure loss in the system, an important additional advantage of variable exit geometry, particular embodiments such as FIGS. 19A–C and 21A and B which provide asymmetric distribution of the discharged mixture relative to the premixer axis, is to reduce the high exit velocity at full power compared to a fixed exit geometry system and provide control of the distribution of the fuel/air mixture in the combustion chamber. These features can cooperate to substantially reduce the impingement and thermal load on the combustor liner. Furthermore, the combustor volume would have a higher utilization by needing shorter distances from the premixer exit to reach the lower flame speed velocity required for stable combustion.

With the above detailed description of the combustor system and fuel/air premixer apparatus and method of operating same of the present invention, those skilled in the art would appreciate that modifications may be made to the invention without departing from its spirit. Specifically, while the implementation of the invention is described above in relation to a radial gas turbine engine (except for FIGS. 20A,B), the subject invention is not limited to this specific type of gas turbine engine, but can be adapted to axial and mixed axial-radial, as well. Similarly, while control of the mixture valve actuator such as actuator 1556 in FIG. 18A by a controller (e.g. 1557) or the actuator (not shown) for drives 1951, 1953 under control of controller 1994 in FIG. 19B, which controllers can be microprocessors as presently preferred for accuracy, it may be preferred to use a more simplified and thus less costly control construction.

For example, the movement of the movable mixture valve component could be mechanically or hydraulically/pneumatically activated by the air pressure in the venturi top box which changes with changing settings of the main air valve. Alternatively, the component can be moved mechanically or hydraulically in connection with movement or position of the actuator which operates the main air valve in response to a power signal (e.g. fuel flow, torque indication, etc.). In either case, at high loads the annular air gap is the largest and at idle it is the smallest, keeping the velocity change small from idle to full load for continuous position control. Of course, as previously mentioned, a less expensive version could use two settings, low and high which nevertheless would constitute an improvement over the fixed geometry in the predecessor constructions. All previous discussion about cooling and flame holding are still relevant.

FIGS. 21A–21D depict further embodiments of the invention. Specifically, the embodiments of FIGS. 21A–D provide a new, more simplified configuration, while still providing both the variation of the premixer exit flow area common to all embodiments and the control of the direction of the discharged fuel/air mixture to avoid or minimize impingement of nearby combustor liner surfaces typified by the FIGS. 19A–C embodiment. The embodiments of FIGS. 21A–D essentially utilize a mixture valve configured as an adjustable nozzle having a hollow, conical, centrally located, shaft-driven movable valve plate similar to that shown in the FIG. 16 embodiment, but with a fixed surrounding skirt having a trailing end contoured to provide flow ports for fuel/air mixture distribution within a combustor, such as an annular combustor.

Figure 21A:
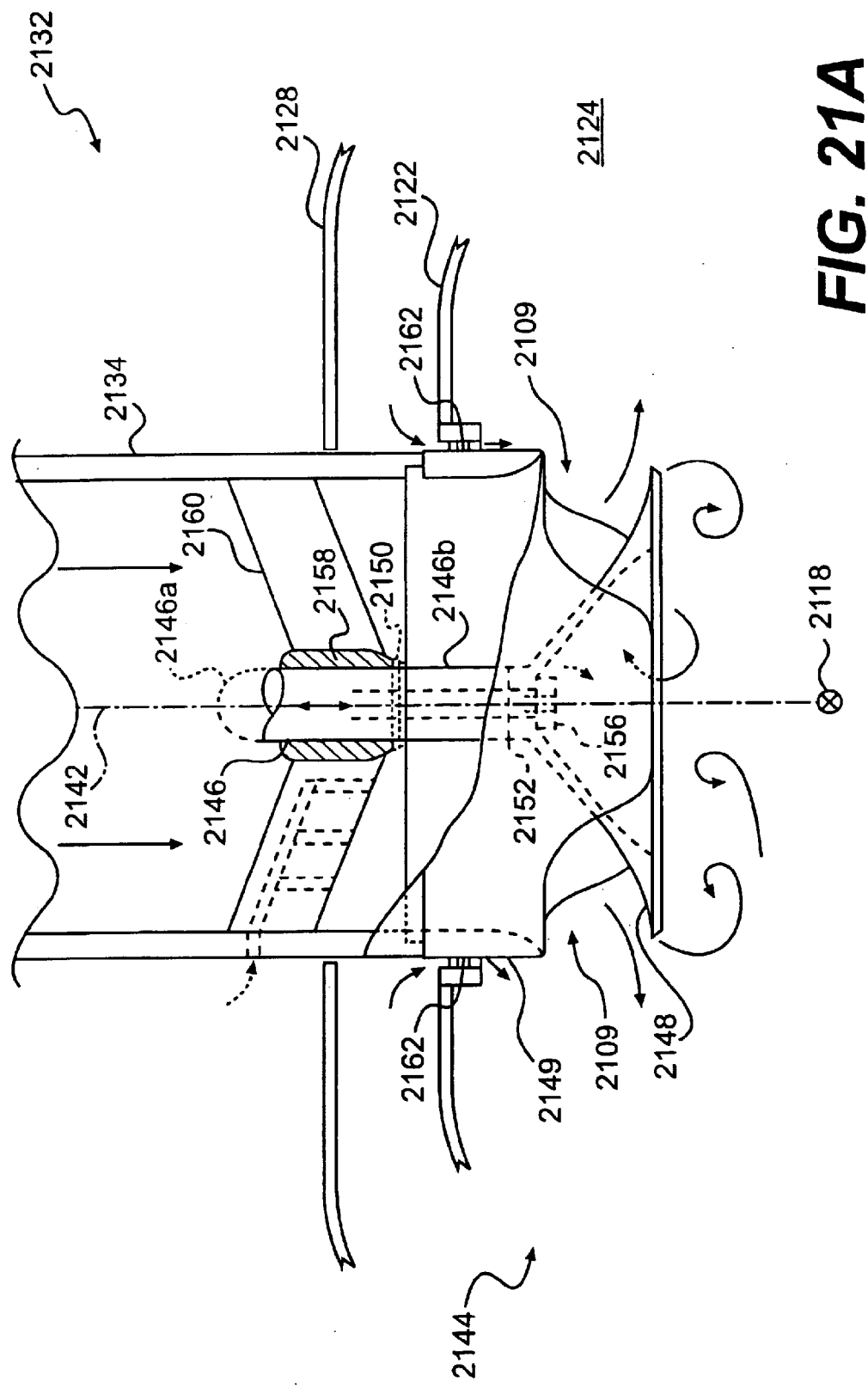
FIG. 21A is a schematic cross-section of portion of a gas turbine engine combustor with yet another premixer embodiment having variable exit geometry for controlling exit velocity and angular distribution of the discharged fuel/air mixture.

With reference to FIG. 21A, there is shown the exit portion of venturi-type mixing tube component 2134 of fuel/air premixer 2132. Mixing tube configurations other than a venturi-type could be used but a venturi-type is presently preferred. As depicted in FIG. 21A, mixture valve 2144 includes an inner valve member including plate 2148 and stem or shaft 2146, and a co-axial outer valve member, namely skirt 2149. Plate 2148 is generally conical in shape and hollow to improve flame holding, as discussed previously. Plate 2148 is coupled via tie bolt 2156 to shaft 2146 which, in turn, is mounted to the exit of venturi 2134 via sleeve bearing 2158 and struts 2160 for reciprocal, sliding movement along venturi axis 1442. FIG. 21A shows two of three struts 2160 contemplated, but fewer or a greater number of mounting struts could be used.

Shaft 2146 can be driven by mechanical, hydraulic, or pneumatic actuator such as, for example, through the cam and spring arrangements depicted in FIG. 16. One skilled in the art also would appreciate that the depicted construction could be adapted to use the driving mechanism depicted in FIGS. 19B,C. In such a construction plate 2148 could be fixed to struts 2160 using a truncated stem depicted in FIG. 21A by rounded shaft end 2146a (shown dotted), and bearing 2158 eliminated. The exit portion of venturi 2134 to which struts 2160 are affixed would then be movable with respect to a venturi entrance portion (not shown) using controlled actuators working through gear and rack mechanisms, similar to the arrangement depicted in FIGS. 19B,C. In such a construction, skirt member 2146 would not be mounted to venturi 2134 but would be fixed or at least movably connected to a premixer or combustor member such as the premixer housing (not shown), combustor liner 2122, or the surrounding cooling shroud 2128. Shims 2150 (shown dotted in FIG. 21A) could be used to adjust the initial positions of valve plate 2148 at assembly.

In the FIGS. 21A–D embodiments, skirt member 2149 is generally cylindrical but has trailing end 2149a contoured to provide reliefs or ports 2109 for channeling at least most of the mixture flow in two generally opposed directions, such as the opposed tangential directions relative to annular combustor axis 2118 similar to the construction depicted in FIG. 19B. As with the mixture valve 1944 of the FIGS. 19A–C embodiment, mixture valve 2144 can be made asymmetric e.g. to provide some longitudinal mixture flow along the combustion chamber axis 2118 to better utilize the volume of combustion zone 2124. In such a variation of the FIGS. 21A–D embodiments, this could be easily accomplished by providing suitable additional ports or reliefs in contoured skirt end 2149a angularly between the opposed depicted ports 2109.

In the FIGS. 21A–D embodiments, skirt 2149 is fixed and plate 2148 is movable via shaft 2146 to provide an exit flow area in accordance with system requirements as determined by an appropriate control system (not shown) similar to those depicted in FIGS. 16, 18A, and 19B. However, as stated previously, in alternate configurations in accordance with the present invention, plate 2148 can be fixed and skirt 2149 can be configured to be movable, or both could be configured to be movable, although with a significant increase in complexity and cost. Continuously variable or stepped (e.g. 2-stop) movement could be provided by the control system as discussed previously.

The premixer is mounted with mixture valve 2144 protruding into combustion zone 2124 through a sealed aperture in liner 2122. Seal 2162 is shown as a labyrinth seal, but could also be a piston ring, brush, or another seal type. As established during testing, excessive leakage flow through an unsealed opening can create a curtain of air surrounding the mixture valve which can divert and destabilize the combustion under certain operating conditions, particularly idle or low power operation.

Figure 21B:
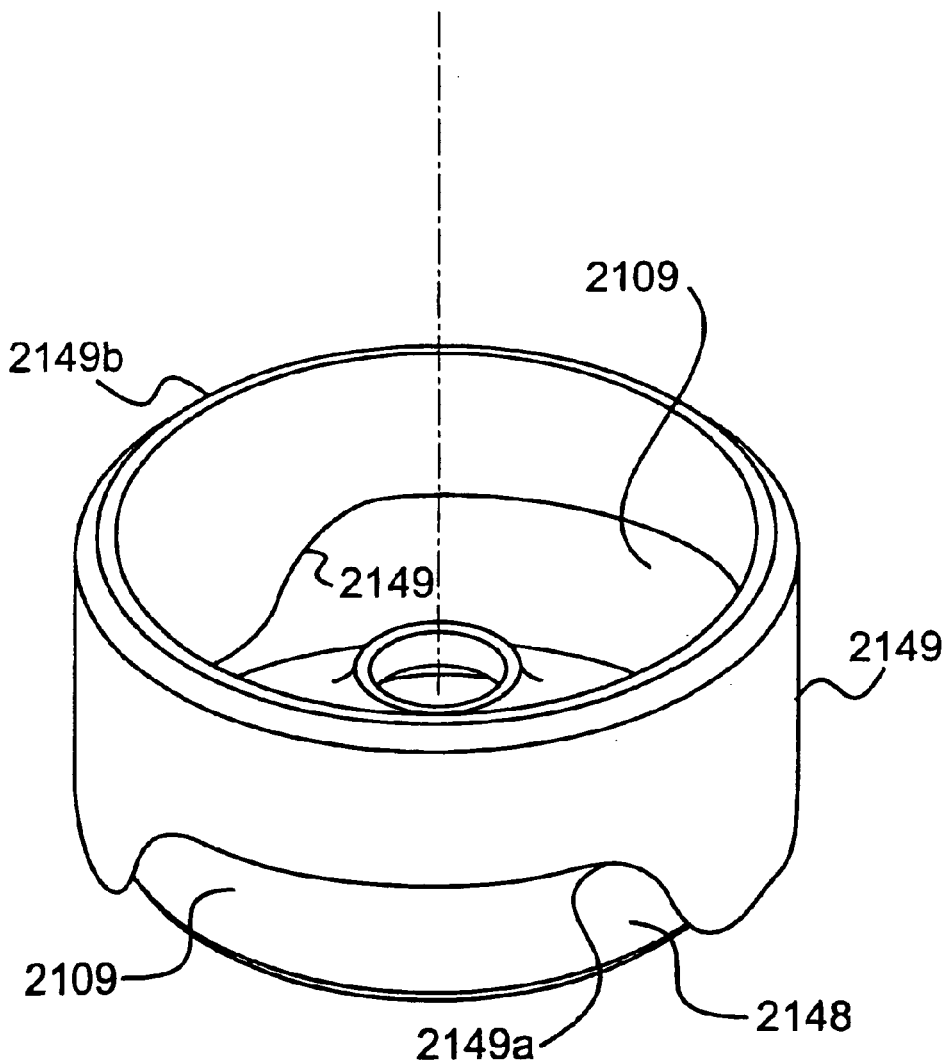
FIG. 21B is a detail of exit nozzle components of the premixer depicted in FIG. 21A.

Depicted in FIG. 21B are two of the components of mixture valve 2144, namely plate 2148 and skirt 2149. Under unfavorable operating conditions, for example with inferior liquid fuels, "flash-back" into the exit portion of venturi 2134 may occur. In order to safeguard against heat damage through oxidation or meltdown of portions of these components, skirt 2149 and/or plate 2148, if constructed from metal materials, could include appropriate cooling channels, such as those depicted schematically for plate 1648 in FIG. 16. See also the disclosure of Applicant's pending application Ser. No. 09/721,964 filed Nov. 27, 2000, the disclosure of which is hereby incorporated by reference. Alternatively, or additionally, skirt 2149 and/or plate 2148 could be provided with a thermal barrier coating (TBC) known to those skilled in the art of gas turbine engine components.

However, one or both plate 2148 and skirt 2149 are preferably formed from a ceramic material which preferably includes dispersed ceramic fibers to ensure integrity if cracking should develop during prolonged engine operation. It is expected that a ceramic mixture valve plate 2148 and skirt 2149 could be readily fabricated by casting and then sintering. Also, lower portion 2146b of shaft 2146 could be ceramic as well. While shrinking may occur during sintering, those skilled in the art of fabricating shaped ceramic articles would be able to select appropriate "green" casting dimensions to yield near-net final (sintered) shapes without undue experimentation. Appropriate finishing can be used to provide desired final dimensions and shapes.

Due to the different expansion coefficients of ceramics and metals, the ceramic and metal parts could be flexibly clamped together using appropriate mounting arrangements. Those familiar with the engineering state of the art would know to consider using such devices as Belleville washers or "wiggle strips" at these joints to provide thermal expansion flexibility thereby reducing stresses and the chance of cracking of the ceramic parts. For example, a Belleville washer (not shown) could be provided at shaft/plate joint 2152 in FIG. 21A, or at the location of shims 2150 if the lower part 2146b of shaft 2146 was also formed from a ceramic material.

Most metals loose their strength at a level about 300° C. below that of ceramics, allowing more margin for the effects of flash-back by the use of ceramics. Hence, appropriate cooling channels may be provided in struts 2160 (shown dotted in FIG. 21A, in one strut only), in tie bolt 2156 (channel exit shown dotted in FIG. 21A), and/or in shaft 2146 (not shown) even when using ceramic materials for plate 2148 and skirt 2149, if required.

FIGS. 21C and 21D depict details of a variation of the embodiment of FIGS. 21A and 21B which has a bayonet-type clamping mechanism between ceramic skirt 2149' and the metal exit portion of venturi 2134'. Axially directed slots 2164' and an annular groove 2166' are provided in the exit portion of venturi 2134' for receiving fingers 2168' cast into skirt mating end 2149b'. In addition to compensating for different expansion coefficients of the metal and ceramic components, metal wiggle strip 2170' provides an axially directed retaining force tending to seat fingers 2168' in recesses 2172' in annular groove 2168' after skirt 2149' is inserted against wiggle strip 2170' and rotated to aligned fingers 2168' and recesses 2172'. Three sets of slots 2164', fingers 2168', and recesses 2172' are contemplated but fewer or greater sets could be used. Additional annular wiggle strip 2174' can be used to provide a radially directed centering force for skirt 2149'. Also, one skilled in the art could provide other clamping mechanisms including other bayonet or even screw-type mechanisms.

It should be understood that the premixer and combustor embodiments described above and depicted in the drawings can be used in various gas turbine gas generator and engine configurations including, but not limited to, the predecessor gas generator and engine configurations discussed previously as well as the configurations discussed in relation to the variable exit geometry embodiments of FIGS. 16 through 21A–D. Also, the present invention can be used in engine configurations, both annular and can combustor types, having multiple premixers, as well as engine configurations with a single premixer such as shown in the FIG. 19B embodiment.

Therefore, it is not intended that the scope of the invention be limited to the specific embodiments illustrated and described above. Rather, it is intended that the scope of this invention be determined by the appended claims and their equivalents.

What is claimed:

1. Apparatus for premixing fuel and air to provide a fuel/air mixture, the apparatus comprising:

a fuel valve for controlling a flow of fuel;

an air valve for controlling a flow of air in accordance with the flow of fuel to provide a controlled fuel/air ratio;

a mixing tube configured for receiving and mixing the fuel and air, the mixing tube having an entrance, an axis, and an exit for discharging a fuel/air mixture; and a mixture valve associated with said mixing tube exit and separate from the fuel valve and the air valve, the mixture valve including inner and outer mixture valve members that together define an asymmetric exit flow area;

wherein the defined exit flow area includes at least two segmented, substantially opposed, mixture flow-directing area portions with respect to an angular position about the mixing tube axis;

wherein said mixture valve is configured to asymmetrically flow said fuel/air mixture predominantly through said mixture flow directing area portions; and wherein at least one of said inner and outer mixture valve members is movable relative to the other of said valve members to selectively vary the defined exit flow area with respect to time.

2. The premixer apparatus as in claim 1 wherein at least portions of said inner and outer valve members are formed from a ceramic material.

3. The premixer apparatus as in claim 1 wherein the inner mixture valve member is a nozzle fixed to the mixing tube and the outer mixture valve member is a skirt co-axially surrounding the nozzle with respect to the mixing tube axis and having a skirt end, wherein the skirt end and the nozzle define an exit flow area, and wherein said defined exit flow area and said mixture velocity vary with relative positions of the skirt end and the nozzle during said relative movement therebetween.

4. The premixer apparatus as in claim 3 wherein said skirt is fixed and wherein said nozzle is movable, relative to the mixing tube entrance.

5. The premixer apparatus as in claim 3 wherein the nozzle includes two or more channels terminating in respective ports.

6. The premixer as in claim 1 wherein the inner valve member includes a valve plate;
wherein the outer valve member includes a skirt with an end contoured to provide said segmented area portions; and
wherein said flow area and said mixture velocity vary with relative positions of the valve plate and the skirt end during said relative movement therebetween.

7. The premixer apparatus as in claim 6, wherein the skirt is fixed and the valve plate is movable, relative to the mixing tube entrance.

8. A gas turbine gas generator including the premixer apparatus as in claim 1, and further including an annular combustor operatively connected to the mixing tube exit and having an axis, wherein the flow through said mixture flow directing area portions is also substantially tangential to the combustor axis.

9. Apparatus for combusting fuel and air comprising:
an annular combustion chamber having an axis;
at least one premixer configured to receive fuel and air;
wherein said premixer has a venturi for mixing the received fuel and air to form a fuel/air mixture and an exit in fluid communication with the combustion chamber for discharging the fuel/air mixture, the venturi having an axis;
wherein the premixer exit further includes inner and outer members defining an asymmetric exit flow area, said exit flow area including area portions configured for channeling the fuel/air mixture in substantially opposed tangential directions relative to the chamber axis;
wherein said inner member is configured to asymmetrically flow said fuel/air mixture predominantly through said fuel/air mixture channeling area portions;
wherein at least one of said inner and outer members is movable along said venturi axis relative to the other to selectively vary said defined exit flow area with respect to time, whereby a mixture discharge velocity can be varied;
wherein said premixer includes a compressed air flow path between a compressed air source and said venturi, and a fuel flow path between a fuel source and said venturi;
wherein the combustion apparatus further includes an air valve and a fuel valve disposed in the respective fuel and air flow paths for controlling the fuel/air ratio of said fuel/air mixture; and
wherein relative movement between said inner and outer members varies the velocity of the controlled fuel/air ratio discharged mixture.

10. The combustion apparatus as in claim 9 further including an air valve actuator operably connected to move said air valve;
an actuator operatively connected to move said at least one movable member; and
a controller operatively connected to the air valve actuator and the movable member actuator.

11. Apparatus for combusting fuel with air, the apparatus comprising:
an annular combustion chamber having an axis;
(1) means for controlling a flow of the fuel;
(2) means for controlling a flow of the air in accordance with the flow of fuel to provide a controlled fuel/air ratio;
at least one premixer configured to receive the fuel and air, the premixer further including
(3) means for mixing the received fuel and air to form a fuel/air mixture,
(4) exit means in fluid communication with the combustion chamber for distributing the fuel/air mixture to the combustion chamber; and
wherein said exit means further includes:
(i) means for defining an asymmetric exit flow area, said exit flow
area including area portions for asymmetrically channeling fuel/air mixture
flow predominantly in substantially opposed tangential directions relative to
the combustion chamber axis, and
(ii) means separate from the fuel flow controlling means and the air flow controlling means, for selectively varying the defined exit flow area with respect to time.

12. The combustion apparatus in claim 11 further including means for sensing a parameter selected from the group consisting of torque, fuel flow, and power; and
control means responsive to said parameter sensing means for controlling said selectively varying means.

13. Apparatus for premixing fuel and air to provide a fuel/air mixture, the apparatus comprising:
a mixing tube configured for receiving and mixing the fuel and air, the mixing tube having an entrance, an axis, and an exit for discharging the fuel/air mixture;
a mixture valve associated with said mixing tube exit;
wherein said mixture valve includes coaxial inner and outer valve members having respective ends that define an asymmetric exit flow area;
wherein at least the outer valve member end is contoured such that the defined exit flow area includes two opposed exit area portions with respect to an angular position about the mixing tube axis and through which the fuel/air mixture predominantly flows and exits asymmetrically; and
wherein at least said inner valve member is movable relative to the outer valve member to selectively vary the exit flow area with respect to time.

14. The premixer apparatus as in claim 13 wherein at least a portion of said inner valve member is formed from a ceramic material.

15. Apparatus for combusting fuel and air comprising:
an annular combustion chamber having an axis;
at least one premixer configured to receive fuel and air;
wherein said premixer has a venturi for mixing the received fuel and air to form a fuel/air mixture, the venturi having an axis;
wherein the premixer has an exit in fluid communication with the combustion chamber for discharging the fuel/air mixture;
wherein the premixer exit includes inner and outer members defining an asymmetric exit flow area;
wherein at least said outer valve member is configured to define exit flow area portions asymmetrically positioned for directing the fuel/air mixture predominantly in substantially opposed tangential directions relative to the chamber axis, and
wherein at least said inner member is movable relative to the outer member to selectively vary said defined exit flow area with respect to time, whereby a mixture discharge velocity can be varied.

16. The combustion apparatus as in claim 15 wherein portions of said inner and said outer members are formed from a ceramic material.

17. A gas turbine engine having the combustor apparatus of claim 15.

18. A method for controlling the velocity and direction of a fuel/air mixture discharged from a premixer apparatus, the apparatus having a fuel/air mixing tube flow-connected to respective sources of fuel and compressed air, the mixing tube having an axis, an inlet, and an exit for discharging the fuel/air mixture, the method comprising:
controlling the rate of flow of fuel and rate of air flow into the mixing tube inlet to provide a controlled fuel/air ratio;
providing a mixture valve associated with the exit including inner and outer valve members together defining an asymmetric exit flow area;
asymmetrically channeling the discharged fuel/air mixture predominantly in at least two opposed directions relative to an angular position about the axis using the mixture valve; and
moving at least one of the inner and outer valve members relative to the other to increase or decrease the exit flow area, whereby the channeled fuel/air mixture velocity is respectively decreased or increased.

19. The method as in claim 18 further including the steps of
sensing the pressure in the mixing tube upstream of the exit; and
controlling the position of said at least one of the inner and outer valve members relative to the other in accordance with the sensed pressure.

20. The method of claim 19 wherein the controlling step includes the step of controlling the position to either one of two preselected positions.

21. The method as in claim 18 wherein the premixer apparatus is mounted on an annular combustor of a gas turbine gas generator, the annular combustor having an axis, the method including the preliminary step of positioning the mixture valve such that said two opposed directions are substantially tangential to the combustor axis.

22. A gas turbine gas generator operable with a fuel source, the gas generator comprising:
an air compressor;
a turbine;
a shaft assembly interconnecting the air compressor and the turbine;
and a combustor operatively connected to provide combustion gases to the turbine;
wherein the engine further includes one or more premixers each having
(1) a mixing tube configured for receiving and mixing the fuel and air, the mixing tube having an axis and an exit for discharging a fuel/air mixture to the combustor; and
(2) a mixture valve associated with said mixing tube exit and including inner and outer valve members that define an asymmetric exit flow area;
wherein the defined exit flow area includes at least two segmented, substantially opposed area portions with respect to an angular position about the mixing tube axis;
wherein said inner mixture valve member is configured to asymmetrically flow said fuel/air mixture predominantly through said at least two opposed area portions;
wherein the segmented area portions include ports for directing the discharged fuel/air mixture relative to the mixing tube axis;
wherein at least one of said inner and outer valve members is movable relative to the other of said valve members to selectively vary the defined exit flow area with respect to time;
wherein the gas turbine gas generator further includes a compressed air path interconnecting the compressor and each mixing tube; a fuel path interconnecting the source of fuel and each mixing tube; an air valve positioned in the compressed air path, and a fuel valve positioned in the fuel path; and
wherein the air valve and fuel valve are separate from said mixture valve and are operable to control a fuel/air ratio of the mixture discharged from said mixing tube through said mixture valve.

23. The gas turbine gas generator as in claim 22,
wherein the gas turbine gas generator is a radial turbine gas generator having an annular combustor surrounding the turbine and the turbine having an axis;
wherein said ports direct the discharged fuel/air mixture in directions substantially tangential to said turbine axis;
wherein the generator further includes
(1) two or more of said premixers spaced circumferentially about said turbine axis with respective mixing tube axes inclined with respect to said turbine axis,
(2) a single air valve, and
(3) a compressed air distribution manifold interconnecting the single air valve and the entrances of each of the mixing tubes of said premixers;
wherein the radial turbine has an exhaust cone; and
wherein the distribution manifold is disposed in an annular space surrounding the exhaust cone.

24. A gas turbine gas generator operable with a fuel source, the gas generator comprising:
an air compressor;
a turbine;
a shaft assembly interconnecting the air compressor and the turbine;
and a combustor operatively connected to provide combustion gases to the turbine;

wherein the engine further includes one or more premixers each having
- (1) a mixing tube configured for receiving and mixing the fuel and air, the mixing tube having an axis and an exit for discharging a fuel/air mixture to the combustor; and
- (2) a mixture valve associated with said mixing tube exit and including inner and outer valve members that define an exit flow area;

wherein the defined exit flow area includes at least two segmented, substantially opposed area portions with respect to angular position about the mixing tube axis;

wherein the segmented area portions include ports for directing the discharged fuel/air mixture relative to the mixing tube axis;

wherein at least one of said inner and outer valve members is movable relative to the other of said valve members to selectively vary the defined exit flow area with respect to time;

wherein the gas turbine gas generator further includes a compressed air path interconnecting the compressor and each mixing tube; a fuel path interconnecting the source of fuel and each mixing tube; an air valve positioned in the compressed air path, and a fuel valve positioned in the fuel path; and wherein the air valve and fuel valve are separate from said mixture valve and are operable to control a fuel/air ratio of the mixture discharged from said mixing tube through said mixture valve;

wherein the gas turbine gas generator is a radial turbine gas generator having an annular combustor surrounding the turbine and the turbine having an axis;

wherein the generator has
- (1) only a single one of said premixers disposed at one angular position relative to the turbine axis,
- (2) only a single air valve disposed in said compressed air path at a second angular position relative to the turbine axis spaced substantially 180° from the one angular position; and wherein a portion of the compressed air path between said one air valve and the premixer mixing tube entrance includes at least one manifold extending in a circumferential direction relative to the turbine axis.

25. A gas turbine engine having the gas generator as in claim 24.

* * * * *